US006560511B1

(12) United States Patent
Yokoo et al.

(10) Patent No.: US 6,560,511 B1
(45) Date of Patent: May 6, 2003

(54) ELECTRONIC PET SYSTEM, NETWORK SYSTEM, ROBOT, AND STORAGE MEDIUM

(75) Inventors: Naohiro Yokoo, Kanagawa (JP); Yasuhiko Kato, Tokyo (JP); Masakazu Hattori, Kanagawa (JP); Masahiro Fujita, Saitama (JP); Naoyasu Hosonuma, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/720,760

(22) PCT Filed: Apr. 28, 2000

(86) PCT No.: PCT/JP00/02856

§ 371 (c)(1),
(2), (4) Date: Mar. 12, 2001

(87) PCT Pub. No.: WO00/66239

PCT Pub. Date: Nov. 9, 2000

(30) Foreign Application Priority Data

Apr. 30, 1999 (JP) .............................................. 11-125191
May 10, 1999 (JP) .............................................. 11-129207

(51) Int. Cl.[7] .............................................. G06F 19/00

(52) U.S. Cl. .......................... 700/245; 700/31; 700/248; 700/258; 700/259; 700/203; 700/217; 700/218; 700/219; 700/223; 700/224; 318/568.11; 318/568.12; 701/23

(58) Field of Search .......................... 700/31, 245, 248, 700/258, 259; 318/568.1, 568.2, 568.11, 568.12, 569, 16, 565; 901/1, 15, 47; 704/207, 209, 270; 348/121; 713/200; 701/23; 369/77.2; 709/203, 217–219, 223, 224; 340/436

(56) References Cited

U.S. PATENT DOCUMENTS

| | | | | | |
|---|---|---|---|---|---|
| 4,657,104 A | * | 4/1987 | Holland | ...................... | 180/211 |
| 5,963,712 A | * | 10/1999 | Fujita et al. | ........... | 318/568.12 |
| 6,038,493 A | * | 3/2000 | Tow | ........................... | 700/259 |

(List continued on next page.)

FOREIGN PATENT DOCUMENTS

| | | |
|---|---|---|
| EP | 0 898 237 A2 | 2/1999 |
| JP | 1-120690 | 5/1989 |
| JP | 3-79035 | 4/1991 |

(List continued on next page.)

OTHER PUBLICATIONS

Ward, Sony bitten by bluetooth, 2000, BBC News Online Internet, pp. 1–4.*

(List continued on next page.)

Primary Examiner—William A. Cuchlinski, Jr.
Assistant Examiner—McDieunel Marc
(74) Attorney, Agent, or Firm—Frommer Lawrence & Haug LLP; William S. Frommer

(57) ABSTRACT

An electronic pet with more reality using various types of devices. Specifically, a virtual electronic pet 202 and a pet-type robot 204 change the state of the emotion and the state of the instinct as the internal state of the electronic pet (information included in pet characteristic information 203) in accordance with surrounding information and internal information, and act in accordance with the state of the emotion and the state of the instinct. Transmission/reception of the internal state of the electronic pet (pet characteristic information 203) is made possible among the virtual electronic pet 202, the pet-type robot 204, and a personal computer 201. Thus, the action of the electronic pet is implemented by each device in accordance with the internal state of the electronic pet changed by another equipment.

19 Claims, 48 Drawing Sheets

U.S. PATENT DOCUMENTS

| | | | |
|---|---|---|---|
| 6,058,385 A | * | 5/2000 | Koza et al. .................... 706/13 |
| 6,275,773 B1 | * | 8/2001 | Lemelson et al. .......... 340/436 |
| 6,321,140 B1 | * | 11/2001 | Fujita et al. ................. 250/253 |

FOREIGN PATENT DOCUMENTS

| | | |
|---|---|---|
| JP | 8-202679 | 8/1996 |
| JP | 8-335091 | 12/1996 |
| JP | 10-319831 | 12/1998 |
| JP | 10-322775 | 12/1998 |
| JP | 10-333542 | 12/1998 |
| JP | 11-126017 | 5/1999 |

OTHER PUBLICATIONS

Berger et al., Autonomous agnet communicaiton iln an industrial environment using DECT, 1996, Internet, pp. 37–40.*

Ishihara et al., Performance of emotional group robotic system using mass psychology, 1997, IEEE, pp. 1445–1450.*

Hara et al., Real–tme facial interaction between human and 3D face robot agent, 1996, IEEE/Internet, pp. 401–409.*

* cited by examiner

| node 100 | NAME OF INPUT EVENT | NAME OF DATA | RANGE OF DATA | PROBABILITY OF TRANSITION TO ANOTHER NODE Di | | | | | n |
|---|---|---|---|---|---|---|---|---|---|
| | | | | A | B | C | D | ~ | |
| TRANSITION DESTINATION NODE | | | | node 120 | node 120 | node 1000 | | | node 600 |
| OUTPUT ACTION | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | | | | |
| 6 | | JOY | 50.100 | | | 50% | | | |
| 7 | | SUPRISE | 50.100 | | | 100% | | | |
| 8 | | SUDNESS | 50.100 | | | | | | |

| INTERNAL STATE | | ITEM | PARAMETER |
|---|---|---|---|
| | EMOTION | JOY | ○ |
| | | SADNESS | ○ |
| | | ANGER | ○ |
| | | SURPRISE | ○ |
| | | FEAR | ○ |
| | | HATRED | ○ |
| | INSTINCT | MOVEMENT INSTINCT | ○ |
| | | LOVE INSTINCT | ○ |
| | | RECHARGE INSTINCT | ○ |
| | | SEARCH INSTINCT | ○ |

FIG.21

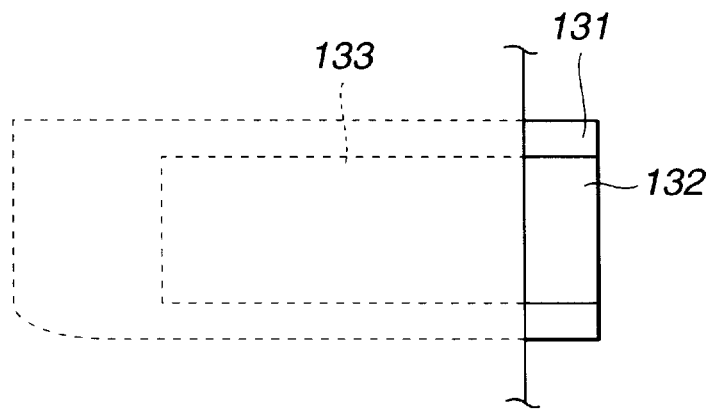
FIG.25
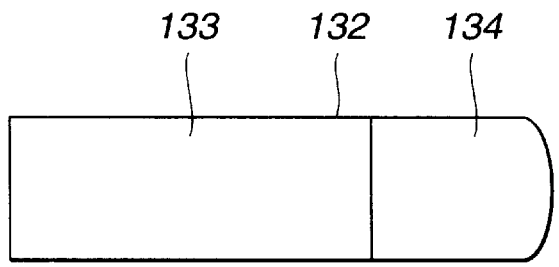
FIG.26
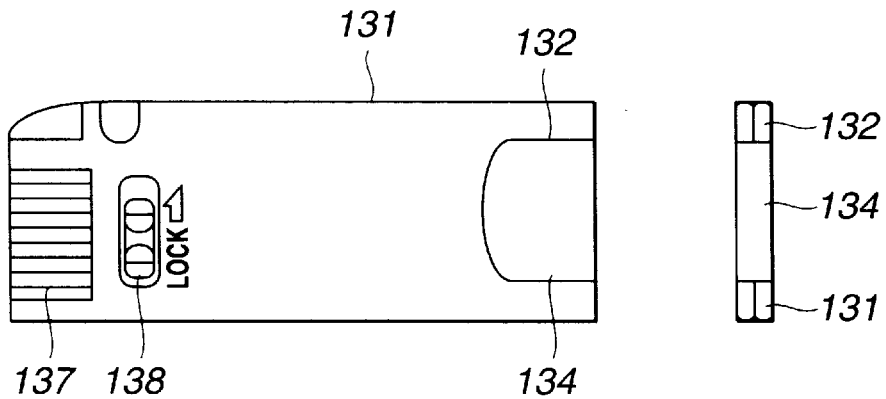
FIG.27A          FIG.27B

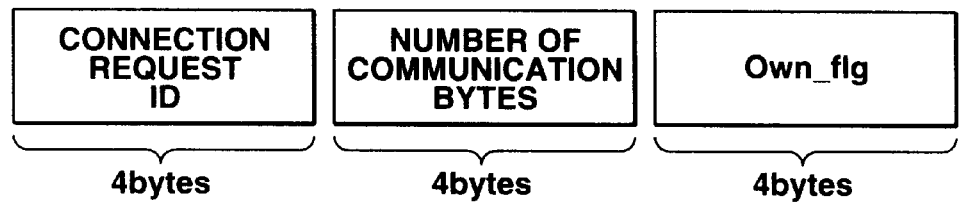
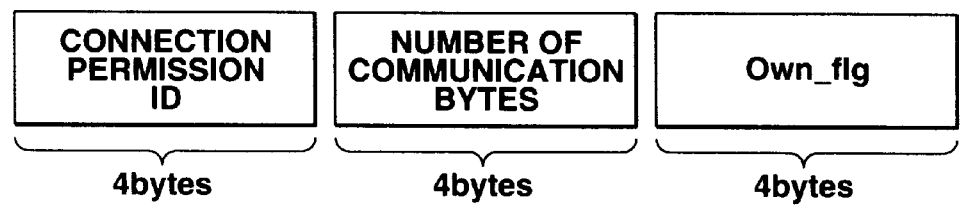
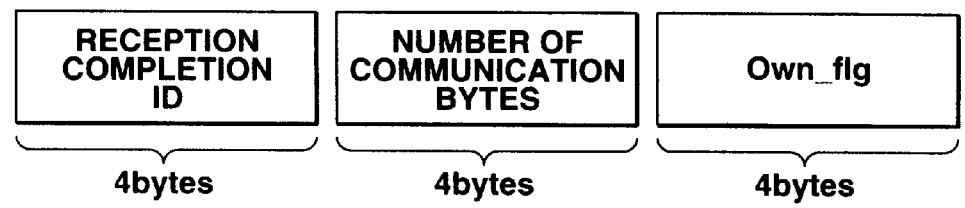
FIG.43

ELECTRONIC PET SYSTEM, NETWORK SYSTEM, ROBOT, AND STORAGE MEDIUM

TECHNICAL FIELD

This invention relates to an electronic pet system, a network system, a robot, and a storage medium, and particularly to an electronic pet system, a network system, a robot, and a storage medium which enable realization of an electronic pet in various types of devices.

BACKGROUND ART

Recently, so-called electronic pet devices (or breeding simulation game machines) have been popular because of the easiness in comparison with breeding of real animals as pets.

In an electronic pet device, an object of a virtual living body is displayed as an electronic pet and a keeper (user of the electronic pet device) is notified of the state of the electronic pet such as the degree of starvation (hunger) or fatigue by an image or a sound. The keeper (user) feeds or plays with the electronic pet by operating the electronic pet device in accordance with the state of the electronic pet. Thus, the electronic pet has its state (state of the electronic pet) changed on the basis of the keeper's actions and is thus bred. The electronic pet grows with the lapse of time and therefore the state of the electronic pet is also changed with the lapse of time.

Meanwhile, since the electronic pet device only displays the electronic pet on the display screen, the displayed electronic pet is a so-called virtual existence.

In the case where the electronic pet is realized by means of, for example, a robot, which exists as a substance, the robot as the electronic pet actually exists in the real world. In such a case, with respect to the robot as the electronic pet, the keeper (user) will have a feeling closer to the feeling in the case of actually breeding a pet, than with the electronic pet displayed in the electronic pet device.

However, in the case where the electronic pet is realized by means of a robot, it is inconvenient to carry the robot in traveling or the like. Therefore, it is more convenient if the electronic pet can be realized as an actually existing robot in a certain case and can be realized as a virtual existence in a portable electronic pet device in another case.

Since the electronic pet realized in the conventional electronic pet device generally has its state changed in accordance with an input from the user or with the lapse of time and thus takes an action, it lacks reality in comparison with the case of breeding a real animal as a pet.

Specifically, for example, in the case where a dog as a real animal is bred as a pet, when the dog wants the keeper to play with him, the dog barks or wags his tail to draw the keeper's attention. In this case, if the keeper keeps ignoring, the dog gets tired and stops barking or wagging his tail and then takes an action such as falling asleep. The real pet animal may be in high spirits after sleeping.

On the other hand, the electronic pet realized in the conventional electronic pet device (for example, an electronic pet dog) continues barking or wagging its tail when wanting the keeper to play, or stops such an action due to the lapse of time. Unlike the real pet animal (for example, a dog), the electronic pet does not get tired and fall asleep through barking or wagging its tail. That is, in the electronic pet realized in the conventional electronic pet device, the state of the electronic pet is not changed in accordance with the action of the electronic pet itself, and therefore does not take any action in accordance with such a change of the state due to the action of the electronic pet itself. For these reasons, it is demanded to provide an electronic pet with more reality.

DISCLOSURE OF THE INVENTION

In view of the foregoing status of the art, it is an object of the present invention to provide an electronic pet system, a network system, a robot, and a storage medium which enable realization of an electronic pet with more reality in various types of devices.

Specifically, an electronic pet system according to the present invention has an information processing device and a robot. The information processing device has transmission/reception means capable of transmitting and receiving the internal state of an electronic pet, which is changed in accordance with input information and is information for causing the electronic pet to act, and image display means, and carries out processing for implementing the electronic pet by the image display means. The robot has transmission/reception means capable of transmitting and receiving the internal state of the electronic pet, which is changed in accordance with input information and is information for causing the electronic pet to act, and a motion section for moving in the real world, and controls the motion section to carry out processing for implementing the electronic pet as an existence in the real world.

With such an electronic pet system, the internal state of the electronic pet is changed in accordance with input information and transmission/reception of the internal state is carried out between the information processing device and the robot which cause the electronic pet to act on the basis of the internal state. The information processing device acts on the basis of the internal state sent from the robot, and the robot acts on the basis of the internal state sent from the information processing device.

Also, an electronic pet system according to the present invention has an information processing device and a robot. The information processing device has radio transmission/reception means capable of radio-transmitting and receiving the internal state of an electronic pet, which is changed in accordance with input information and is information for causing the electronic pet to act, and image display means, and carries out processing for implementing the electronic pet by the image display means. The robot has radio transmission/reception means capable of radio-transmitting and receiving the internal state of the electronic pet, which is changed in accordance with input information and is information for causing the electronic pet to act, and a motion section for moving in the real world, and controls the motion section to carry out processing for implementing the electronic pet as an existence in the real world.

With such an electronic pet system, the internal state of the electronic pet is changed in accordance with input information and radio transmission/reception of the internal state is carried out between the information processing device and the robot which cause the electronic pet to act on the basis of the internal state. The information processing device acts on the basis of the internal state sent from the robot, and the robot acts on the basis of the internal state sent from the information processing device.

A network system according to the present invention has one or more implementation devices and a server device. The implementation device has transmission/reception means capable of transmitting and receiving the internal state of a living body object, which is changed in accordance with input information and is information for causing the living body object to act, and the identification information of the living body object, thus implementing the living body object. The server device has management means for managing the internal state of the living body object and the identification information of the living body object, and transmission/reception means capable of transmitting/receiving at least the internal state and the identification information. The implementation devices and the server device are connected with each other via a network.

With such a network system, the living body object in the implementation device has its internal state and identification information managed by the server device.

Also, a network system according to the present invention has an implementation device and an information processing device. The implementation device has transmission/reception means capable of transmitting and receiving the internal state of a living body object, which is changed in accordance with input information and is information for causing the living body object to act, thus implementing the living body object. The information processing device has transmission/reception means capable of transmitting and receiving the internal state of the living body object, controls the action of the living body object acting in a virtual world on the basis of the internal state of the living body object, and carries out processing for displaying at least the virtual world and the living body object.

With such a network system, the internal state of the living body object in the implementation device, which is changed in accordance with input information and is information for causing occurrence of an action, is transferred to the information processing device, which carries out processing for displaying at least the virtual world and the living body object.

A robot according to the present invention is adapted for storing the internal state of a living body object, which is changed in accordance with input information and is information for causing the living body object to act, and controlling a motion section to carry out processing for implementing the living body object as an existence in the real world. The robot transfers at least the internal state to an information processing device, which controls the action of a living body object acting in a virtual world on the basis of the internal state of the living body object in the robot and carries out processing for displaying at least the virtual world and the living body object.

Such a robot transfers the internal state, which is changed in accordance with input information and is information for causing occurrence of an action, to the information processing device, which carries out processing for displaying at least the virtual world and the living body object.

A storage medium according to the present invention is adapted for storing data usable in an information processing device and can be inserted to/ejected from a slot provided in the information processing device. The storage medium has indication means for indicating an accurate loading position when loaded in the slot of the information processing device.

Thus, the user loads the storage medium into the slot of the information processing device with reference to the indication means.

BRIEF DESCRIPTION OF THE DRAWINGS

FIG. 14 shows a state transition table.

FIG. 21 shows pet characteristic information stored in an individual information storage section (IC card).

FIG. 25 is a view for explaining a stick-shaped IC card which is accurately loaded in a slot.

FIG. 26 is a view for explaining an exemplary label put on the stick-shaped IC card.

FIGS. 27A and 27B show the bottom side and the lateral side of the stick-shaped IC card.

FIG. 43 shows the data format of a connection request signal, a connection permission signal, and a reception end signal.

BEST MODE FOR CARRYING OUT THE INVENTION

Preferred embodiments of the present invention will now be described in detail with reference to the drawings.

Figure 1:
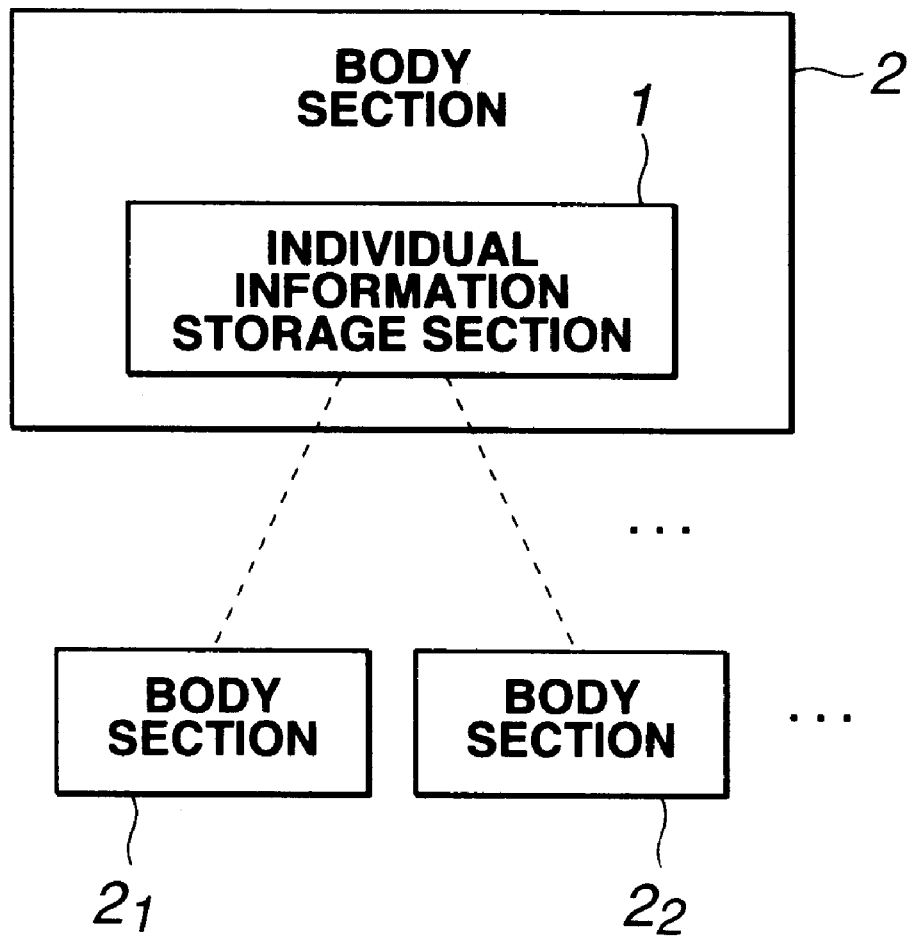
FIG. 1 is a block diagram showing the overall structure of an embodiment of an electronic pet system to which the present invention is applied.

FIG. 1 shows the overall structure of an electronic pet system as a first embodiment of the present invention. (On this specification, the system means a logical collection of a plurality of devices, regardless of whether the respective devices are included in the same casing or not.)

The electronic pet system has an individual information storage section 1 and a body section 2, as shown in FIG. 1.

For example, an animal as a living body is considered to be made up of the flesh and the soul residing in the flesh and controlling the psychological function. The individual information storage section 1 of the electronic pet system is equivalent to such a soul of the animal and is constituted as hardware in the electronic pet. The body section 2 is equivalent to such a flesh and is constituted as software in the electronic pet.

Specifically, the individual information storage section 1, which expresses the characteristics (emotions and physical characteristics) of the electronic pet, can be said to function as the soul of the electronic pet. The body section 2, which expresses the actions of the electronic pets, can be said to function for implementing the substantial or virtual flesh of the electronic pet and representing the real actions with the substantial or virtual flesh. The actions of the body section 2 are carried out on the basis of the characteristics of the electronic pet held by the individual information storage section 1. Therefore, the individual information storage section 1 can be said to be the core of the electronic pet.

The individual information storage section 1 can be extracted from the body section 2 and can also be provided (to reside) in other body sections $2_1, 2_2, \ldots$ In this case, the body section 2 in which the individual information storage section 1 is not provided does not function as an electronic pet. The electronic pet of this case is in a so-called cast-off state.

On the other hand, the other body sections in which the individual information storage section 1 is provided starts to function as electronic pets having the original characteristics. That is, the soul of the electronic pet can switch from one flesh to another.

Figure 2:
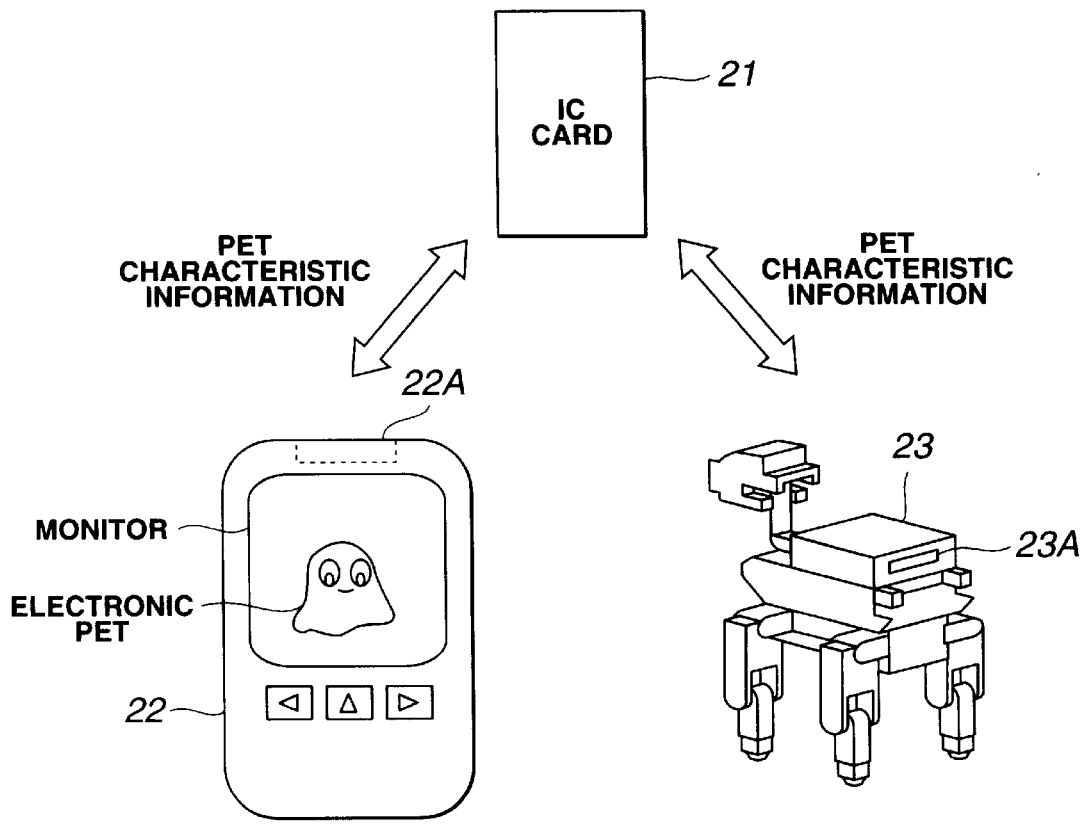
FIG. 2 shows a more specific exemplary structure of the electronic pet system.

FIG. 2 shows a more specific exemplary structure of the electronic pet system of FIG. 1.

The individual information storage section 1 of FIG. 1 is expressed by, for example, an IC (integrated circuit) card 21. The IC card 21 contains a stamp flash memory or the like and stores the quantity of characteristics of instincts and emotions of the electronic pet and the constitutional information of the body section as will be described later (hereinafter referred to as pet characteristic information).

The body section 2 of FIG. 1 is realized by, for example, a virtual electronic pet device 22 or a pet-type robot 23. The virtual electronic pet device 22 is constituted by a portable information processing device for carrying out processing for displaying a virtual electronic pet, and has a slot 22A for loading the IC card 21 therein. The pet-type robot 23 is a robot having the shape of an electronic pet and also has a slot 23A for loading the IC card 21 therein. Although a quadrupedal robot is used as an example of the pet-type robot in the embodiments of the present invention, the form of the robot is not particularly limited and various arbitrary forms can be employed such as a bipedal robot, a robot having wings, a robot having wheels, a robot with no limb, and combination or modification of various parts. The present invention is applicable to robots of various forms.

Both the virtual electronic pet device 22 and the pet-type robot 23 are devices which function as the body section of the electronic pet and do not take any action by themselves. Specifically, as the IC card 21 is loaded therein, the virtual electronic pet device 22 and the pet-type robot 23 function as electronic pets. In the case of the virtual electronic pet device 22, an electronic pet is displayed on its monitor and the electronic pet displayed on the monitor takes an action based on the pet characteristic information stored on the IC card 21. Similarly, the pet-type robot 23 takes an action based on the pet characteristic information stored on the IC card 21.

With such an electronic pet system, the user at home can enjoy the feeling close to the feeling of actually keeping a pet by loading the IC card 21 into the slot 23A of the pet-type robot 23. When the user goes on a trip, the user can easily carry the electronic pet to the destination by detaching the IC card 21 from the pet-type robot 23 and loading the IC card 21 into the virtual electronic pet device 22.

Figure 3:
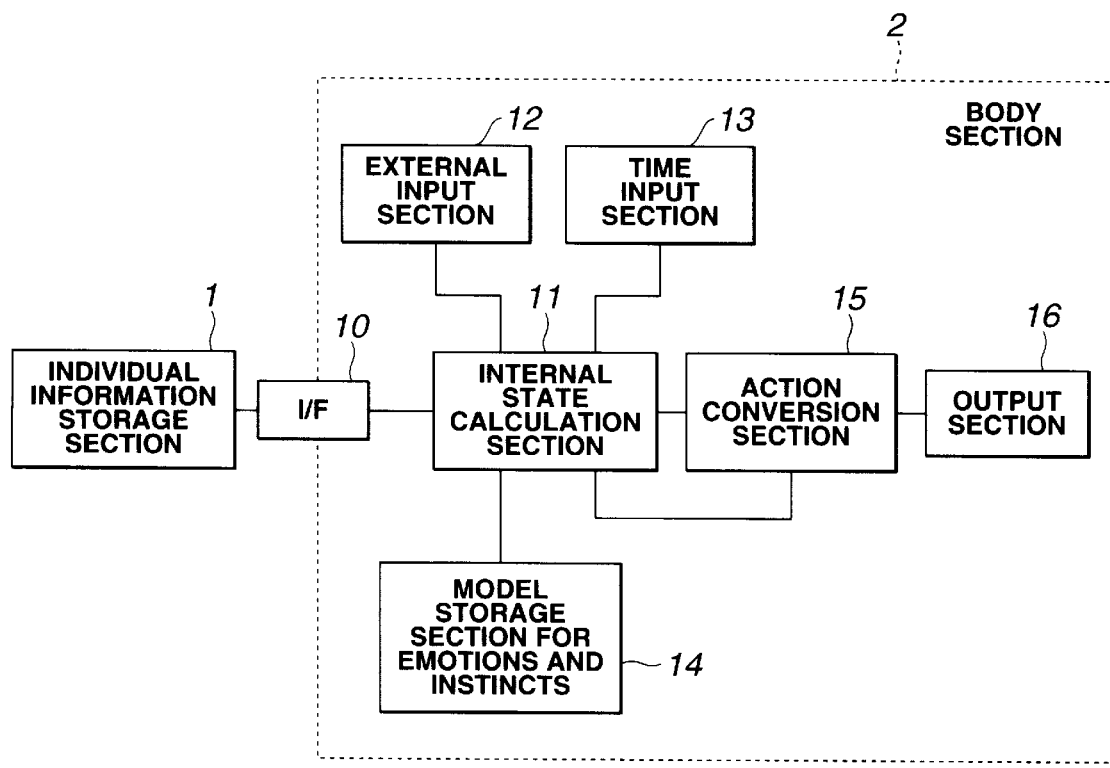
FIG. 3 is a block diagram showing an exemplary structure of a body section of the electronic pet system.

FIG. 3 shows an exemplary electrical structure of the body section 2 of FIG. 1. The body section 2 is assumed to be the virtual electronic pet device 22 and the pet-type robot 23, which will be later described further in detail.

An I/F (interface) 10 is equivalent to the slot 22A of the virtual electronic pet device 22 or the slot 23A of the pet-type robot 23 of FIG. 1, and functions as an interface for transmission of data between the individual information storage section 1 and the body section 2. Specifically, the I/F 10 reads out information (pet characteristic information) expressing the characteristics of instincts and emotions of the electronic pet and the structure of the body section and supplies the information to an internal state calculation section 11. The I/F 10 also writes the information obtained as a result of predetermined calculation at the internal state calculation section 11 to the individual information storage section 1 and updates the storage contents.

To the internal state calculation section 11, inputs from an external input section 12 and a time input section 13 are supplied as well as the pet characteristic information from the I/F 10 as described above. Moreover, specific actions of the electronic pet obtained by an action conversion section 15 are fed back to the internal state calculation section 11. The internal state calculation section 11 drives emotion and instinct models stored in a model storage section 14 in accordance with the input from the I/F 10, the external input section 12, the time input section 13, or the action conversion section 15, and updates the internal state of the electronic pet. The internal state of the electronic pet relates to the information of emotions and instincts included in the pet characteristic information from the I/F 10, as will be described later, and the updated internal state is written to the individual information storage section 1 via the I/F 10. The internal state calculation section 11 also decides a motion (conceptual motion) to be made by the electronic pet, and outputs a command (motion command) instructing the execution of that motion (conceptual motion) to the action conversion section 15, which carries out control to output the real action.

The external input section 12 supplies stimuli given by the user or from the external environment to the internal state calculation section 11.

In the case where the body section 2 is the virtual electronic pet device 22, the external input section 12 is constituted by a keyboard (or switches and buttons), a microphone, and a voice recognition device. The external input section 12 changes an operation or a speech made by the user for taking care of the electronic pet, into an electric signal, and supplies the electric signal to the internal state calculation section 11.

On the other hand, in the case where the body section 2 is the pet-type robot 23, the external input section 12 is constituted by a keyboard, a microphone, a voice recognition device, a photoelectric conversion element, an image recognition device, and a sensor (e.g., a temperature sensor). The external input section 12 changes an operation or a speech made by the user for taking care of the electronic pet, into an electric signal, and supplies the electric signal to the internal state calculation section 11. The external input section 12 also supplies information about surrounding objects and temperature to the internal state calculation section 11.

The time input section 13 keeps time (including the year, month and day) and supplies the time (current time) to the internal state calculation section 11.

The model storage section 14 stores models of emotions and instincts (emotion/instinct models) of the electronic pet. As the emotions of the electronic pet, for example, joy, sadness, anger, surprise, fear, and hatred are set, and the model storage section 14 stores a model of these emotions (e.g., computational formulas for finding parameters expressing these emotions). As the instincts of the electronic pet, for example, movement instinct, love instinct, recharge instinct, and search instinct are set, and the model storage section 14 stores a model of these instincts. The internal state of the electronic pet is constituted by the state of emotion and the state of instinct.

The body section 2 has the emotion and instinct models of the same structure, irrespective of whether it is the virtual electronic pet device 22 or the pet-type robot 23. Thus, even when the IC card 21 is exchanged between the virtual electronic pet device 22 and the pet-type robot 23, the characteristics and actions of the electronic pet are not changed to those of different electronic pets.

The action conversion section 15 converts a conceptual motion command from the internal state calculation section 11 to a command (action command) instructing a specific action (such as an action, motion, or posture). The action conversion section 15 supplies the command to an output section 16 and also supplies the command to the internal state calculation section 11 as a feedback.

The output section 16 makes an output in accordance with the action command from the action conversion section 15. Specifically, the output section 16 causes the electronic pet to take the action in accordance with the action command from the action conversion section 15.

In the case where the body section 2 is the virtual electronic pet device 22, the output section 16 is constituted by a monitor, a voice synthesizer (e.g., a rule-based voice synthesizer), and a speaker. Thus, the output of the output section 16 changes the display of the electronic pet and outputs a voice.

On the other hand, in the case where the body section 2 is the pet-type robot 23, the output section 16 is constituted by motion sections such as motors for driving members corresponding to the limbs, trunk, head and tail, and a voice synthesizer and a speaker. Thus, the output of the output section 16 rotates a predetermined motor and outputs a voice.

Figure 4:
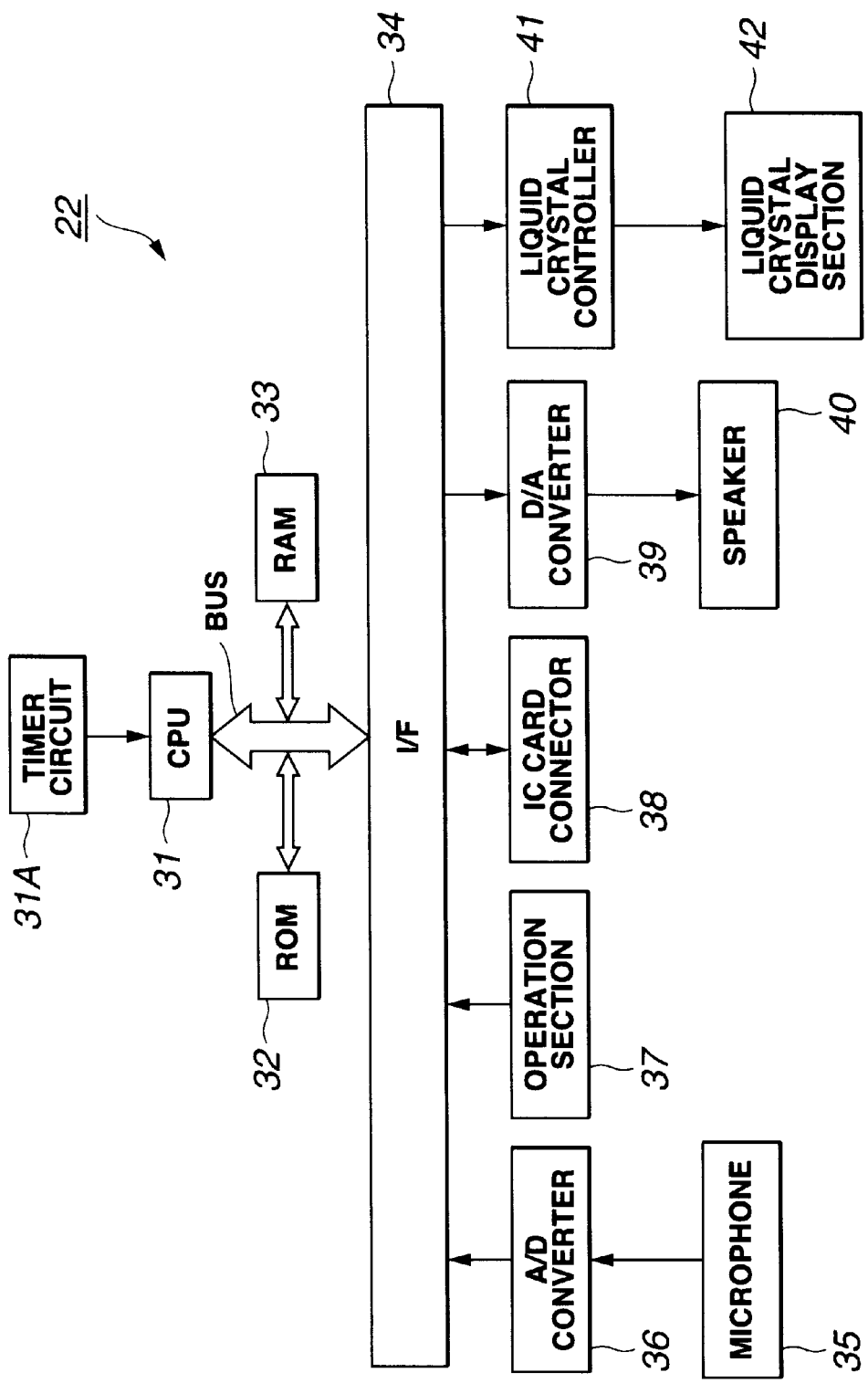
FIG. 4 is a block diagram showing an exemplary hardware structure of a virtual electronic pet device.

The structure of the virtual electronic pet device 22 and the pet-type robot 23 will be described using a more specific example. FIG. 4 shows an exemplary hardware structure of the virtual electronic pet device 22.

A CPU (central processing unit) 31 is adapted for carrying out various types of processing in accordance with a program stored in a ROM (read only memory) 32. A timer circuit 31A counts a clock, not shown, and generates a timer interruption for every predetermined unit time (e.g., 100 ms) to the CPU 31 on the basis of the count value.

The ROM 32 stores a program to be executed by the CPU 31 and data necessary for the execution of the program. A RAM (random access memory) 33 stores data necessary for the operation of the CPU 31.

An I/F 34 functions as an interface between the CPU 31 on one hand and an A/D converter 36, an operation section 37, an IC card connector 38, a D/A converter 39 and a liquid crystal controller 41 on the other.

Of the above-mentioned sections, the CPU 31, the ROM 32, the RAM 33 and the I/F 34 are interconnected via a bus (address bus or data bus).

A microphone 35 converts a sound inputted thereto (e.g., a whistle sound or the like) to an audio signal as an analog electric signal and supplies the audio signal to the A/D converter 36. The A/D converter 36 carries out A/D conversion of the analog audio signal from the microphone and outputs the resultant digital audio signal to the CPU 31 via the I/F 34.

In the case where the CPU 31 has thus received the audio signal, the CPU 31 carries out linear prediction analysis of the audio signal so as to extract the characteristic quantity, and carries out voice recognition based on an HMM (hidden Markov model) method. A program to be executed by the CPU 31 for voice recognition and word models as the objects of voice recognition are stored, for example, in the ROM 32. In this case, as the word models to be the objects of voice recognition, particularly the words models used by the keeper to talk to the pet are stored. The words to be stored include "Hey", "Good boy", "Good morning", "Good night", "Paw", "Sit", "What are you doing?" and the like.

The method of acoustic analysis is not limited to the linear prediction analysis, and the method of voice recognition is not limited to the HMM method.

The operation section 37 is constituted by various buttons and keys and supplies a signal corresponding to the operation from the user to the CPU 31 via the I/F 34. Thus, the CPU 31 can recognize the buttons and keys operated by the user. The operation section 37 has buttons for providing various inputs to the electronic pets such as a "scold" button, which is operated for scolding the electronic pet, a "praise" button, which is operated for praising the electronic pet, a "greeting" button corresponding to saying "Good morning" or "Good night", and a "paw" button and a "sit" button, which are operated for instructing the electronic pet to raise the paw or to sit as a performance.

The IC card connector 38 is provided in the slot 22A of the virtual electronic pet device 22 (FIG. 2), and is adapted for electrically connecting the IC card 21 with the CPU 31 via the I/F 34 when the IC card 21 is loaded in the slot 22A. In this case, the CPU 31 reads data from and writes data to the IC card 21 via the I/F 34 and the IC card connector 38. The CPU 31 can also detect the loading of the IC card 21.

The D/A converter 39 carries out D/A conversion of the digital audio signal supplied from the CPU 31 via the I/F 34 and supplies the resultant analog audio signal to a speaker 40. The speaker 40 contains an amplifier to amplify the audio signal from the D/A converter 39 and to output the amplified audio signal. The CPU 31 generates a voice of the electronic pet or other necessary sounds by voice synthesis, if necessary, and outputs the synthesized sound to the D/A converter 39 via the I/F 34. A program for carrying out voice synthesis and data necessary for voice synthesis are stored, for example, in the ROM 32.

The liquid crystal controller 41 is controlled by the CPU 31 via the I/F 34 and displays various images (e.g., an image of the electronic pet) and characters on a liquid crystal display section 42. The liquid crystal display section 42 displays images and characters under the control of the liquid crystal controller 41. The ROM 32 stores a program for displaying images and characters on the liquid crystal display section 42 by controlling the liquid crystal controller 41, and the CPU 31 executes this program, thus displaying images and characters on the liquid crystal display section 42.

The foregoing is the exemplary hardware structure of the virtual electronic pet device 22. An exemplary hardware structure of the pet-type robot 23 will now be described. The exemplary hardware structure of the pet-type robot 23 is as shown in FIG. 5.

Figure 5:
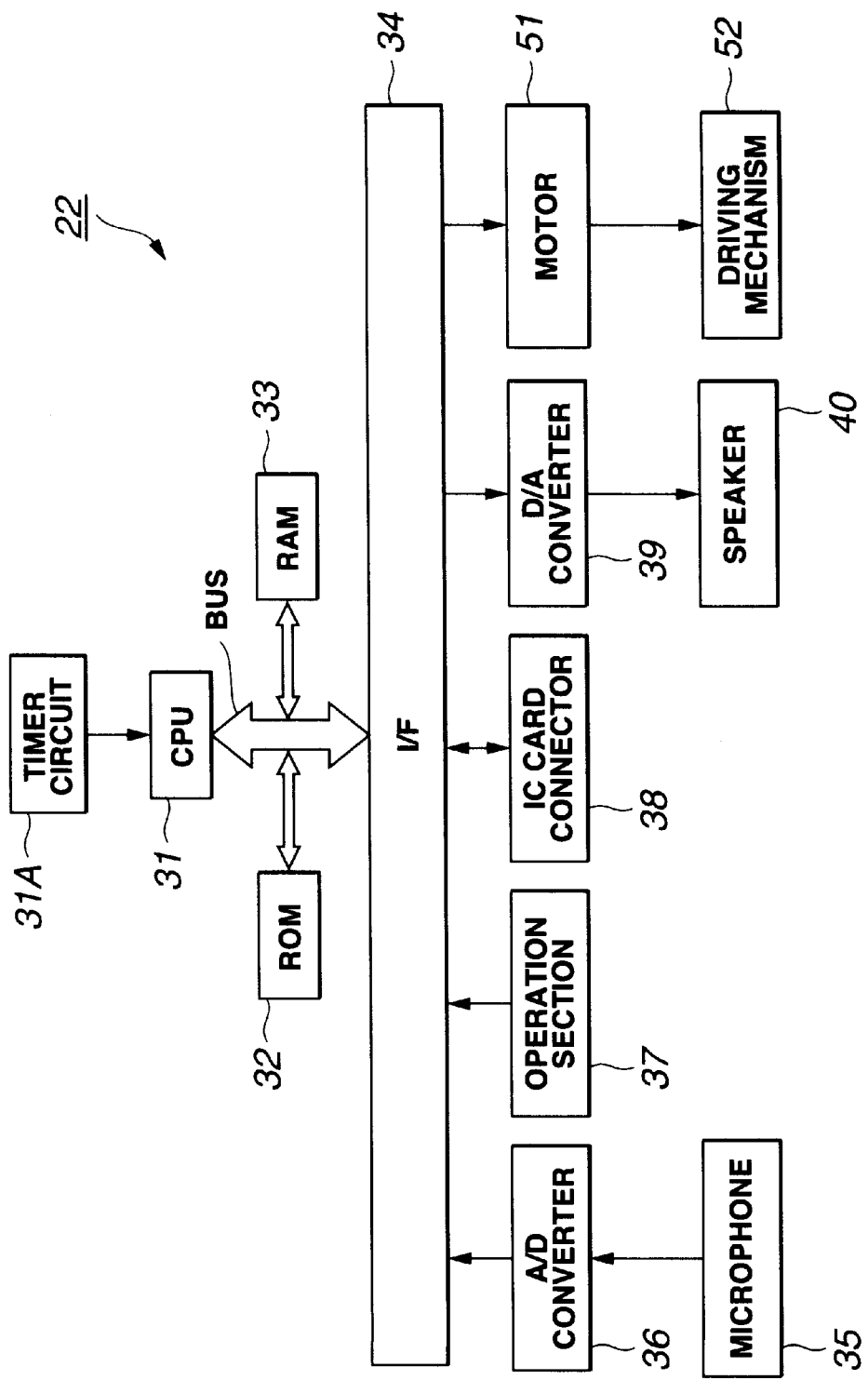
FIG. 5 is a block diagram showing an exemplary hardware structure of a pet-type robot.

In FIG. 5, the portions corresponding to those of the virtual electronic pet device 22 of FIG. 4 are denoted by the same numerals. Specifically, the pet-type robot 23 has basically the same structure as the virtual electronic pet device 22, except for a motor 51 and a driving mechanism 52 provided in place of the liquid crystal controller 41 and the liquid crystal display section 42.

The motor 51 is controlled by the CPU 31 via the I/F 34 and is adapted for driving the driving mechanism 52. The driving mechanism 52 constitutes, for example, the head, limbs, trunk or tail as moving parts of the pet-type robot 23 and is driven by the motor 51.

The I/F 34 and the IC card connector 38 of FIGS. 4 and 5 correspond to the I/F 10 of FIG. 3, and the CPU 31 and the ROM 32 of FIGS. 4 and 5 correspond to the internal state calculation section 11 and the action conversion section 15 of FIG. 3. The microphone 35, the A/D converter 36 and the operation section 37 of FIGS. 4 and 5 correspond to the external input section 12 of FIG. 3. The timer circuit 31A of FIGS. 4 and 5 corresponds to the time input section 13 of FIG. 3, and the ROM 32 of FIGS. 4 and 5 corresponds to the model storage section 14 of FIG. 3. Moreover, the D/A converter 39 and the speaker 40 of FIGS. 4 and 5, the liquid crystal controller 41 and the liquid crystal display section 42 of FIG. 4, or the motor 51 and the driving mechanism 52 of FIG. 5 correspond to the output section 16 of FIG. 3.

Figure 6:
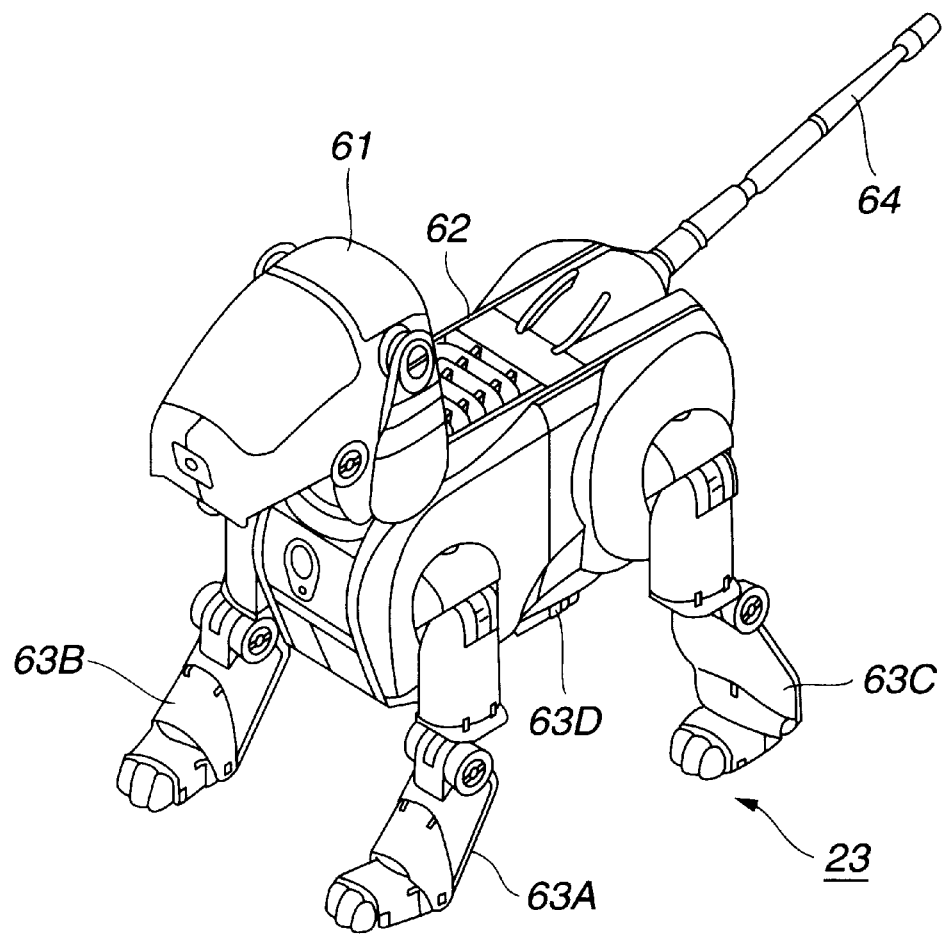
FIG. 6 is a perspective view showing the specific structure of the appearance of the pet-type robot.

The pet-type robot 23 will be described further in detail. The overall shape (appearance) of the pet-type robot 23 is constituted by coupling a head portion 61 corresponding to the head, a trunk portion 62 corresponding to the trunk, limb portions 63A, 63B, 63C and 63D corresponding to the four limbs, and a tail portion 64 corresponding to the tail, as shown in FIG. 6. The pet-type robot 23 of such a structure moves the head portion 61, the limb portions 63A to 63D, and the tail portion 64 with respect to the trunk portion 62, thus moving like a real quadrupedal animal. The pet-type robot 23 has the slot for loading the IC card 21, though not shown.

Figure 7:
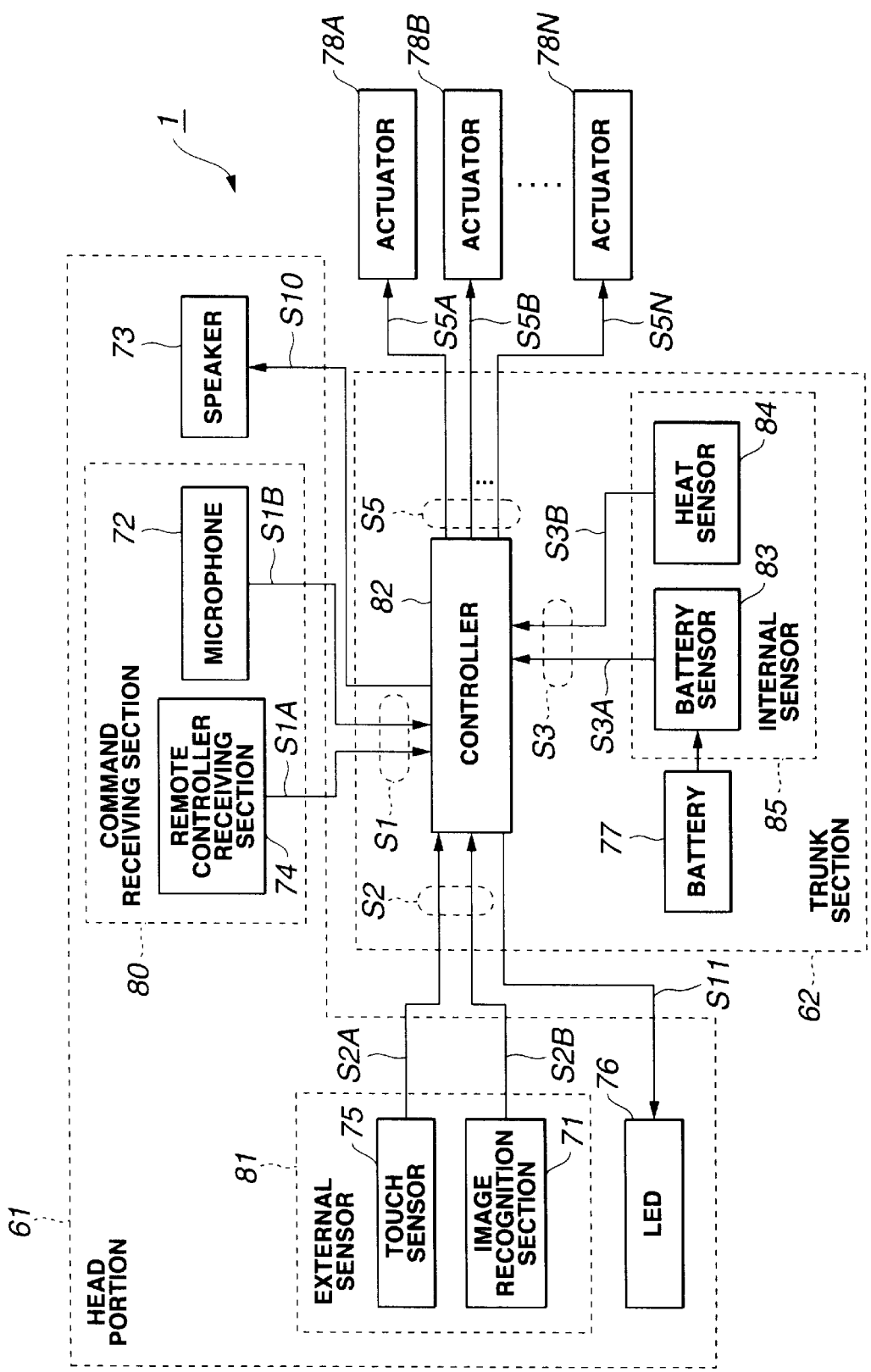
FIG. 7 is a block diagram showing the more specific circuit structure of the pet-type robot.

On the head portion 61, an image recognition section 71 made up of a CCD (charge coupled device) camera corresponding to the eyes for picking up an image, a microphone 72 corresponding to the ears for picking up a sound, and a speaker 73 corresponding to the mouth for generating a sound are attached at predetermined positions, as shown in FIG. 7. Also, on the head portion 61, a remote controller receiving section 74 for receiving a command transmitted from the user via a remote controller (not shown), a touch sensor 75 for detecting the tough by the user's hand or the like, and a LED (light-emitting diode) 76 made up of light-emitting means are attached.

On the trunk portion 62, a battery 77 is attached at a position corresponding to the abdomen, and an electronic circuit (not shown) for controlling the operation of the entire pet-type robot 23 is housed inside the trunk portion 62.

Joint portions of the limb portions 63A to 63D, coupling portions between the limb portions 63A to 63D and the trunk portion 62, a coupling portion between the trunk portion 62 and the head portion 61, and a coupling portion between the trunk portion 62 and the tail portion 64 are coupled by their respective actuators 78A to 78N and are driven under the control of the electronic circuit housed inside the trunk portion 62. By thus driving the actuators 78A to 78N, the pet-type robot 23 moves like a real quadrupedal animal, for example, shakes the head portion 61 vertically and horizontally, wags the tail portion 64, and moves the limb portions 63A to 63D to walk or run.

Such a pet-type robot 23 changes the internal state such as emotions and instincts on the basis of input information like circumferential information and internal information (e.g., information of the remaining capacity of the battery). The internal state is stored on the IC card 21.

The pet-type robot 23 controls the motion sections such as the head portion 61, the trunk portion 62, the limb portions 63A to 63D and the tail portion 64 (which are moved by the actuators 78A to 78N) on the basis of the changed internal state, and thus realizes the electronic pet in the real world. The circuit structure of such a pet-type robot 23 will now be described in detail with reference to FIG. 7.

The head portion 61 has a command receiving section 80 made up of the microphone 72 and the remote controller receiving section 74, an external sensor 81 made up of the image recognition section 71 and the tough sensor 75, the speaker 73, and the LED 76. The trunk section 62 has the battery 77, and also has therein a controller 82 for controlling the operation of the entire pet-type robot 23, and an internal sensor 85 made up of a battery sensor 83 for detecting the remaining capacity of the battery 77 and a heat sensor 84 for detecting the heat generated within the pet-type robot 23. Moreover, the actuators 78A to 78N are provided at predetermined positions in the pet-type robot 23.

The command receiving section 80 is adapted for receiving commands given to the pet-type robot 23 from the user such as "Walk", "Down", and "Chase the ball", and is constituted by the microphone 72 and the remote controller receiving section 74.

The remote controller receiving section 74 receives a desired command inputted by the user operating the remote controller (not shown). For example, the transmission of a command from the remote controller is carried out using an infrared ray. The remote controller receiving section 74 receives this infrared ray to generate a received signal S1A and sends it to the controller 82.

The remote controller is not limited to the one using infrared rays but may also be adapted for giving a command to the pet-type robot 23 by using the musical scale. In such a case, the pet-type robot 23 carries out processing corresponding to the musical scale from the remote controller inputted from the microphone 72.

When the user generates a voice in accordance with a desired command, the microphone 72 picks up the voice generated by the user to generate an audio signal S1B and sends it to the controller 82.

The command receiving section 80 thus generates a command signal S1 made up of the received signal S1A and the audio signal S1B in accordance with the command given to the pet-type robot 23 from the user, and supplies the command signal S1 to the controller 82.

The touch sensor 75 of the external sensor 81 is adapted for detecting the approach from the user to the pet-type robot 23, for example, "pat", "slap" and the like. For example, when the user touches the touch sensor 75 and takes a desired manner of approach, the touch sensor 75 generates a touch detection signal S2A corresponding to that approach and sends it to the controller 82.

The image recognition section 71 of the external sensor 81 is adapted for detecting the environment information around the pet-type robot 23 such as "dark" or "there is my favorite toy", or the motion of other robot devices such as "another robot is running", as a result of identifying the environment around the pet-type robot 23. This image recognition section 71 sends an image signal S2B obtained as a result of picking up the image of the surroundings, to the controller 82.

The external sensor 81 thus generates an external information signal S2 made up of the touch detection signal S2A and the image signal S2B in accordance with the external information provided from outside the pet-type robot 23, and sends the external information signal S2 to the controller 82.

The internal sensor 85 is adapted for detecting the internal information of the pet-type robot 23 itself, for example, "I'm hungry", which means the battery capacity is lowered, "I have a fever" and the like. The internal sensor 85 is constituted by the battery sensor 83 and the heat sensor 84.

The battery sensor 83 is adapted for detecting the remaining capacity of the battery 77, which supplies the power to each circuit of the pet-type robot 23. This battery sensor 83 sends a battery capacity detection signal S3A as a result of detection to the controller 82.

The heat sensor 84 is adapted for detecting the heat within the pet-type robot 23. This heat sensor 84 sends a heat detection signal S3B as a result of detection to the controller 82.

The internal sensor 85 thus generates an internal information signal S3 made up of the battery capacity detection signal S3A and the heat detection signal S3B in accordance with the internal information of the pet-type robot 23, and sends it to the controller 82.

The image recognition 71, the microphone 72, the remote controller receiving section 74, the touch sensor 75 and the like shown in FIG. 7 correspond to the external input section 12 shown in FIG. 3. The actuators 78A to 78N shown in FIG. 7 correspond to the output section 16 shown in FIG. 3. As a matter of course, the constituent parts that are not shown in FIG. 7 but shown in FIG. 3 or FIG. 5 may also be provided as the constituent parts of the pet-type robot 23 of FIG. 7. For example, the constituent part such as the time input section 13 may be provided.

The controller 82 generates control signals S5A to S5N for driving the actuators 78A to 78N on the basis of the input information, that is, the command signal S1 supplied from the command receiving section 80, the external information signal S2 supplied from the external sensor 81 and the internal information signal S3 supplied from the internal sensor 85, and sends these control signals to drive the actuators 78A to 78N, thus operating the pet-type robot 23.

The controller 82 generates an audio signal S10 or a light-emitting signal 11 to be outputted to the outside, if necessary, and outputs the audio signal S10 to the outside via the speaker 73 or sends the light-emitting signal S11 to the LED 76 to carry out desired light-emitting output (e.g., flashing or changing the color), thus notifying the user of the necessary information. For example, by the light-emitting output, the controller 82 notifies the user of the emotion of the electronic pet. An image display section for displaying an image can be provided in place of the LED 76. Thus, it is possible to notify the user of the necessary information like the emotion by displaying a desired image. The processing at the controller 82 will now be described in detail.

The controller 82 carries out software-like data processing on the command signal S1 supplied from the command receiving section 80, the external information signal S2 supplied from the external sensor 81 and the internal information signal S3 supplied from the internal sensor 85 on the basis of a program stored in advance in a predetermined storage area, and supplies control signals S5 obtained as a result to the actuators 78A to 78N. The actuators 78A to 78N operate on the basis of the control signals S5A, S5B, ..., S5N.

Figure 8:
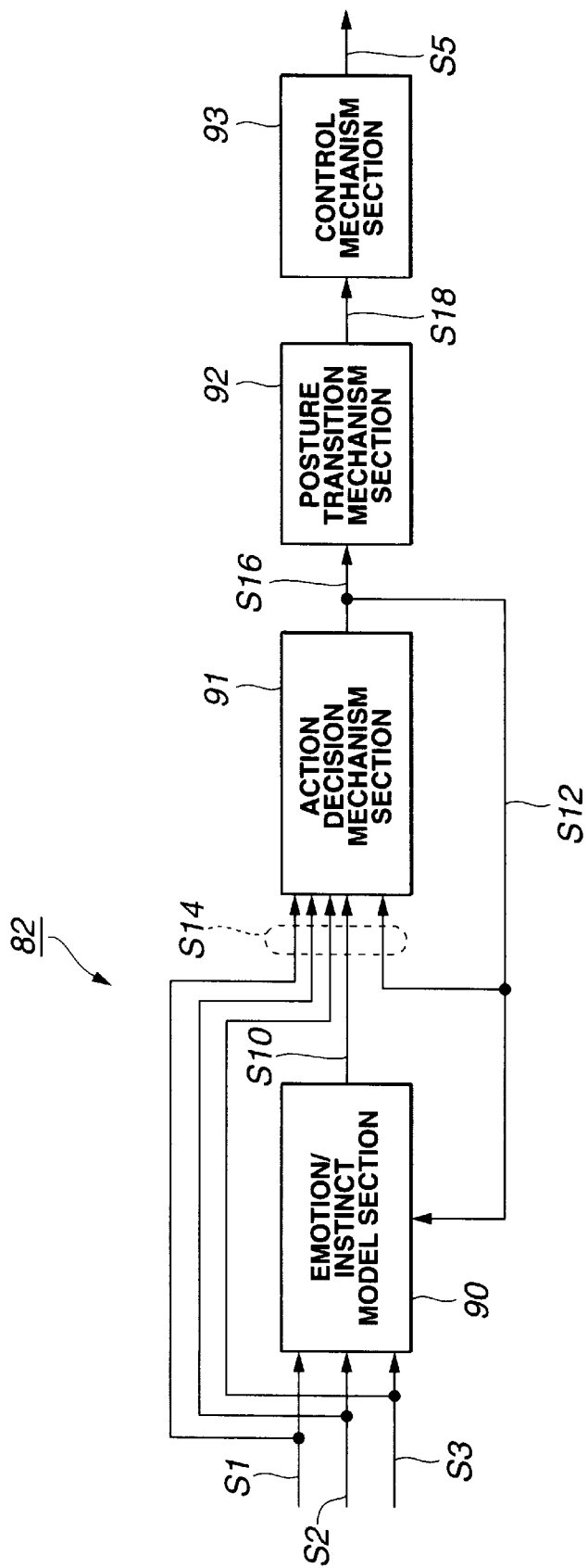
FIG. 8 is a block diagram showing the structure of a controller.

As shown in FIG. 8, the contents of the data processing at the controller 82 are functionally classified into an emotion/instinct model section 90 as emotion/instinct model change means, an action decision mechanism section 91 as motion decision means, a posture transition mechanism section 92 as posture transition means, and a control mechanism section 93. The command signal S1, the external information signal S2 and the internal information signal S3 supplied from outside are inputted to the emotion/instinct model section 90 and the action decision mechanism section 91. These sections roughly function as follows.

The emotion/instinct model section 90 decides the state of emotions and instincts on the basis of the command signal S1, the external information signal S2 and the internal information signal S3. The action decision mechanism section 91 decides the next motion (action) on the basis of the emotion/instinct state information S10 obtained by the emotion/instinct model section 90 in addition to the command signal S1, the external information signal S2 and the internal information signal S3, and the posture transition mechanism section 92 on the subsequent stage makes a posture transition plan for shifting to the next motion (action) decided by the action decision mechanism section 91. The information of the motion (action) decided by the action decision mechanism section 91 is fed back to the emotion/instinct model section 90, and the emotion/instinct model section 90 decides the state of emotions and instincts with reference to the decided motion (action). That is, the emotion/instinct model section 90 decides the instinct and emotion also with reference to the motion (action) result.

The control mechanism section 93 controls each motion section in accordance with the posture transition information S18 sent on the basis of the posture transition plan from the posture transition mechanism section 92, then actually shifts the posture, and then actually carries out the next motion (action) decided by the action decision mechanism section 91.

That is, using the above-described controller 82, the pet-type robot 23 decides the next motion (action) on the basis of the emotions and instincts, then makes the transition plan for realizing the posture to enable execution of such a motion (action), then shifts the posture on the basis of the transition plan, and actually executes the motion (action) decided on the basis of such emotions and instincts.

The function of the model storage section 14 for emotions and instincts and the internal state calculation section 11 shown in FIG. 3 is realized by the emotion/instinct model section 90 shown in FIG. 8, and the function of the action conversion section 15 shown in FIG. 3 is realized by the action decision mechanism section 91, the posture transition mechanism section 92 and the control mechanism section 93 shown in FIG. 8. The constituent parts of the above-described controller 82 will now be described.

Figure 9:
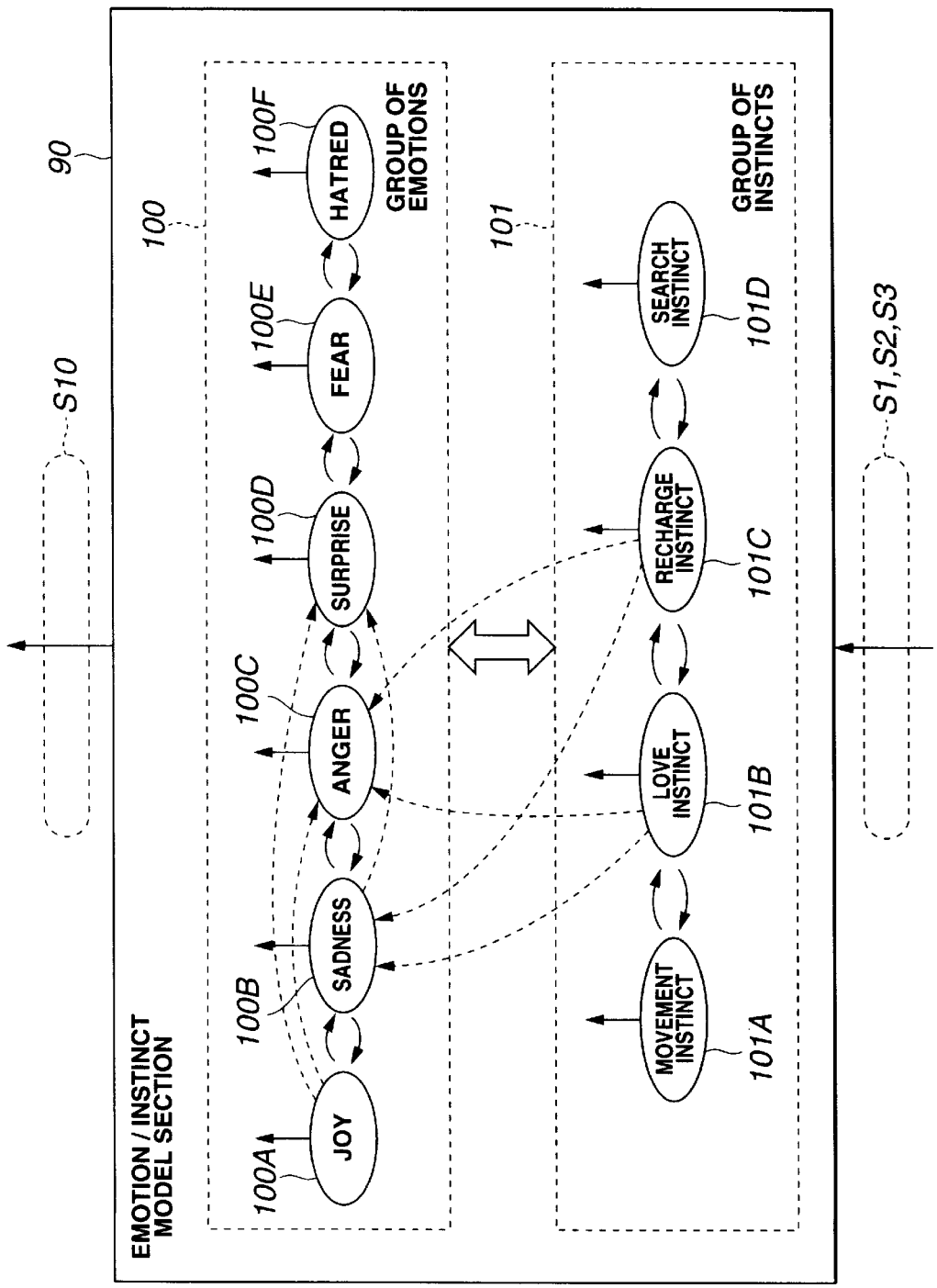
FIG. 9 is a block diagram showing the structure of an emotion/instinct model section.

The emotion/instinct model section 90 generally has a group of emotions 100 constituting the emotion model, and a group of instincts 101 constituting the instinct model prepared as a model with different attributes from those of the emotion model, as shown in FIG. 9.

In this case, the emotion model is a model which is constituted by emotion parameters having certain values and adapted for expressing the emotion prescribed for the robot device by means of a motion corresponding to the values of the emotion parameters.

The emotion parameters have their values increased or decreased mainly in accordance with an external input signal (circumferential information or external element) indicating "being slapped" or "being scolded" detected by a sensor like a pressure sensor or a visual sensor. Of course, in some cases, the emotion parameters may be changed in accordance with an internal input signal (internal information or internal element) such as the remaining capacity of the battery or the temperature within the body. Also, the emotion parameters are changed simply with the lapse of time.

The instinct model is a model which is constituted by instinct parameters having certain values and adapted for expressing the instinct (desire) prescribed for the robot device by means of a motion corresponding to the values of the instinct parameters. The instinct parameters have their values increased or decreased mainly in accordance with an internal input signal indicating "I want to move" based on the action record or "I need recharge (I'm hungry)" based on the remaining capacity of the battery. Of course, similar to the emotion parameters, the instinct parameters may be changed in accordance with an external input signal. Also, the instinct parameters are changed simply with the lapse of time.

The emotion model and the instinct model are constituted by a plurality of types of models having the same attributes, respectively. Specifically, the group of emotions 100 has emotion units 100A to 100F as independent emotion models having the same attribute, and the group of instincts 101 has instinct units 101A to 101D as independent instinct models having the same attribute.

The group of emotions 100 has the emotion unit 100A expressing the emotion of "joy", the emotion unit 100B expressing the emotion of "sadness", the emotion unit 100C expressing the emotion of "anger", the emotion unit 100E expressing the emotion of "surprise", and the emotion unit 100F expressing the emotion of "hatred".

The group of instincts 101 has the instinct unit 101A expressing the "movement instinct", the instinct unit 101B expressing the "love instinct", the instinct unit 101C expressing the "recharge instinct", and the instinct unit 101D expressing the "search instinct".

With respect to the emotion units 100A to 100F, the degree of the emotion is expressed by the strength (emotion parameter) of, for example, 0 to 100, and the strength of the emotion is changed every moment on the basis of the supplied command signal S1, external information signal S2 and internal information signal S3. Thus, the emotion/instinct model 90 expresses the state of the emotion of the pet-type robot 23 by combining the strengths of the emotion units 100A to 100F which are changed every moment, and thus forms a model of emotional changes along the time.

Moreover, desired emotion units affect each other to change the strength. For example, the emotion units are coupled in a mutually suppressive manner or in a mutually stimulative manner so as to affect each other, thus changing the strength.

Figure 10:
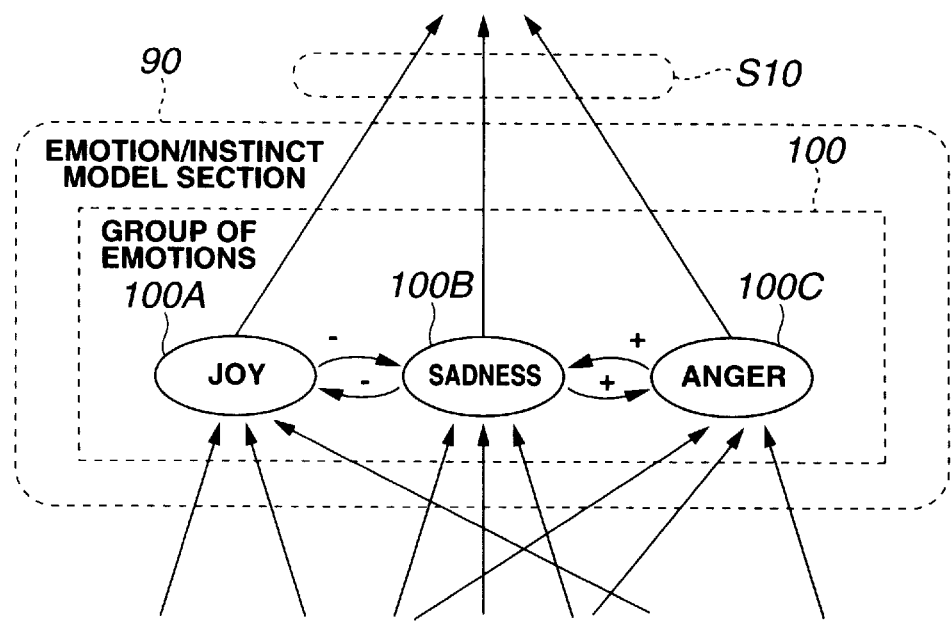
FIG. 10 is a block diagram showing a group of emotions in the emotion/instinct model section.

Specifically, as shown in FIG. 10, if the emotion unit 100A of "joy" and the emotion unit 100B of "sadness" are coupled in a mutually suppressive manner, when the pet-type robot is praised by the user, the strength of the emotion unit 100A of "joy" is increased, and the strength of the emotion unit 100B of "sadness" is reduced in accordance with the increase in the strength of the emotion unit 100A of "joy" even though the input information S1 to S3 for changing the strength of the emotion unit 100B of "sadness" is not supplied. Similarly, when the strength of the emotion unit 100B of "sadness" is increased, the strength of the emotion unit 100A of "joy" is reduced in accordance with the increase in the strength of the emotion unit 100B of "sadness".

If the emotion unit 100B of "sadness" and the emotion unit 100C of "anger" are coupled in a mutually stimulative manner, when the pet-type robot is slapped by the user, the strength of the emotion unit 100C of "anger" is increased, and the strength of the emotion unit 100B of "sadness" is increased in accordance with the increase in the strength of the emotion unit 100C of "anger" even though the input information S1 to S3 for changing the strength of the emotion unit 100B of "sadness" is not supplied. Similarly, when the strength of the emotion unit 100B of "sadness" is increased, the strength of the emotion unit 100C of "anger" is increased in accordance with the increase in the strength of the emotion unit 100B of "sadness".

As the desired emotion units thus affect each other to change the strength, a change of the strength of one of the coupled emotion units leads to a change of the strength of the other emotion unit, thus realizing the pet-type robot 23 having natural emotions.

With respect to the emotion units 101A to 101D, similar to the emotion units 100A to 100F, the degree of the instinct is expressed by the strength (instinct parameter) of, for example, 0 to 100, and the strength of the instinct is changed every moment on the basis of the supplied command signal S1, external information signal S2 and internal information signal S3. Thus, the emotion/instinct model 90 expresses the state of the instinct of the pet-type robot 23 by combining the strengths of the instinct units 101A to 101D which are changed every moment, and thus forms a model of instinct changes along the time.

Moreover, similar to the case of coupling the emotion units, desired instinct units affect each other to change the strength. For example, the instinct units are coupled in a mutually suppressive manner or in a mutually stimulative manner so as to affect each other, thus changing the strength. Thus, when the strength of one of the coupled instinct units is changed, the strength of the other instinct unit is changed accordingly, and the pet-type robot 23 having natural instincts is realized.

Furthermore, the units of the group of emotions 100 and the group of instincts 101 affect each other to change the strength. For example, changes of the strength of the instinct unit 101B expressing "love instinct" and the instinct unit 101C expressing "recharge instinct" of the group of instincts 101 affect changes of the strength of the emotion unit 100B expressing "sadness" and the emotion unit 100C expressing "anger" of the group of emotions 100. Thus, if the "love instinct" is satisfied, the emotion of "anger" and the emotion of "sadness" are suppressed, and if the "recharge instinct" is not satisfied, the emotion of "anger" and the emotion of "sadness" are increased. With such interaction between emotions and instincts, it is possible to express the state where emotions and instincts affect one another complicatedly.

As is described above, the emotion/instinct model section 90 changes the strength of the emotion units 100A to 100F and the instinct units 101A to 101D, using the input information S1 to S3 consisting of the command signal S1, the external information signal S2 and the internal information signal S3, or the interaction between the emotion units of the group of emotions 100, the interaction between the instinct units of the group of instincts 101, and the interaction between the units of the group of emotions 100 and the group of instincts 101.

The emotion/instinct model section 90 decides the state of the emotion by combining the changed strengths of the emotion units 100A to 100F, and decides the state of the instinct by combining the changed strengths of the instinct units 101A to 101D. The emotion/instinct model section 90 then sends the decided state of the emotion and the decided state of the instinct as emotion/instinct state information S10 to the action decision mechanism section 91.

The emotion/instinct model section 90 is supplied with action information S12 indicating the contents of the current or past action of the pet-type robot 23 itself from the action decision mechanism section 91 on the subsequent stage. For example, in the case where an action of walking is decided by the action decision mechanism section 91, which will be described later, the action information S12 indicating that the pet-type robot "has walked for a long time" is supplied.

By thus feeding back the action information S12, different emotion/instinct state information S10 can be generated in accordance with the action of the pet-type robot 23 indicated by the action information S12, even though the same input information S1 to S3 is provided. Specifically, with the following structure, the action information S12 that is fed back is referred to in deciding the state of the emotion and the state of the instinct.

Figure 11:
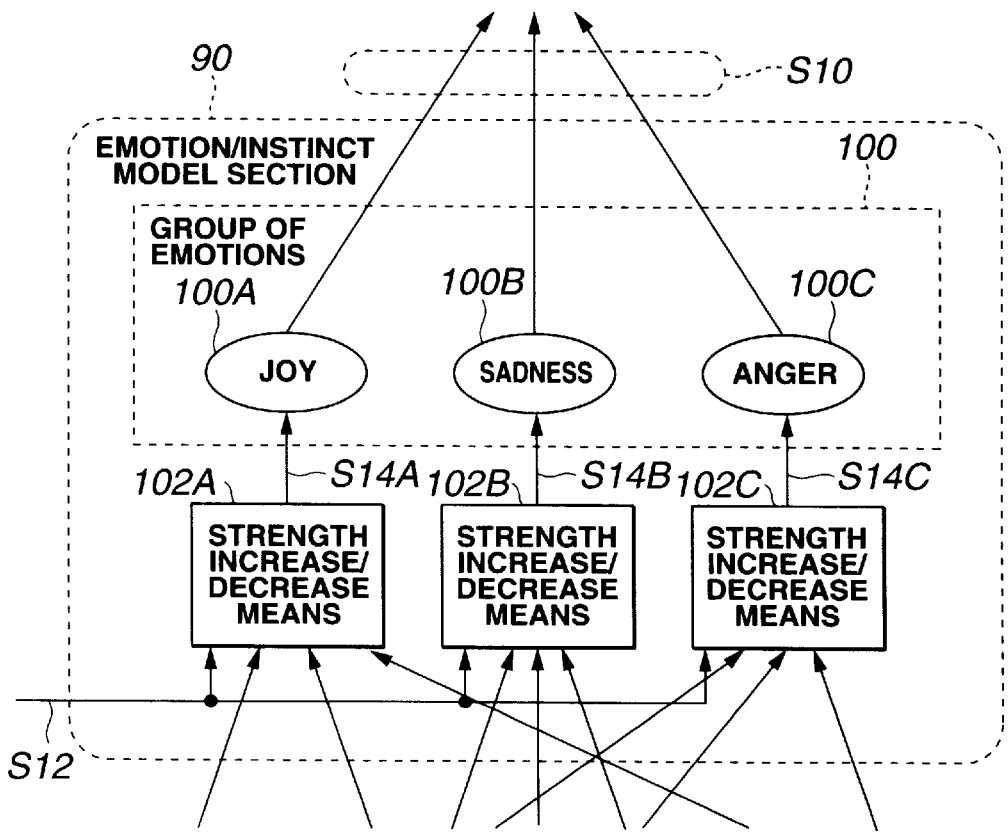
FIG. 11 is a block diagram showing the structure of an emotion/instinct model section having strength increasing/decreasing means.

As shown in FIG. 11, in the emotion/instinct model section 90, strength increase/decrease means 102A to 102C for generating strength information S14A to S14C for increasing/decreasing the strengths of the emotion units 100A to 100C on the basis of the action information S12 indicating the action of the pet-type robot 23 and the input information S1 to S3 are provided on the stage prior to the emotion units 100A to 100C, and the strengths of the emotion units 100A to 100C are increased/decreased in accordance with the strength information S14A to S14C outputted from the strength increase/decrease means 102A to 102C.

For example, when the pet-type robot greets the user and is patted on the head by the user, that is, when the action information S12 indicating that the pet-type robot has greeted and the input information S1 to S3 indicating that the pet-type robot is patted on the head are supplied to the strength increase/decrease means 102A, the emotion/instinct model section 90 increases the strength of the emotion unit 100A of "joy". On the other hand, when the pet-type robot which is carrying out a certain task is patted on the head, that is, when the action information S12 indicating that the pet-type robot is carrying out a task and the input information S1 to S3 indicating that the pet-type robot is patted on the head are supplied to the strength increase/decrease means 102A, the emotion/instinct model section 90 does not change the strength of the emotion unit 100A of "joy". The strength increase/decrease means 102A is constituted, for example, as a function or a table for generating the strength information S14A to S14C on the basis of the action information S12 and the input information S1 to S3. The other strength increase/decrease means 102B and 102C are similarly constituted.

Thus, since the emotion/instinct model section 90 has the strength increase/decrease means 102A to 102C and decides the strengths of the emotion units 100A to 100C with reference to not only the input information S1 to S3 but also the action information S12 indicating the current or past action of the pet-type robot 23, it is possible to avoid occurrence of an unnatural emotion such that the strength of the emotion unit 100A of "joy" is increased when the user pats the pet-type robot on the head with a mischievous intention while the pet-type robot is carrying out a certain task. Similarly, the emotion/instinct model section 90 also increases or decreases the strengths of the instinct units 101A to 101C on the basis of the input information S1 to S3 and the action information S12 supplied thereto.

In the present embodiment, the strength increase/decrease means 102A to 102C are provided for the emotion units 100A to 100C of "joy", "sadness" and "anger". However, it is a matter of course that the present invention is not limited to such a structure and that strength increase/decrease means can also be provided for the other emotion units 100D to 100F of "surprise", "fear" and "hatred".

As is described above, when the input information S1 to S3 and the action information S12 are inputted, the strength increase/decrease means 102A to 102C generate and output the strength information S14A to S14C in accordance with a predetermined parameter. Therefore, by varying the value the parameter for each pet-type robot 23, the individuality such as being quick-tempered or cheerful can be provided for the robot.

The processing at the action decision mechanism section 91 will now be described. Specifically, the action decision mechanism section 91 decides the next motion (action) on the basis of various types of information in cooperation with a selection module 94 shown in FIG. 12. The action decision mechanism section 91 is supplied with information S14 consisting of the command signal S1, the external information signal S2, the internal information signal S3, the emotion/instinct state information S10 and the action information S12, as shown in FIG. 8, and decides the next motion (action) on the basis of this information S14.

Figure 12:
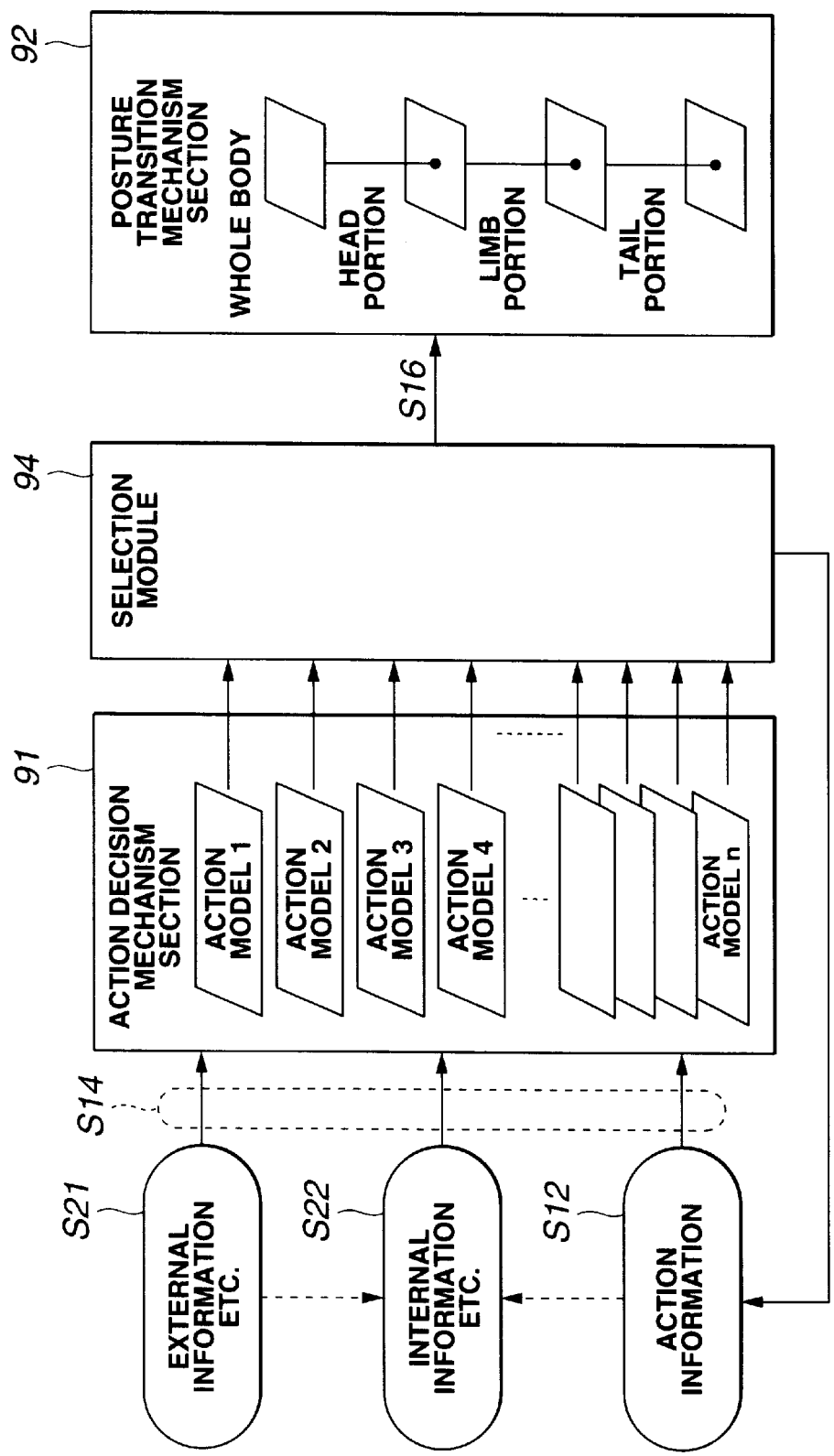
FIG. 12 is a block diagram showing the structure of an action decision mechanism section and the like used for explaining generation of action command information.

The action decision mechanism section 91 holds a plurality of action models such as "the first action model (action model 1)", "the second action model (action model 2)", "the third action model (action model 3)", "the fourth action model (action model 4)", ..., "the n-th action model (action model n, where n is an integer)", as shown in FIG. 12. For example, the action models are models for deciding the action in each scene such as "the case where the remaining capacity of the battery is reduced", "the case of recovering from falling", "the case of avoiding an obstacle", and "the case where a ball is detected". That is, when certain information is inputted, an action model (or a plurality of action models) specified for the input information reacts to it and the action model that has thus reacted decides the next action.

Then, the results of decision by the first to n-th action models on the basis of the information S14 are outputted to selection module 94.

Figure 13:
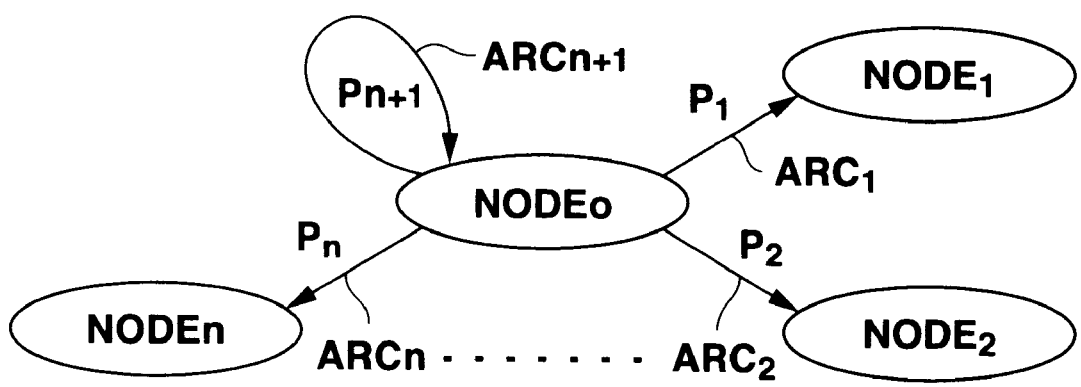
FIG. 13 shows the state transition of a finite probability automaton of an action model.

As a technique for deciding the next action, the first to n-th action models use an algorithm which is called a finite probability automaton for deciding the transition that should be made from one node (state) NODE0 to NODEn to another node NODE0 to NODEn as shown in FIG. 13 in terms of the probability on the basis of the transition probabilities P1 to Pn set for arcs ARC1 to ARCn connecting the respective nodes NODE0 to NODEn.

Specifically, the first to n-th action models have a state transition table 95 as shown in FIG. 14 for each of the nodes NODE0 to NODEn, corresponding to the node NODE0 to NODEn constituting the action models themselves.

In the state transition table 95, input events (recognition result) as the transition conditions in the nodes NODE0 to NODEn are listed in a preferential order in the row of "name of input event", and further conditions with respect to the transition conditions are described in the columns corresponding to the rows of "name of data" and "range of data".

In the node NODE100 shown in the state transition table 95 of FIG. 14, the conditions for transition to another node include that when the recognition result (information S14) to the effect that "a ball is detected (BALL)" is provided, the "size (SIZE)" of the ball provided together with the recognition result or as the recognition result is within the range of "0 to 1000", or that when the recognition result to the effect that "an obstacle is detected (OBSTACLE)" is provided, the "distance (DISTANCE)" to the obstacle provided together with the recognition result is within the range of "0 to 100".

In this node NODE100, the node as the destination of transition is selected also with reference to whether the strength of a desired unit exceeds a predetermined threshold value or not, of the strengths of the emotion units 100A to 100F and the instinct units 101A to 101D indicated by the emotion/instinct state information S10 supplied as the recognition result (information S14) from the emotion/instinct model section 90. Thus, even when the same command signal S1 is inputted, transition to different nodes is made depending on the strengths of the emotion units 100A to 100F and the instinct units 101A to 101D.

In this node NODE100, even in the case where there is no input of the recognition result (information S14), transition to another node can be made when the parameter value of any of "joy (JOY)", "surprise (SURPRISE)" and "sadness (SADNESS)" held by the emotion models is within the range of "50 to 100", of the parameter values of the emotions and instincts held by the emotion/instinct model section 90.

In the state transition table 95, the names of nodes to which transition from the node NODE0 to NODEn can be made are listed in the column of "transition destination node" in the section of "probability of transition to another node", and the probabilities of transition to another node NODE0 to NODEn that can be made when all the conditions described in the rows of "name of input event", "name of data" and "range of data" are met are described in the corresponding spaces within the section of "probability of transition to another node". Also, the actions to be outputted in transition to the nodes NODE0 to NODEn are described in the row of "output action" in the section of "probability of transition to another node". The sum of the probabilities described in the respective rows in the section of "probability of transition to another node" is 100 [%]. The probability of transition may be changed. For example, the probability of transition is changed by the learning function. Thus, the pet-type robot 23 changes the probability of transition in accordance with the result of learning and therefore obtains individuality with respect to the decision of the action. For example, the probability of transition, which is the characteristic of the pet-type robot 23, is stored as the pet characteristic information into the individual information storage section 1 (IC card 21).

In the node NODE100 shown in the state transition table 95 of FIG. 14, for example, when the recognition result (information S14) to the effect that "the ball is detected (BALL)" and that the "size (SIZE)" of the ball is within the range of "0 to 100" is provided, transition to "node NODE120 (node 120)" can be made with the probability of "30%", and then the action of "ACTION1" is outputted.

With such action models, for example, when it is detected on the basis of the supplied external information S2 that the palm is presented in front of the pet-type robot, and it is detected on the basis of the emotion/instinct state information S10 that the strength of the motion unit 100C of "anger" is not higher than a predetermined threshold value, and it is detected on the basis of the internal information signal S3 that "the pet-type robot is not hungry", that is, the voltage of the battery is not lower than a predetermined threshold value, the action for making the motion of "giving the paw" is decided in response to the presentation of the palm in front of the pet-type robot.

On the other hand, when it is detected that the palm is presented in front of the pet-type robot, and that the strength of the emotion unit 100C of "anger" is not higher than the predetermined threshold value, and that "the pet-type robot is hungry", that is, the voltage of the battery is less than the predetermined threshold value, the action for making the motion of "licking the palm" is decided.

Alternatively, when it is detected that the palm is presented in front of the pet-type robot, and that the strength of the emotion unit 100C of "anger" is equal to or higher than the predetermined threshold value, the action of making the motion of "turning away" is decided irrespective of whether "the pet-type robot is not hungry", that is, whether the voltage of the battery is not lower than the predetermined threshold value.

The first to n-th action models are constituted in such a manner that a number of nodes NODE0 to NODEn described as the state transition table 95 are connected. Thus, when the recognition result (information S14) is provided, the next action is decided in terms of the probability by using the state transition table of the corresponding node NODE0 to NODEn, and the result of decision is outputted to the selection module 94.

The selection module 94 selects the action outputted from the action model of the predetermined high priority, of the actions outputted from the first to n-th action models, and outputs the information of the selected action as action command information S16 to the posture transition mechanism section 92. For example, the action models described on the lower side in FIG. 12 are of higher priority.

The selection module 94 also outputs the result of selection as the action information S12 to the emotion/instinct model section 90 and the action decision mechanism section 91. For example, the selection module 94 raises a flag on the decided action and outputs its information as the action information S12 and the action command information S16 to the action decision mechanism section 91 and the posture transition mechanism section 92.

The action decision mechanism section 91 decides the action on the basis of the action information S12 as well as the external information (the command signal S1 and the external information signal S2) S21 and the internal information (the internal information signal S3 and the emotion/instinct state information S10) S22, and thus can decide the next action in consideration of the previous action.

The emotion/instinct model section 90 changes the state of the emotion and the state of the instinct on the basis of the action information S12 as well as the same information S1 to S3 (consisting of the command signal S1, the external information S2 and the internal information signal S3) as described above. Thus, the emotion/instinct model section 90 can generate different emotion/instinct state information S10 even when the same information S1 to S3 is provided, as described above.

Since the contents of the information S1 to S3 vary in accordance with the timing of being inputted to the emotion/instinct model section 90 and the action decision mechanism section 91, the information S1 to S3 is inputted to both the emotion/instinct model section 90 and the action decision mechanism section 91.

For example, when the external information signal S2 to the effect that "the pet-type robot is patted on the head" is supplied, the controller 82 causes the emotion/instinct model section 90 to generate the emotion/instinct state information S10 indicating "joy" and to supply this emotion/instinct state information S10 to the action decision mechanism section 91. In this state, if the external information signal S2 indicating that "the palm is in front of the pet-type robot" is supplied, the action decision mechanism 91 decides the action of "giving the paw with joy" on the basis of the emotion/instinct state information S10 indicating "joy" and the external information signal S2 to the effect that "the palm is in front of the pet-type robot".

By the above-described various types of means, the action command information S16 is decided by the action decision mechanism section 91 and the selection module 94, that is, the action is decided as a concept. The decided action information command information S16 is inputted to the posture transition mechanism section 92.

The posture transition mechanism section 92 generates information for shifting to the target posture or the target motion.

As described above, the pet-type robot 23 causes the action decision mechanism section 91 to decide the next action to be taken. However, the current action and the next action are not necessarily realized in the same posture or motion. That is, there is considered a case where the current action is realized in a "lying posture" and where the next action is realized in a "standing posture". In such a case, the transition from the "lying posture" to the "standing posture" must be made in order to carry out the next action. The posture transition mechanism section 92 is adapted for carrying out such transition of the posture or motion.

Specifically, the posture transition mechanism section 92 generates the posture transition information S18 for shifting the current posture or motion to the next posture or motion (the target posture or the target motion, or the posture or motion for realizing the next action) on the basis of the action command information S16 supplied from the action decision mechanism section 91, and sends the posture transition information S18 to the control mechanism section 93, as shown in FIG. 8. For example, the posture to which transition can be made from the current posture is decided in accordance with the physical shape of the pet-type robot 23 such as the shapes of the trunk and limbs, the weight and the coupling state of the respective parts, and the mechanism of the actuators 78A to 78N for the directions and angles of bending of the joints. The posture transition information S18 is the information for realizing transition in consideration of such shape and mechanism.

On the basis of the posture transition information S18 thus sent from the posture transition mechanism section 92, the control mechanism section 93 actually operates the pet-type robot 23.

The posture transition mechanism section 92 has registered therein in advance the posture to which transition can be made by the pet-type robot 23 and the motion in making the transition, and holds such information as a graph. The posture transition mechanism section 92 sends the action command information S16, supplied from the action decision mechanism section 91, to the control mechanism section 83 as the posture transition information S18. The control mechanism section 93 operates in accordance with the posture transition information S18 so as to shift to the target posture or the target motion. The processing at the posture transition mechanism section 92 will now be described in detail.

For example, there is a case where the pet-type robot 23 cannot directly shift to the posture in accordance with the contents of the command (action command information S16). The postures of the pet-type robot 23 are classified into postures to which direct transition can be made from the current posture, and postures to which transition can be made not directly but via a certain motion or posture.

The quadrupedal pet-type robot 23 can directly shift from the sprawling state to the state of getting down, but cannot directly shift to the standing posture and needs to make two stages of motions, that is, drawing the limbs back toward the trunk so as to take the lying posture and then standing up. There is also a posture that cannot be taken safely. For example, the quadrupedal pet-type robot 23 will fall down if it tries to raise the forelimbs up in the standing posture. Alternatively, when a command having the contents of "fluttering the limbs", which can be done only in the sitting posture, is sent in the case where the current posture is the sprawling posture (or lying posture), the transition from the lying posture to the sitting posture and the motion of fluttering the limbs are carried out and the pet-type robot 23 may lose its balance and fall down.

Therefore, when the action command information S16 supplied from the action decision mechanism section 91 indicates the posture to which direct transition can be made, the posture transition mechanism section 92 sends the action command information S16 as it is, as the posture transition information S18 to the control mechanism section 93. On the other hand, when the action command information S16 indicates the posture to which direct transition cannot be made, the posture transition mechanism section 92 generates the posture transition information S18 for shifting to the target posture (posture instructed by the action command information S16) via another posture or motion that can be taken, and sends this posture transition information S18 to the control mechanism section 93. Thus, the pet-type robot 23 can avoid any impossible attempt to take a posture to which transition cannot be made or any risk of falling down. Also, the preparation of a plurality of motions to reach the target posture or motion leads to the abundance of expressions.

The pet-type robot 23 is adapted for representing the action of the electronic pet in the real world. Thus, it is essential to consider the current posture or the like when making transition to the target motion or posture, as described above. It is also essential to consider the conflict of resources, which will be described later. Meanwhile, such consideration is not required in the virtual electronic pet device 22 adapted for representing the action of the electronic pet in the virtual world (on the screen).

Specifically, the posture transition mechanism section 92 holds a graph having registered therein the posture and motion that can be taken by the pet-type robot 23 and constituted by the posture and the motion for shifting the posture. The posture transition mechanism section 92 then searches for a path from the current posture to the target posture or the target motion on the graph on the basis of the action command information S16 as the command information, and causes the pet-type robot to move in accordance with the search result, thus shifting from the current posture to the target posture or the target motion. That is, the posture transition mechanism section 92 registers in advance the postures that can be taken by the pet-type robot 23, and also records the connection between two postures which allow transition. The posture transition mechanism section 92 thus makes transition to the target posture or motion on the basis of the graph and the action command information S16 outputted from the action decision mechanism section 91.

Figure 15:
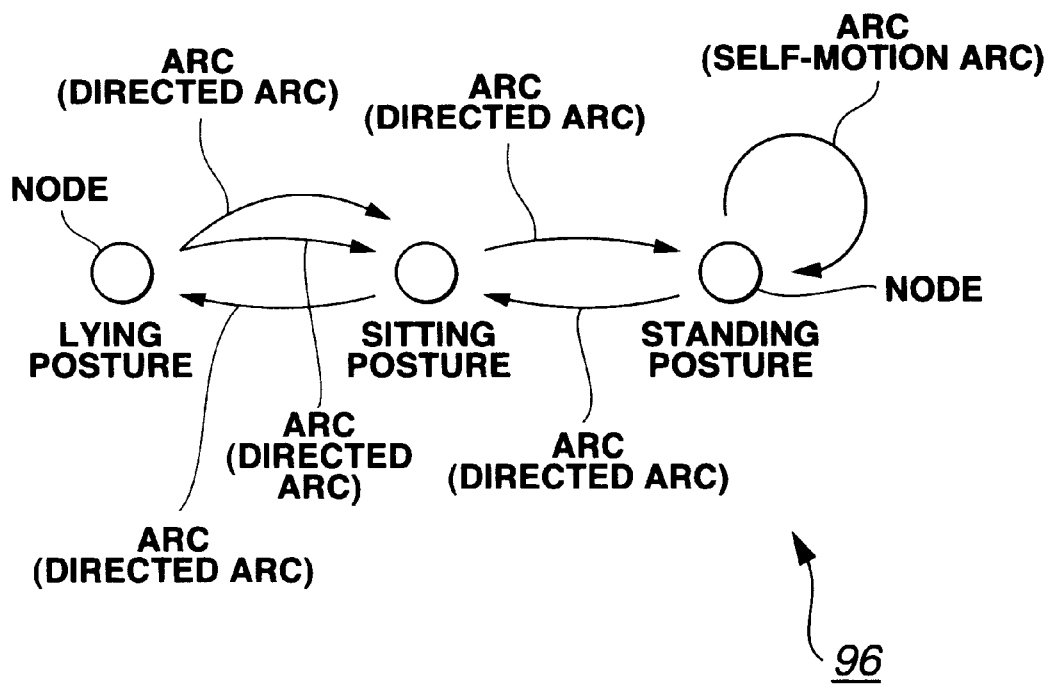
FIG. 15 shows a graph of posture transition in a posture transition mechanism section.

Specifically, as the above-described graph, the posture transition mechanism section 92 uses an algorithm called a directed graph 96 as shown in FIG. 15. The directed graph 96 is constituted by coupling a node indicating the posture that can be taken by the pet-type robot 23, a directed arc (motion arc) for connecting two postures (nodes) which allow transition, and depending on the case, a motion arc for returning from one node to this one node, that is, a self-motion arc indicating the motion completed within one node. That is, the posture transition mechanism section 92 holds the directed graph 96 constituted by the node as the information indicating the posture (standstill posture) of the pet-type robot 23, and the directed arc and the self-motion arc as the information indicating the motion of the pet-type robot 23. The posture transition mechanism section 92 then regards the posture as point information and regards the information of the motion (or action) as directed line information.

In this case, there may be a plurality of directed arcs or self-motion arcs. That is, a plurality of arcs may be provided between the nodes (postures) which allow transition, and a plurality of self-motion arcs may be coupled in one node.

When the action command information S16 is supplied from the action decision mechanism section 91, the posture transition mechanism section 92 searches for a path from the current node to the next node along the direction of the directed arc so as to connect the node corresponding to the current posture and the node corresponding to the next posture to be taken indicated by the action command information S16, and sequentially records the nodes located on the path thus searched for, thereby making the plan of posture transition. Hereinafter, the search for the target node (node instructed by the command) or the target arc (arc instructed by the command) from the current posture is referred to as path search. In this case, the target arc may be a directed arc or may be a self-motion arc. For example, in the case where a self-motion arc is the target arc, a self-motion is the target (instructed), that is, for example, a predetermined performance (motion) is instructed.

On the basis of the posture transition plan to reach the target posture (node) or the target motion (directed arc or self-motion arc) obtained by path search, the posture transition mechanism section 92 outputs a control command (posture transition information S18) for transition to the control mechanism section 93 on the subsequent stage.

Figure 16:
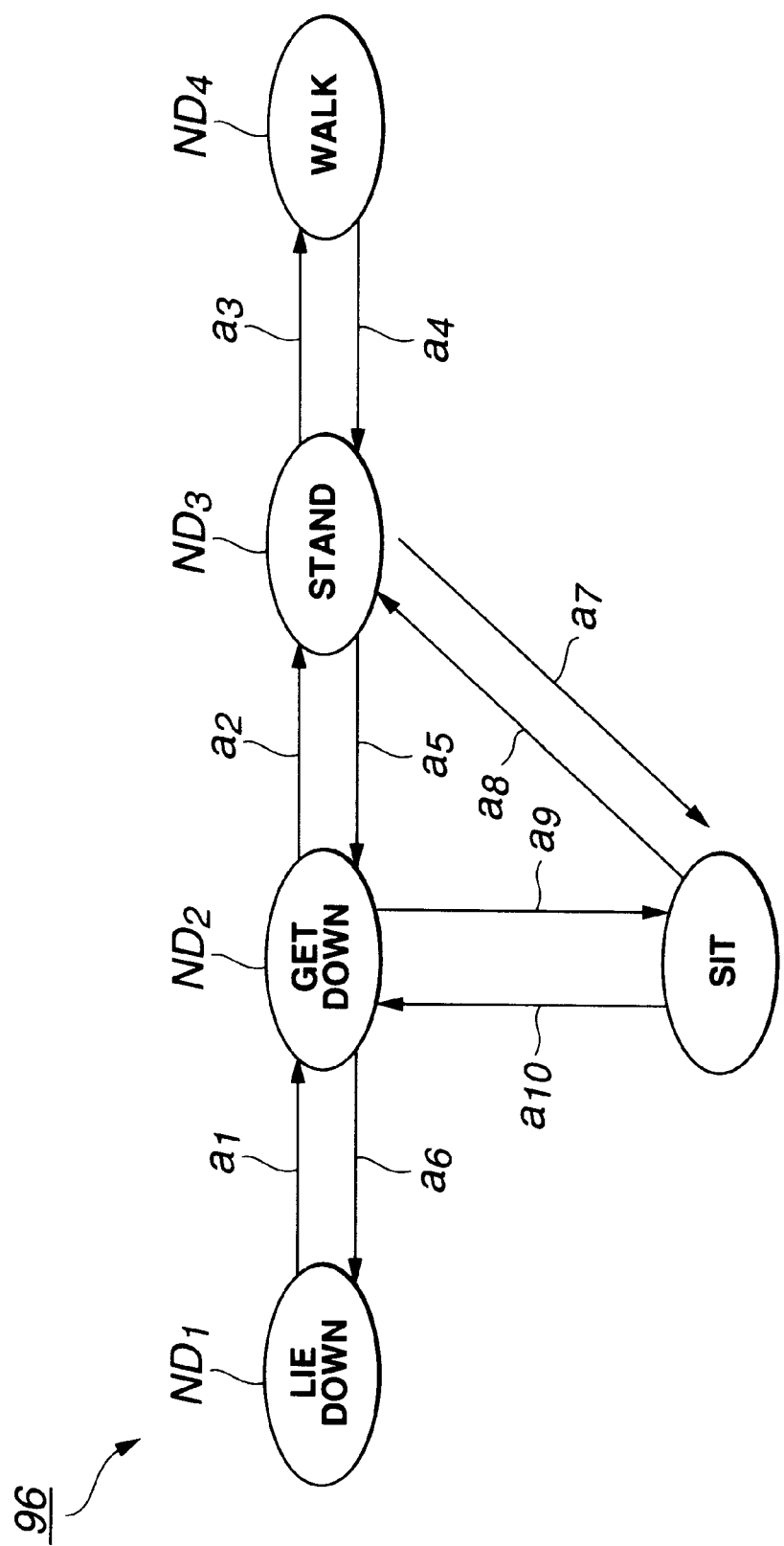
FIG. 16 shows a specific example of the posture transition graph.

For example, as shown in FIG. 16, when the action command information S16 representing "Sit" is supplied in the case where the current posture is at the node DN2 indicating the posture of "getting down", direct transition from the node ND2 indicating the posture of "getting down" to the node ND5 indicating the posture of "sitting" is possible since the directed arc a9 exists from the node ND2 to the node ND5. Thus, the posture transition mechanism section 92 provides the posture transition information S18 having the contents of "Sit" to the control mechanism section 93.

On the other hand, when the action command information S16 representing "Walk" is supplied in the case where the current posture is at the node ND2 indicating the posture of "getting down", since direct transition from "getting down" to "walking" is not possible, a posture transition plan is made by searching for a path to reach the node ND4 indicating the posture of "walking" from the node ND2 indicating the posture of "getting down". That is, a posture transition plan is made such as to select the node ND3 indicating the posture of "standing" via the directed arc a2 from the node ND2 indicating the posture of "getting down" and then to reach the node ND4 indicating the posture of "walking" via the directed arc a3 from the node ND3 indicating the posture of "standing". As a result of such a posture transition plan, the posture transition mechanism section 92 outputs the posture transition information S18 having the contents of "Stand" and then outputs the posture transition information S18 having the contents of "Walk", to the control mechanism section 93.

Figure 17:
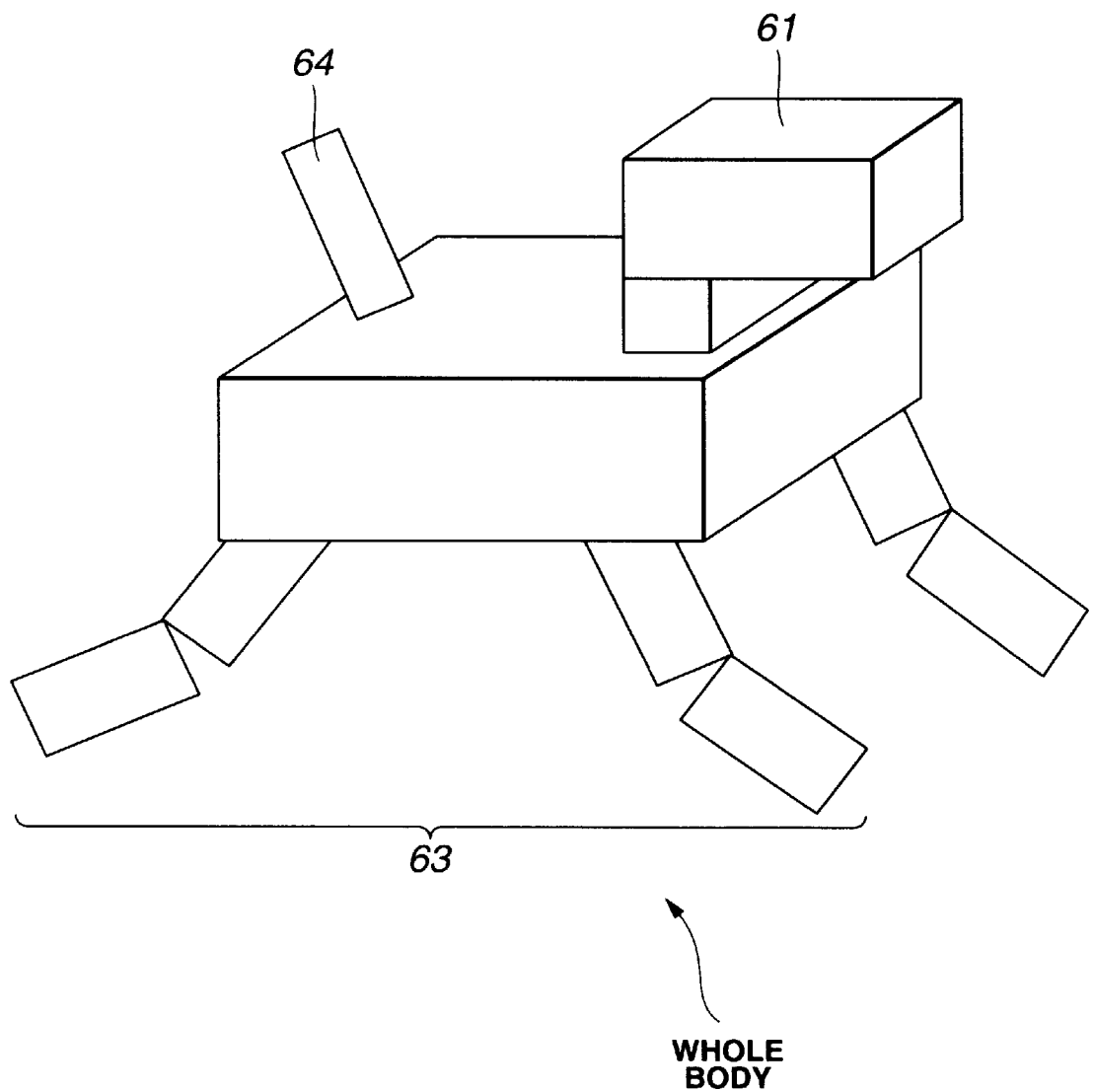
FIG. 17 is a perspective view showing the schematic structure of a pet-type robot.

The pet-type robot 23 is capable of separately operating the individual constituent parts. That is, commands can be executed with respect to each of the constituent parts. Such constituent parts of the robot device 1 (whole body) may be generally the head portion 61, the limb portions 63, and the tail portion 64, as shown in FIG. 17.

In the pet-type robot 23 thus constituted, the tail portion 64 and the head portion 61 can be operated separately. That is, these portions can be operated separately since there is no conflict of resources. On the other hand, the whole body of the pet-type robot 23 and the head portion 61 cannot be operated separately. That is, the whole body and the head portion cannot be operated separately since there is a conflict of resources. For example, while a command for the motion of the whole body including the motion of the head portion 61 is executed, a command for the head portion 61 cannot be executed. It is possible for the pet-type robot to wag the tail portion 64 while shaking the head portion 61, but it is impossible to shake the head portion 61 while doing a certain performance using the whole body. The occurrence of such a conflict of resources is a problem proper to the pet-type robot 23, which constitutes the electronic pet in the real world.

The following table shows exemplary combinations of parts which cause and do not cause a conflict of resources with respect to the action command information S16 sent from the action decision mechanism section 91.

| Combination of Parts | Conflict of Resources |
| --- | --- |
| Head, Tail | No |
| Head, Whole Body | Yes |
| Limbs, Whole Body | Yes |
| Head, Limbs, Tail | No |

In the case where the commands which cause a conflict of resources is thus supplied, either the command for the motion of the whole body 23 or the command for the motion of the head portion 61 must be executed preferentially. The processing for dealing with such commands will now be described.

In the case of preferentially executing one of the commands because there is a conflict of resources, for example, in the case of completing the motion of the whole body 23 and then executing the command for the head portion 61, the motion of the head portion 61 is started in the last posture which is reached as a result of the motion of the whole body 23. However, the last posture after the motion of the whole body 23 is not necessarily a posture suitable for starting a motion such as shaking the head portion 61. If the motion of the head portion 61 is started when the last posture after the motion of the whole body 23 is not a posture suitable for starting the motion of the head portion 61, that is, when the postures between which transition is made are discontinuous due to the different commands, the head portion 61 may move abruptly, thus generating an unnatural motion. This problem is caused in the case where the transition from the current posture (or motion) to the target posture (or motion) extends over the whole body and the individual constituent parts of the pet-type robot 23 and where a network (graph) including the node and arc constituted for controlling the whole body of the pet-type robot 23 and networks (graphs) including the node and arc constituted for controlling the individual constituent parts of the pet-type robot 23 are separately constituted without having any relation with each other.

The unnatural motion, generated by the pet-type robot 23 due to the discontinuity of the postures between which transition is made, is eliminated by making a posture transition plan so as to smoothly connecting the transition motions on the graph. Specifically, a basic posture shared on the graphs of the whole body and the constituent parts is employed to make the posture transition plan.

Figures 18A, 18B:
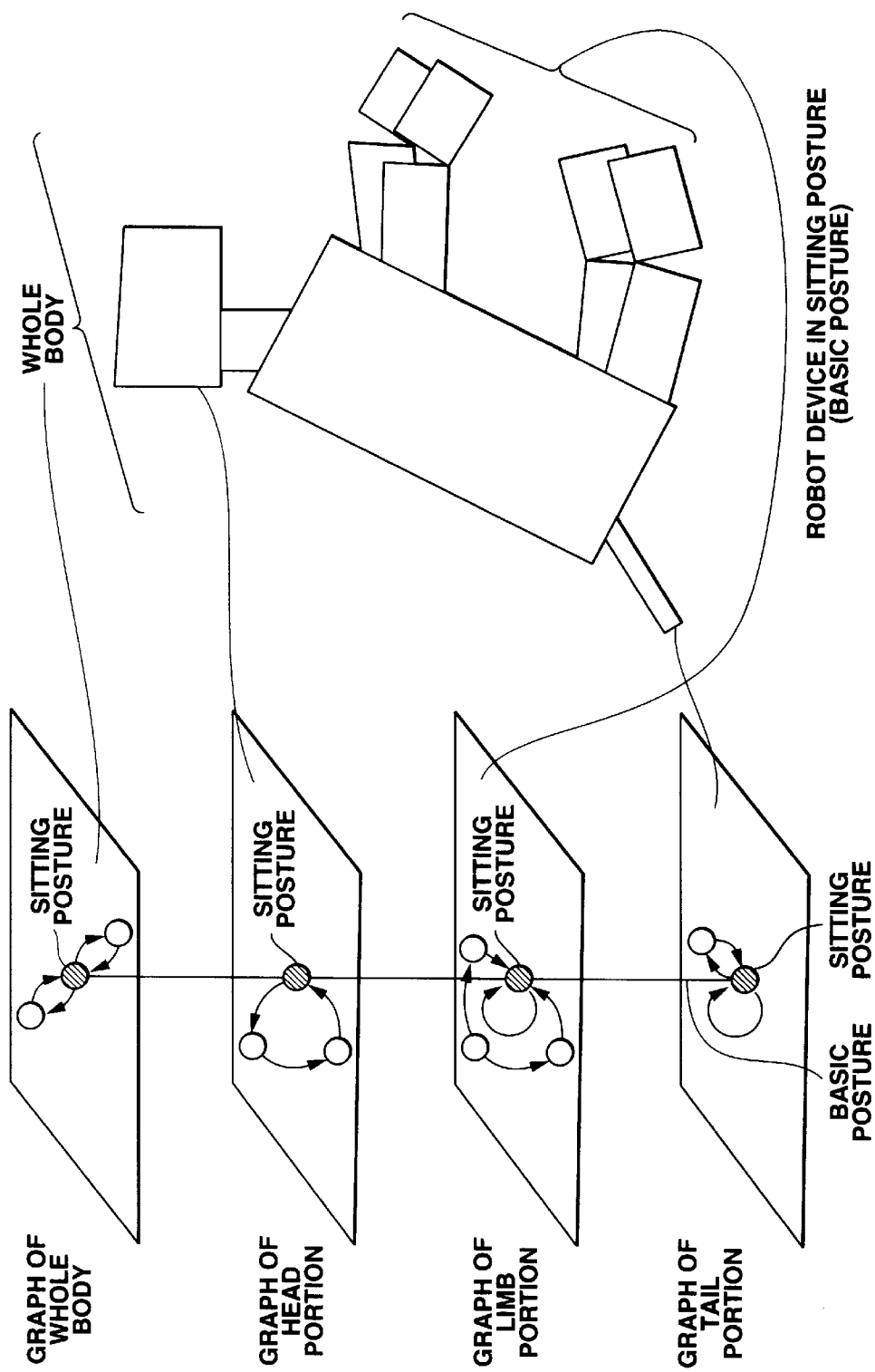
FIGS. 18A and 18B are views for explaining the transition of the posture between the entire body and respective portions on the basis of a basic posture.

Information of a network used for the posture transition plan of the pet-type robot 23 will be described hereinafter with reference to the case where it is constituted by the information (graph) of the network of the whole body and the information (graphs) of the networks of the individual constituent parts, as shown in FIG. 18A. For example, the information used for the posture transition plan consisting of the information (graph) of the network of the whole body and the information (graphs) of the networks of the individual constituent parts is constituted within the posture transition mechanism section 92, as shown in FIG. 12.

The basic posture is a posture to which transition is temporarily made in order to shift the state between the motion of the whole body and the motion of each constituent part. The basic posture may be, for example, a sitting posture as shown in FIG. 18B. The procedure for smoothly connecting the transition motions in the case where the sitting posture is employed as the basic posture will now be described.

Figure 19:
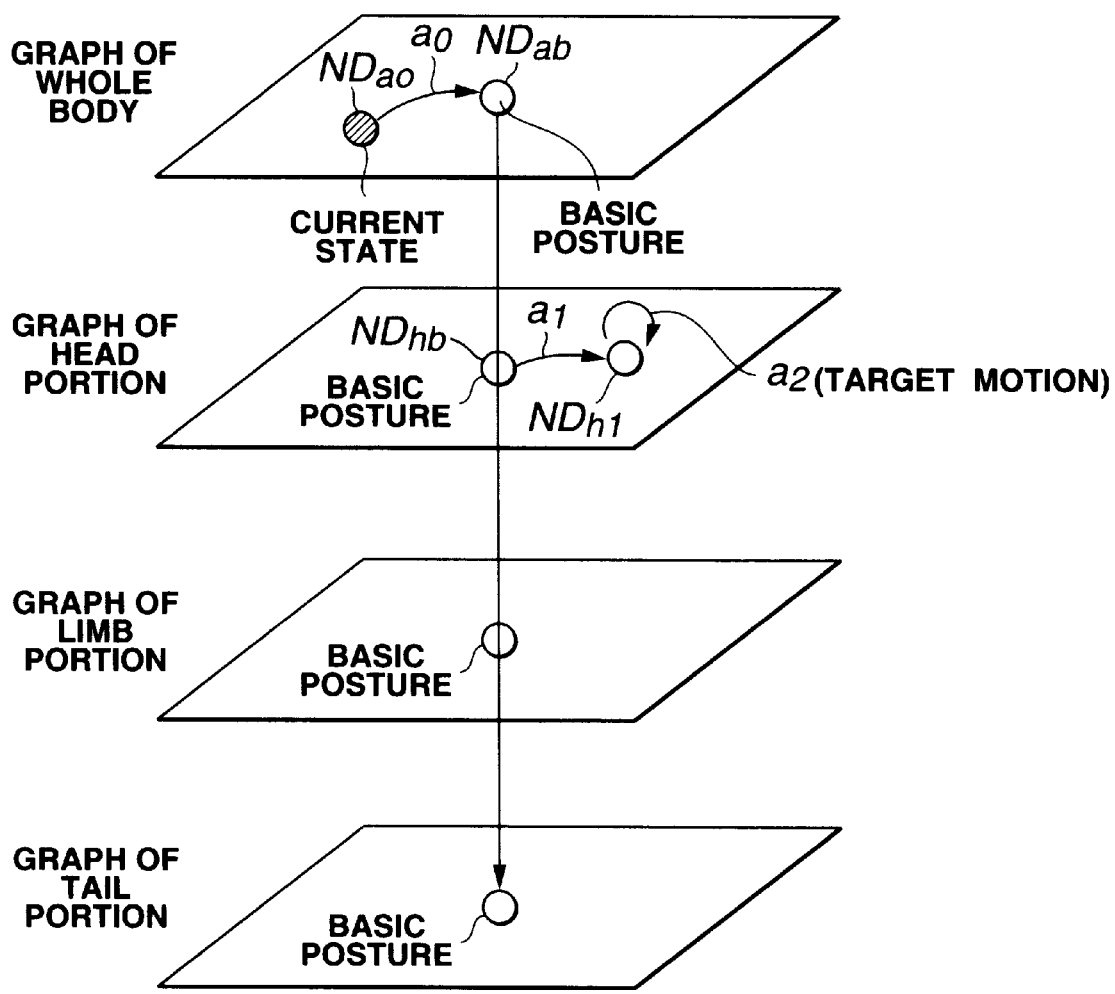
FIG. 19 is a view for explaining the execution of a target motion after temporary transition to the basic posture in the case where the current posture resides in the entire body and the target motion resides in a portion.

Specifically, it is the case where the current posture is understood as the posture NDa0 on the graph of the whole body and where a motion a2 of the head portion is to be executed as a target motion, as shown in FIG. 19.

On the graph of the whole body, a directed arc a0 for shifting the posture of the whole body of the pet-type robot 23 from the current posture NDa0 to a basic posture NDab is selected. In the case where the whole body is in the basic posture, the state (node) of the basic posture is also grasped on the graphs of the head portion, the limb portions, and the tail portion.

On the graph of the head portion, an optimum directed arc a1 from the state of a basic posture NDhb is selected, and a path to reach the target motion (self-motion arc) a2 of the head portion 61 is decided.

In accordance with such procedure, the selection of the transition path (posture transition plan) so as to smoothly connects the motions of the whole body and each constituent part is carried out on the graph of the whole body and the graph of the head portion. Then, the posture transition mechanism section 92 outputs the posture transition information S18 to the control mechanism section 93 on the basis of the posture transition plan.

Figure 20:
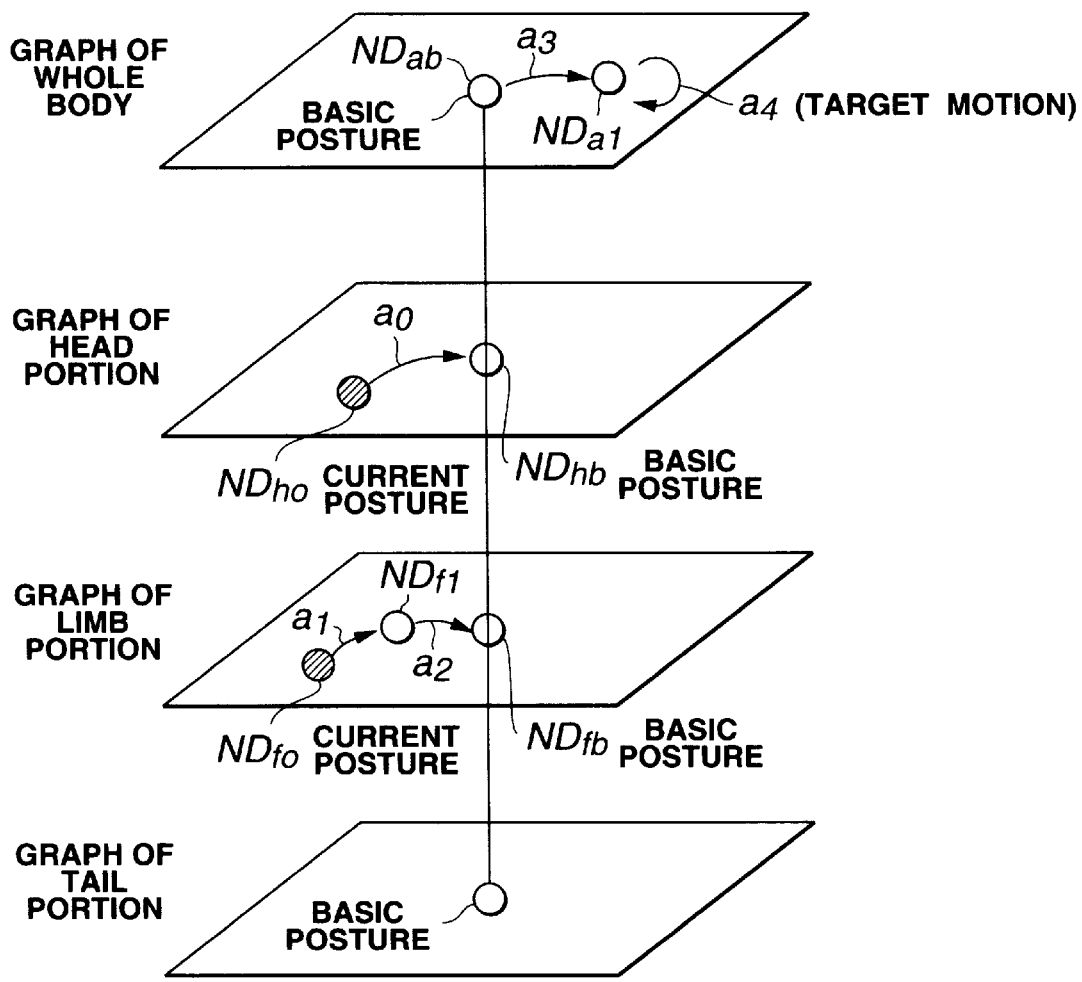
FIG. 20 is a view for explaining the execution of a target motion after temporary transition to the basic posture in the case where the current posture resides in a portion and the target motion resides in the entire body.

In the above-described example, the motions are smoothly connected the motion of the whole body to the motion of each constituent part. An example in which the motions are smoothly connected from the motion of each constituent part to the motion of the whole body will now be described. Specifically, it is the case where the posture of the head portion 61 is grasped as a posture NDh0 on the graph of the head portion while the posture of the limb portion 63 is grasped as a posture NDf0 on the graph of the limb portion and where a motion a4 of the whole body is to be executed as a target motion, as shown in FIG. 20.

On the graph of the head portion, a directed arc a0 for shifting the posture of the head portion 61 from the current posture NDh0 to a basic posture NDAB is selected. On the graph of the limb portion, directed arcs a1 and a2 for shifting the posture of the limb portion 63 from the current posture NDf0 to a basic posture NDfb via a posture NDf1 are selected. It is assumed that the tail portion 64 is originally in its basic posture. In the case where the respective constituent parts are thus in the basic postures, the basic posture is also grasped on the graph of the whole body.

On the graph of the whole body, an optimum directed arc a3 from the state of the basic posture NDhb is selected and a path to reach the target motion (self-motion arc) a4 of the whole body is decided.

For example, the motion of each constituent part may be executed simultaneously with the motion of another constituent part in the transition to the basic posture, and the motions of the respective constituent parts may be executed with some limitations. For example, certain timing for carrying out the motion may be provided.

Specifically, if a command for the motion of the whole body 23 is given while the pet-type robot is doing a certain performance with its head portion 61, transition of the head portion 61 to the basic posture NDhb cannot be made since the pet-type robot is doing a performance with the head portion 61. Therefore, the limb portion 63 is first set in the state of the basic posture NDfb and then the head portion 61 on completion of the performance is shifted to the state of the basic posture NDhb.

The individual constituent parts can also be moved in consideration of the balance of the posture of the whole body 23. For example, if the head portion 61 and the limb portion 63 are simultaneously shifted, or if the head portion 61 is first shifted to the state of the basic posture NDhb, the pet-type robot 23 loses its balance and falls down. In such a case, the limb portion 63 is first set to the state of the basic posture NDfb and then the head portion 61 is shifted to the state of the basic posture NDhb.

By thus making the posture transition plan which allows temporary transition to the basic posture, the motions can be smoothly connected.

The posture transition mechanism section 92 searches for an optimum path to the target posture or motion indicated by the command so as to make the posture transition plan on the basis of the action command information S16 sent from the action decision mechanism section 91, and outputs the posture transition information S18 to the control mechanism section 93 in accordance with the posture transition plan, as described above.

Thus, the pet-type robot 23 can avoid any impossible attempt to take a posture to which transition cannot be made or any risk of falling down. Also, the preparation of a plurality of motions to reach the target posture or motion leads to the abundance of expressions.

The control mechanism section 93 generates a control signal S5 for driving the actuators 78A to 78N on the basis of the posture transition information S18, as shown in FIG. 8, and sends the control signal S5 to the actuators 78A to 78N so as to drive the actuators 78A to 78N, thus causing the pet-type robot 23 to make a desired motion.

Specifically, in the case where the transition of the posture or motion is necessary for taking the next action, the control mechanism section 93 controls the actuators 78A to 78N on the basis of the posture transition information S18 in accordance with the posture transition plan sent from the posture transition mechanism section 92, thus shifting the pet-type robot 23 to a desired posture or motion. Then, the control mechanism section 93 controls the actuators 78A to 78N on the basis of the subsequently supplied information of the action selected by the selection module 94, thus causing the pet-type robot 23 to carry out the selected action, for example, a performance.

In the case where the transition of the posture or motion is not necessary for taking the next action, the control mechanism section 93 controls the actuators 78A to 78N on the basis of the subsequently supplied information of the action selected by the selection module 94, thus causing the pet-type robot 23 to carry out the selected action (e.g., a performance), without carrying out the transition of the posture or motion.

The specific structure of the pet-type robot 23 is described above. Such a pet-type robot 23 can change the state of the emotion and the state of the instinct using the emotion models and the instinct models on the basis of the external information (environment or external elements) or the internal information (internal elements) and can act in accordance with the state of the emotion and the state of the instinct.

Thus, since parameters corresponding to the emotion and instinct of the electronic pet are contained in the pet-type robot 23, a short-tempered electronic pet or a crybaby electronic pet can be realized. It is thus possible to cause the electronic pet to take an action in consideration of such an emotion or action, and to change the emotion in accordance with the action carried out by the electronic pet itself. Specifically, when the electronic pet is hungry and thus has the emotion of anger at a high level, it is possible to cause the electronic pet to take an action like crying or falling asleep and to sooth the increased emotion of anger in accordance with that action. Thus, an electronic pet with more reality is realized.

In the embodiment, the structure shown in FIGS. 7 and 8 is employed as the specific structure of the pet-type robot 23. However, it is a matter of course that the structure shown in FIGS. 7 and 8 can be applied to the virtual electronic pet device 22. For example, in the case where the structure is applied to the virtual electronic pet device 22, an equivalent technique is employed for inappropriate portions, thus realizing the virtual electronic pet device 22 as shown in FIGS. 7 and 8. For example, in the virtual electronic pet device 22, since the motion section (actuators 78A to 78N) is not required, it is changed to an output to the image display section, thus realizing the virtual electronic pet device 22. In the virtual electronic pet device 22, the mechanism for making the posture transition plan or for solving the conflict of resources is not required, either.

Thus, in the virtual world (on the display image), an electronic pet which changes the state of the emotion and the state of the instinct on the basis of the external or internal information and acts in accordance with the state of the emotion or the state of the instinct can be realized similarly.

In the electronic pet system, as described above, an electronic pet which stores the pet characteristic information in the individual information storage section 1 (IC card 21) and has the emotion or instinct based on the stored pet characteristic information is realized.

For example, in the case where the virtual electronic pet device 22 or the pet-type robot 23 is constituted as described above, the pet characteristic information stored in the individual information storage section 1 (IC card 21) may be the emotion parameters and the instinct parameters decided by the above-described emotion models and the instinct models. In this case, the emotion parameters and the instinct parameters are stored in the individual information storage section 1, as shown in FIG. 21.

As the pet characteristic information, the transition probability in deciding actions can also be stored in the individual information storage section 1.

As described with reference to FIG. 13, using the finite probability automaton, actions are decided in terms of the probability on the basis of the transition probabilities P1 to Pn which are set for respective arcs ARC1 to ARCn1 connecting the respective nodes NODE0 to NODEn and indicating to which node NODE0 to NODEn the transition should be made from one node (state) NODE0 to NODEn, and these transition probabilities P1 to Pn can also be stored in the individual information storage section 1. The transition probabilities P1 to Pn can be changed in accordance with the state of the emotion, the state of the instinct, or learning. Therefore, the individuality of the electronic pet can be realized by storing the transition probabilities.

The pet characteristic information stored in the individual information storage section 1 is not limited to the above-described example.

For example, the name of the electronic pet, the name of the owner (the name of the keeper (user)), the time of growth, the number of remaining metempsychoses, and the species may also be employed. The time of growth is the elapsed time from the birth of the electronic pet up to the present. The electronic pet (its soul) comes back to life after death, and the number of remaining metempsychoses is the information indicating the number of remaining times for coming back to life. Specifically, it is the number of times for reset. The species is the information indicating the kind of the electronic pet such as dogs, cats, or birds. The kind of the electronic pet need not necessarily be an existent animal.

The pet characteristic information may also be learning information. The learning information is the information related to whether the electronic pet can do a predetermined performance or not. That is, the electronic pet is enabled to learn several types of performances and the learning information indicates whether the electronic pet can do each type of performance.

In the present embodiment, since the internal information is stored on the IC card 21 that can be inserted to and ejected from the virtual electronic pet device 22 or the pet-type robot 23, the electronic pet can be enjoyed in a form suitable for the user's environment.

In the present embodiment, the IC card 21 is loaded in the virtual electronic pet device 22 or the pet-type robot 23 so as to cause the virtual electronic pet device 22 or the pet-type robot 23 to function as the electronic pet. However, the IC card 21 can also be loaded into a typical computer or the like, and it is thus possible to cause the computer to function as the electronic pet.

In the present embodiment, the present invention is described with respect to the electronic pet. However, the present invention can also be applied to other living objects than the electronic pet (e.g., plant object or the like).

Moreover, in the present embodiment, the pet characteristic information is stored on the IC card. However, as the storage means for storing the pet characteristic information, portable storage means that can be inserted to and ejected from the device can be employed, such as a memory card, an optical card, a magneto-optical disc, and a magnetic disk.

In addition, in the present embodiment, the individual information storage section 1 storing the pet characteristic information can be inserted to and ejected from the body section 2. However, it is also possible to provide a memory (built-in storage medium or storage unit) that can be inserted to and ejected from the body section 2 and to store the pet characteristic information into that memory. In this case, the individual information storage section 1 and the body section 2 transmits the pet characteristic information by using various types of communication means, for example, a communication cable, radio transmission, or infrared rays.

In the virtual electronic pet device 22, the electronic pet is a virtual existence displayed on the monitor and therefore its appearance is easily changed. However, it is difficult for the pet-type robot 23 to change its appearance. Therefore, in the pet-type robot 23, the information related to the appearance, of the pet characteristic information, is basically ignored. When the species of the pet characteristic information indicates birds in the case where the pet-type robot 23 is in the shape of a dog, it is possible to cause the pet-type robot 23 to request a change of parts for those of a bird,(for example, by means of a synthetic voice).

Figure 22:
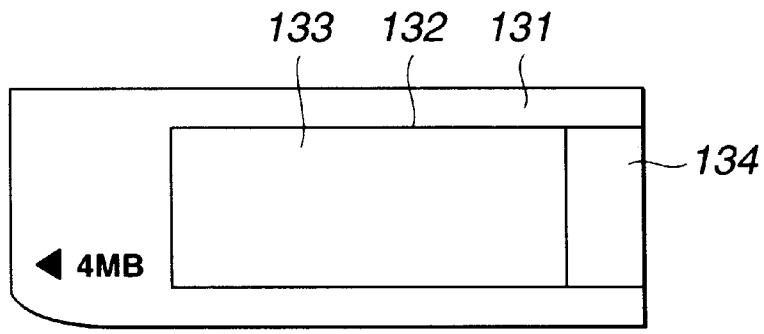
FIG. 22 is a view for explaining an IC card discriminated by color.
Figure 23:
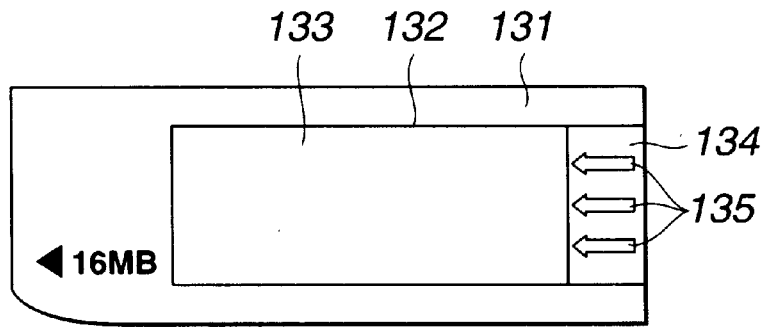
FIG. 23 is a view for explaining a stick-shaped IC card discriminated by color and having an arrow mark appended thereto.
Figure 24:
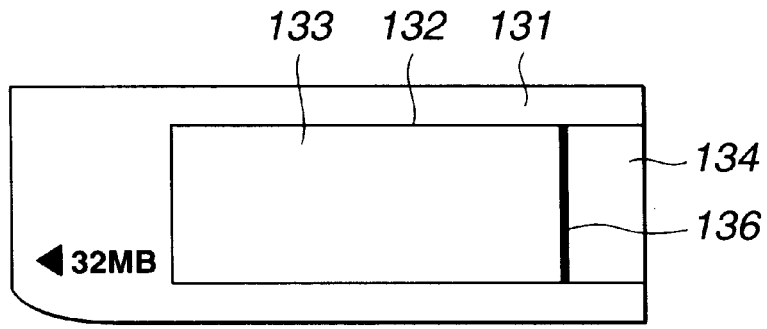
FIG. 24 is a view for explaining a stick-shaped IC card discriminated by color and having a line appended thereto indicating the boundary position.

A specific example of the IC card that can be inserted and ejected, used in the above-described first embodiment, is shown in FIGS. 22 to 24. IC cards of various shapes are currently standardized and the present invention is applicable to any of such IC cards. In the present embodiment, a stick-shaped IC card is employed, for example.

The stick-shaped IC card can be inserted and ejected, as described above. When the user inserts the stick-shaped IC card into the slot 23A of the pet-type robot 23 or the slot 22A of the virtual electronic pet device 22, the user will be at a loss for determining how deep the user can insert the IC card. That is, when loading the IC card into the slot 23A of the pet-type robot 23 or the slot 22A of the virtual electronic pet device 22, it is convenient if the user can feel the loading by a loading sound (a clicking sound or the like) or if the pet-type robot 23 or the virtual electronic pet device 22 has an IC card lock/ejection function. However, if the user cannot feel the loading or if the lock/ejection function is provided, the user might break the IC card by forcibly inserting the IC card into the slot, or cannot carry out transmission/reception of data because of insufficient insertion of the IC card.

Thus, in the present embodiment, color discrimination for indicating a predetermined insertion position is carried out on an IC card 131, as shown in FIG. 22. Specifically, as the color of a portion 134 which should be out of the slot and the color of a portion 133 which should be inserted and kept in the slot are made different (color discrimination is made), the user can visually recognize the state of the accurately loaded IC card when the IC card 131 is inserted in the slot 23A of the pet-type robot 23 or the slot 22A of the virtual electronic pet device 22. Although FIG. 22 shows an example in which color discrimination is made on a label 132 attached to the body of the IC card 131, color discrimination may also be made on the body of the IC card 131 itself. In the present invention, the colors of the portions 133 and 134 for color discrimination are not particularly limited, and arbitrary colors can be used.

Although color discrimination is made on the IC card 131 in the example of FIG. 22, it is also possible to provide an arrow mark 135 as shown in FIG. 23, together with or in place of the color discrimination on the IC card 131. FIG. 23 shows an example in which the color of a portion 134 to be out of the slot and the color of a portion 133 to be inserted and kept in the slot are made different similarly to the example of FIG. 22 and in which the arrow mark 135 is added to the portion 134 which should be out of the slot. By thus providing the arrow mark 135, the user not only can accurately load the IC card 131 into the slot but also can easily recognize the loading direction of the IC card 131. Although FIG. 23 shows the example in which color discrimination is made on the label 132 attached to the body of the IC card 131 and in which the arrow mark 135 is added to the label 132, the arrow mark 135 may also be provided on the body of the IC card 131 itself.

As a still another example, it is possible to provide a line 136 indicating the boundary position as shown in FIG. 24, together with or in place of the color discrimination. FIG. 24 shows an example in which the color of a portion 134 to be out of the slot and the color of a portion 133 to be inserted and kept in the slot are made different similarly to the example of FIG. 22 and in which the line 136 is added at the boundary position between the portion 134 to be out of the slot and the portion 133 to be kept in the slot. By thus providing the line 136, the user can accurately load the IC card 131 into the slot. Although FIG. 24 shows the example in which color discrimination is made on the label 132 attached to the body of the IC card 131 and in which the line 136 is added to the label 132, the line 136 may also be provided on the body of the IC card 131 itself.

FIG. 25 shows the state where the IC card 131 as described above is accurately loaded in the slot of the pet-type robot 23 or the virtual electronic pet device 22.

FIG. 26 shows an example of the label 132 attached to the body of the IC card 131. In the example of the label 132 shown in FIG. 26, only color discrimination is made as in the example of FIG. 22, and the color of the portion 134 to be out of the slot when the IC card 131 is inserted in the slot and the color of the portion 133 to be inserted and kept in the slot are discriminated.

FIG. 27A shows a bottom view corresponding to the plan views of the IC card 131 shown in FIGS. 22 to 24, and FIG. 27B shows a side view thereof. On this IC card 131, a terminal portion 137 connected with a data transmission/reception terminal provided in the slot 23A of the pet-type robot 23 or the slot 22A of the virtual electronic pet device 22, and a write inhibit lock 138 for inhibiting data writing are provided. The label 132 of FIG. 26 is attached in such a manner that the portion 134 to be out of the slot is turned up to cover the bottom side of the IC card 131.

A second embodiment of the present invention will now be described.

In the first embodiment, storage of the individual information storage section 1 (pet characteristic information of the electronic pet) in a storage medium such as an IC card that can be inserted and ejected is enabled, and insertion/ejection of the IC card to/from the slot 22A of the virtual electronic pet device 22 or the slot 23A of the pet-type robot 23 is enabled, thus enabling transfer of the pet characteristic information between the virtual electronic pet device 22 and the pet-type robot 23. In the second embodiment, however, transfer of the pet characteristic information is enabled by communication without using an IC card.

Figure 28:
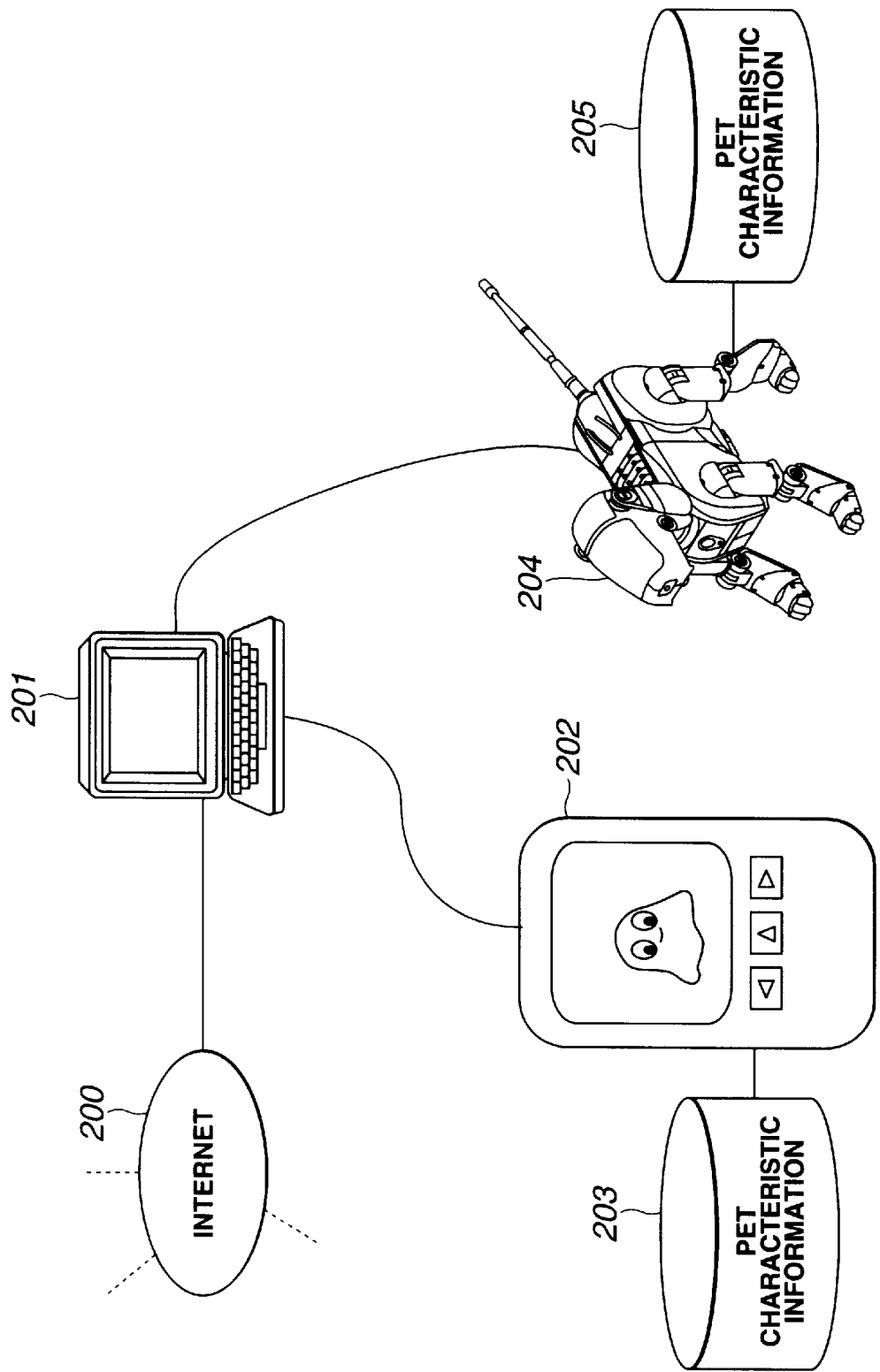
FIG. 28 shows an example of connection of a second embodiment of the present invention.

FIG. 28 shows an example of connection according to the second embodiment.

A virtual electronic pet device 202 shown in FIG. 28 is basically the same as the above-described virtual electronic pet device 22, and a pet-type robot 204 shown in FIG. 28 is basically the same as the above-described pet-type robot 23. In the second embodiment, however, both the virtual electronic pet device 202 and the pet-type robot 204 have a communication processing section which enables replacement of the pet characteristic information of the above-described individual information storage section 1 by communication. The pet characteristic information communicated via the communication processing section can be stored onto an IC card as described above and can also be stored into data storage sections 203 and 205 which are internally provided. (On FIG. 28, it is shown that they are outside of the virtual electronic pet device 202 and the pet-type robot 204, respectively, but they are actually provided therein.) In the second embodiment, the pet characteristic information is stored into the internally provided data storage sections.

In the example of connection shown in FIG. 28, the virtual electronic pet device 202 and the pet-type robot 204 are connected to a personal computer 201, and the personal computer 201 is connected a network such as the Internet 200. Meanwhile, it is also possible to directly connect the virtual electronic pet device 202 to the pet-type robot 204 without using the personal computer 201, or to directly connect them to the Internet 200 without using the personal computer 201. Moreover, in the second embodiment, it is possible to connect the virtual electronic pet devices 202 to each other or the pet-type robots 204 to each other.

The electronic pet can be expressed not only by the virtual electronic pet device 202 or the pet-type robot 204 but also on the personal computer 201. In this case, by installing an application program for realizing the above-described electronic pet on the personal computer 201 and starting the application program for the electronic pet, it becomes possible to keep the electronic pet on the personal computer 201. Therefore, also the pet characteristic information of the electronic pet is stored into the personal computer 201.

In the second embodiment, as the connection form in the case of transmitting and receiving the pet characteristic information between the virtual electronic pet device 202 and the pet-type robot 204, various forms of connection can be considered such as connection via a cable, connection via radio transmission, and connection by infrared rays. The present invention is applicable to any connection form including such connection via a cable, radio transmission, and infrared rays.

Figure 29:
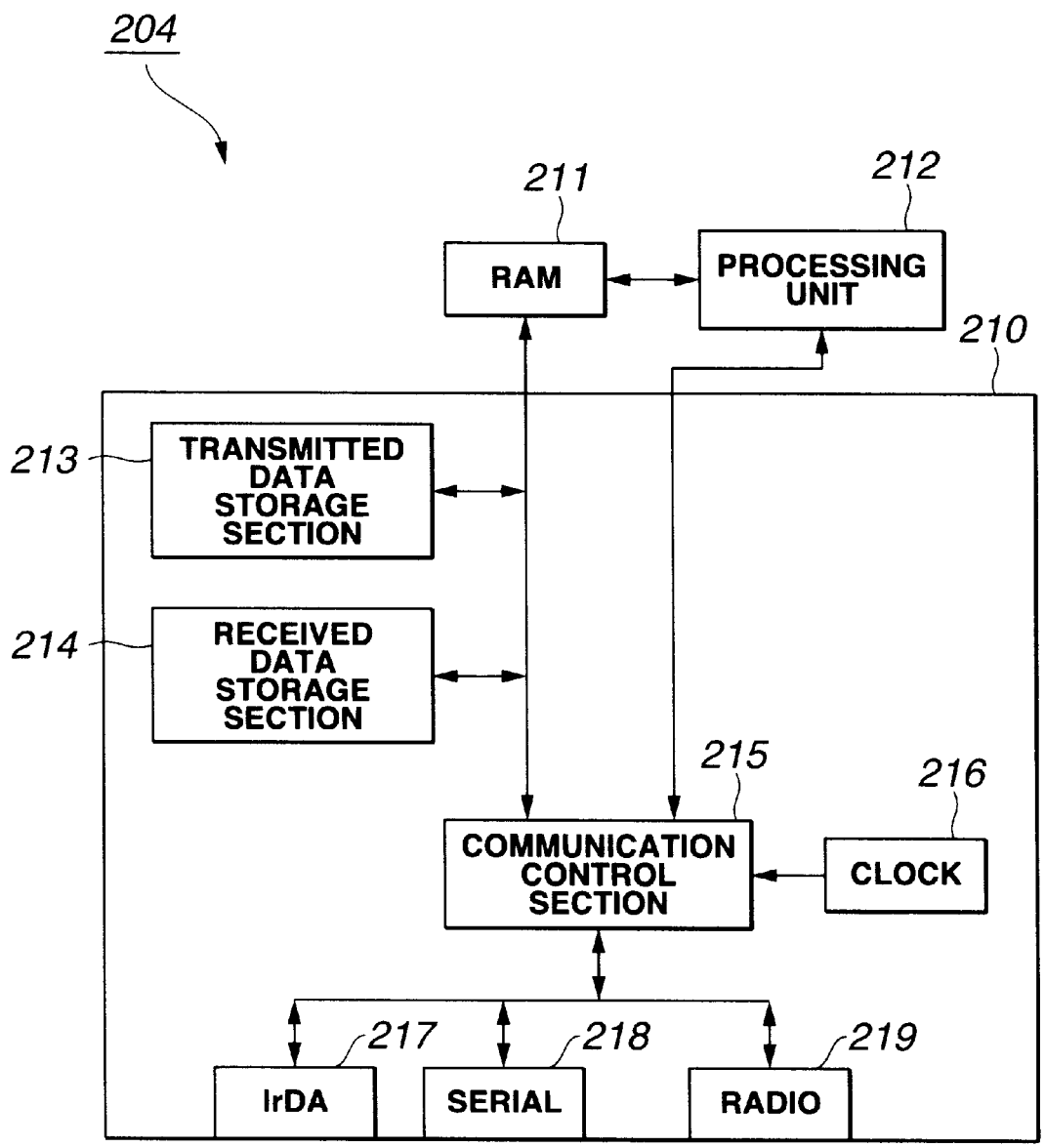
FIG. 29 is a block diagram showing the hardware structure of an essential portion of a pet-type robot of the second embodiment.

FIG. 29 shows the structure of a main portion (communication processing section) of the pet-type robot 204, which enables transfer of the pet characteristic information by communication, as described above. The pet-type robot 204 has the structure as shown in FIGS. 3, 5 and 7, but only the portion (communication processing section) necessary for communication of the pet characteristic information is shown in FIG. 29. In the example of FIG. 29, connection by infrared rays (IrDa), serial cable connection, and radio connection are employed as exemplary connection forms.

In FIG. 29, a RAM 211 corresponds to the RAM 33 of FIG. 5, and a processing unit 212 corresponds to the CPU 31 of FIG. 5.

The communication processing section 210 of the pet-type robot 204 shown in FIG. 29 has an infrared (IrDa) transmission/reception section 217, a serial port section 218, and a radio transmission/reception section 219, as communication means connected to the outside (e.g., the virtual electronic pet device, the personal computer, or the Internet) for transmitting and receiving the pet characteristic information. These communication means are connected to a communication control section 215.

The communication control section 215 is controlled by the processing unit 212 corresponding to the CPU 31 of FIG. 5, and operates in accordance with a communication clock from a clock generation section 216, thus transmitting and receiving data in accordance with a communication protocol corresponding to the connection form of the communication means.

The data to be transmitted is read out from the RAM 211 under the control of the processing unit 212, then temporarily stored in a transmitted data storage section 213 as a transmission buffer, and then transmitted from the communication means via the communication control section 215. The data received by the communication means is temporarily stored in a received data storage section 214 as a reception buffer via the communication control section 215 and then sent to the RAM 211.

Figure 30:
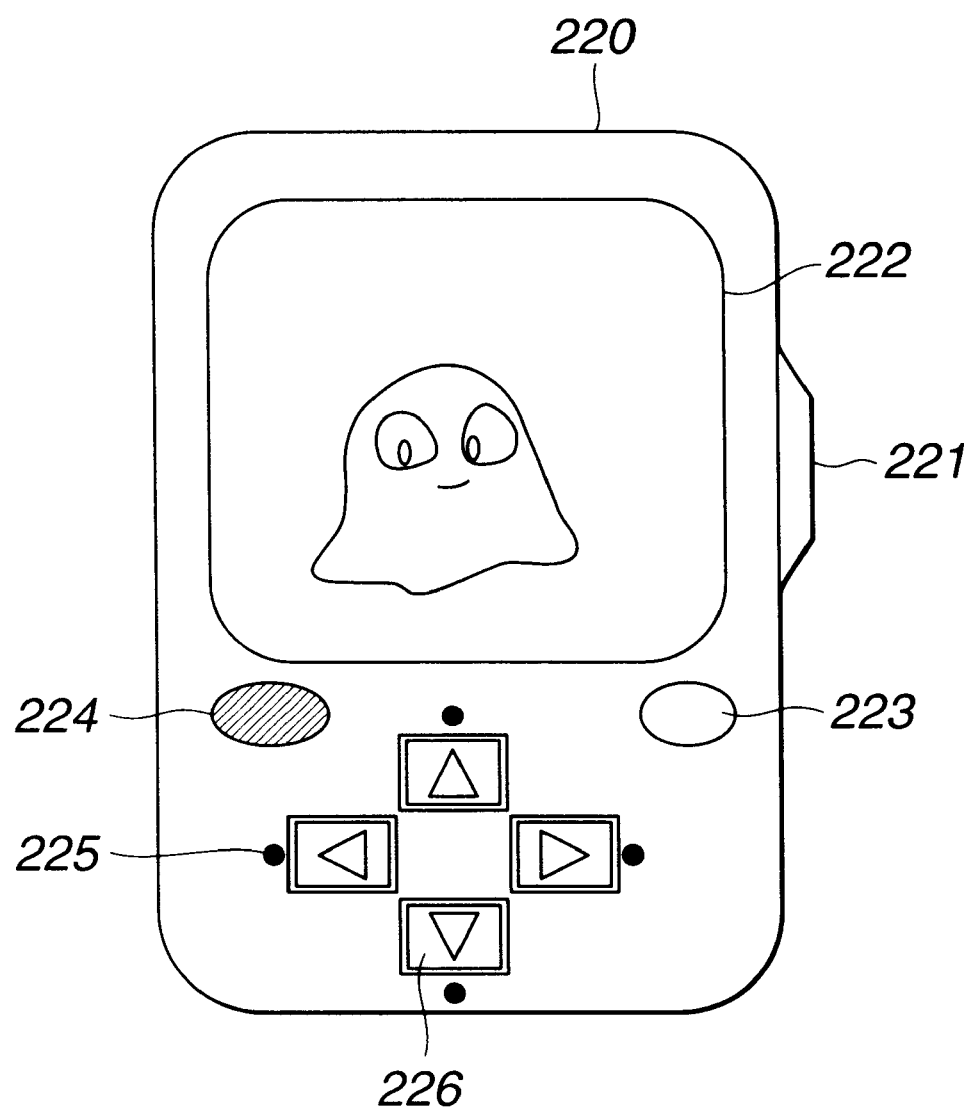
FIG. 30 is a front view showing the appearance of a virtual electronic pet device of the second embodiment.

FIG. 30 shows the specific appearance of a virtual electronic pet device used in the embodiment of the present invention.

A virtual electronic pet device 220 shown in FIG. 30 has a monitor 222 for displaying the electronic pet, a speaker 223 for outputting a voice, a microphone 224 for picking up a voice, operation buttons 226 for the user to input various operations to the device 220, LEDs (light-emitting diodes) 225 which are lit in accordance with the operated buttons, and a talk switch 221 for instructing analysis of the voice picked up from the microphone 224 as described above.

Figure 31:
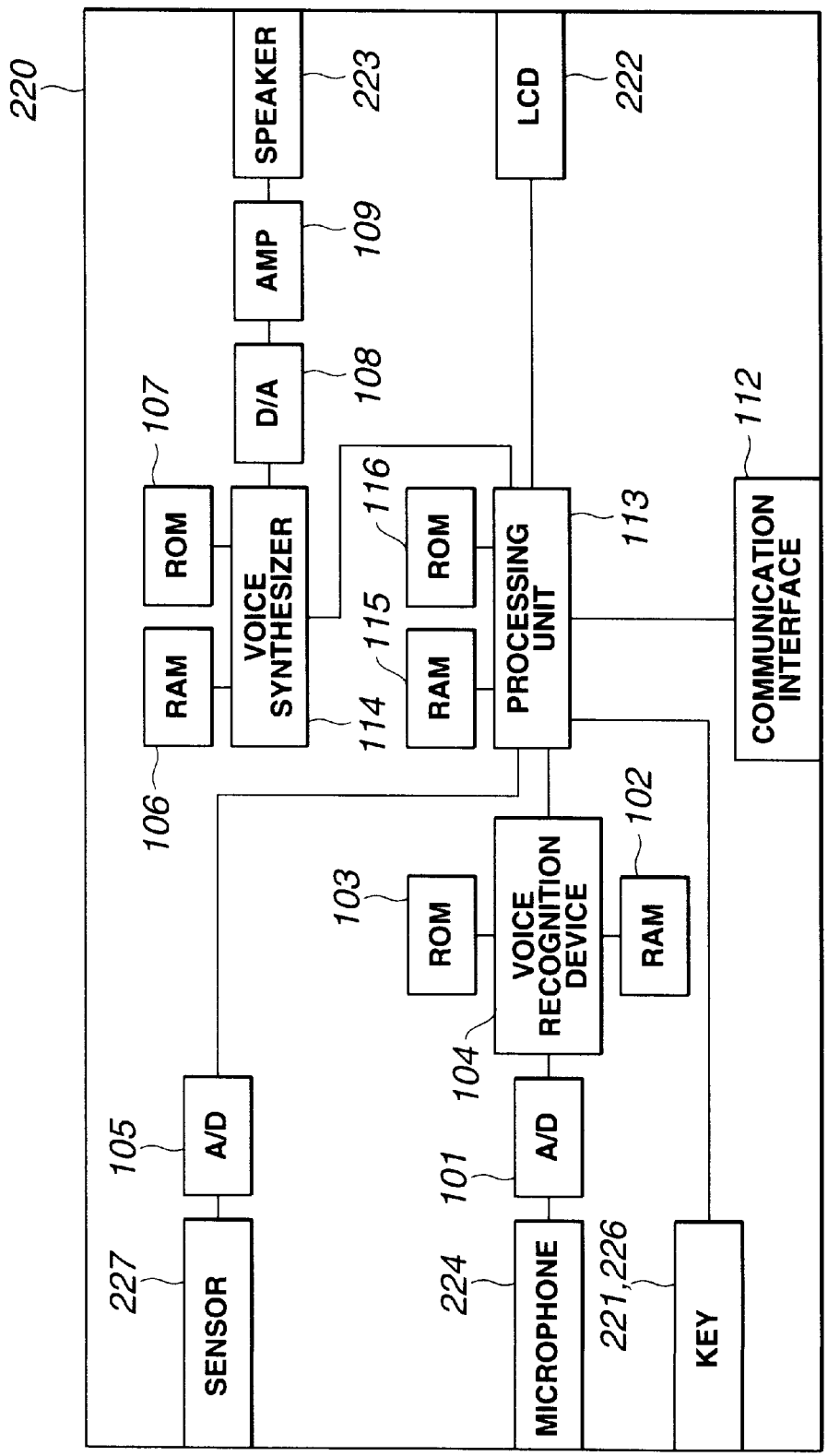
FIG. 31 is a block diagram showing the hardware structure of an essential portion of the virtual electronic pet device of the second embodiment.

The virtual electronic pet device 220 as shown in FIG. 30 has an internal hardware structure as shown in FIG. 31. The structure shown in FIG. 31 has basically the same function as the structure of FIG. 4, but a communication interface 112 is provided as the structure to enable communication of the pet characteristic information as in the second embodiment.

In FIG. 31, a processing unit 113 is adapted for carrying out various types of processing in accordance with programs stored in a ROM 116. The ROM 116 stores programs to be executed by the processing unit 113 and data necessary for executing the programs. A RAM 115 stores data necessary for the operation of the processing unit 113.

The communication interface 112 functions as an interface corresponding to the communication means and the communication control section 215 shown in FIG. 29.

The microphone 224 converts a voice inputted thereto to an audio signal as an analog electric signal and supplies the audio signal to an A/D converter 101. The A/D converter 101 performs A/D conversion on the analog audio signal from the microphone 224 and outputs a digital audio signal to a voice recognition device 104.

The voice recognition device 104 carries out linear prediction analysis of the audio signal inputted thereto so as to extract the characteristic quantity, and carries out voice recognition based on, for example, the HMM method. A program executed by the voice recognition device 104 for carrying out voice recognition and word models as the objects of voice recognition are stored, for example, in a ROM 103. In the ROM 103, particularly the word models used for the keeper to talk to the pet are stored as the word models to be the objects of voice recognition. The method of acoustic analysis is not limited to the linear prediction analysis, and the method of voice recognition is not limited to the HMM method. A RAM 102 stores data necessary for the operation of the voice recognition device 104.

A key section corresponds to the operation buttons 226 and the talk switch 221 shown in FIG. 30. A signal outputted from the key section 221, 226 as the user operates the key section is inputted to the processing unit 113. Thus, the processing unit 113 recognizes the buttons and keys operated by the user. For example, when the operation buttons 226 in the key section are operated, various types of inputs are provided to the electronic pet in response to the operations. When the talk switch 221 in the key section is pressed, the processing unit 113 causes the voice recognition device 104 to start voice recognition of the voice inputted from the microphone 224.

A sensor 227 is a sensor for detecting the state of the external environment such as the sound, light, and temperature. A detection signal from this sensor 227 is converted to a digital signal by an A/D converter 105 and then sent to the processing unit 113. The processing unit 113 controls the reaction of the electronic pet on the basis of the detection data obtained from the sensor 227.

A voice synthesizer 114 synthesizes a voice to be outputted by the electronic pet under the control of the processing unit 113. A program for the voice synthesizer 114 to carry out voice synthesis and data as the basis for voice synthesis are stored, for example, in a ROM 107. In the ROM 107, data for synthesizing various types pf voices to be outputted by the electronic pet are stored. A ROM 106 stores data necessary for the operation of the voice synthesizer 114.

A D/A converter 108 performs D/A conversion on the audio data synthesized by the voice synthesizer 114 so as to generate an analog audio signal, and supplies the analog audio signal to the speaker 223. The speaker 223 includes an amplifier so as to amplify the audio signal from the D/A converter 108 and then output the amplified audio signal.

A liquid crystal display (LCD) section 222 includes a liquid crystal controller which is controlled by the processing unit 113 and displays various images (e.g., images of the electronic pet) and characters.

Figure 32:
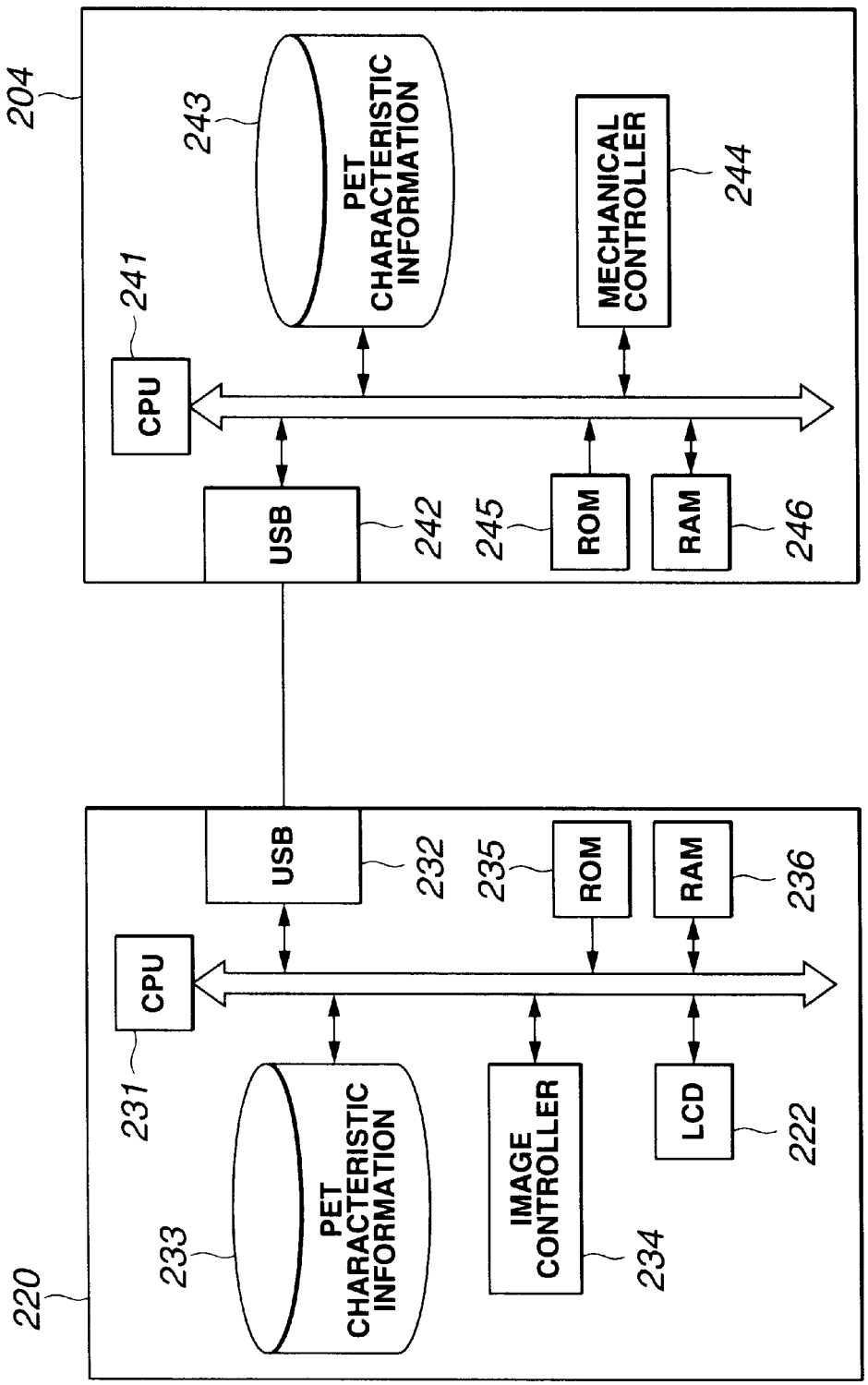
FIG. 32 is a block diagram showing an example of connection in which the virtual electronic pet device and the pet-type robot are connected with each other by a USB cable.

FIG. 32 shows the essential internal structures of the virtual electronic pet device 220 and the pet-type robot 204 in the case where the virtual electronic pet device 220 and the pet-type robot 204 are connected with each other via a USB (universal serial bus) cable as an exemplary serial data cable so as to transfer the pet characteristic information.

In FIG. 32, a CPU 231 of the virtual electronic pet device 220 corresponds to the processing unit 113 of FIG. 31, a RAM 236 corresponds to the RAM 115 of FIG. 31, and a ROM 235 corresponds to the ROM 116 of FIG. 31. An image controller 234 corresponds to the liquid crystal controller included in the liquid crystal display section 222 of FIG. 31. A data storage section 233 stores the pet characteristic information. The pet characteristic information is transmitted to and received from the pet-type robot 204 via the USB cable connected to a USB port 232.

A CPU 241 of the pet-type robot 204 corresponds to the processing unit 212 of FIG. 29, a RAM 146 corresponds to the RAM 211 of FIG. 29, and a ROM 245 corresponds to the ROM 32 of FIG. 29. A mechanical controller 244 controls the driving mechanism 52 of FIG. 5 under the control of the CPU 241. A data storage section 243 stores the pet characteristic information. The pet characteristic information is transmitted to and received from the virtual electronic pet device 220 via the USB cable connected to a USB port 242.

Figure 33:
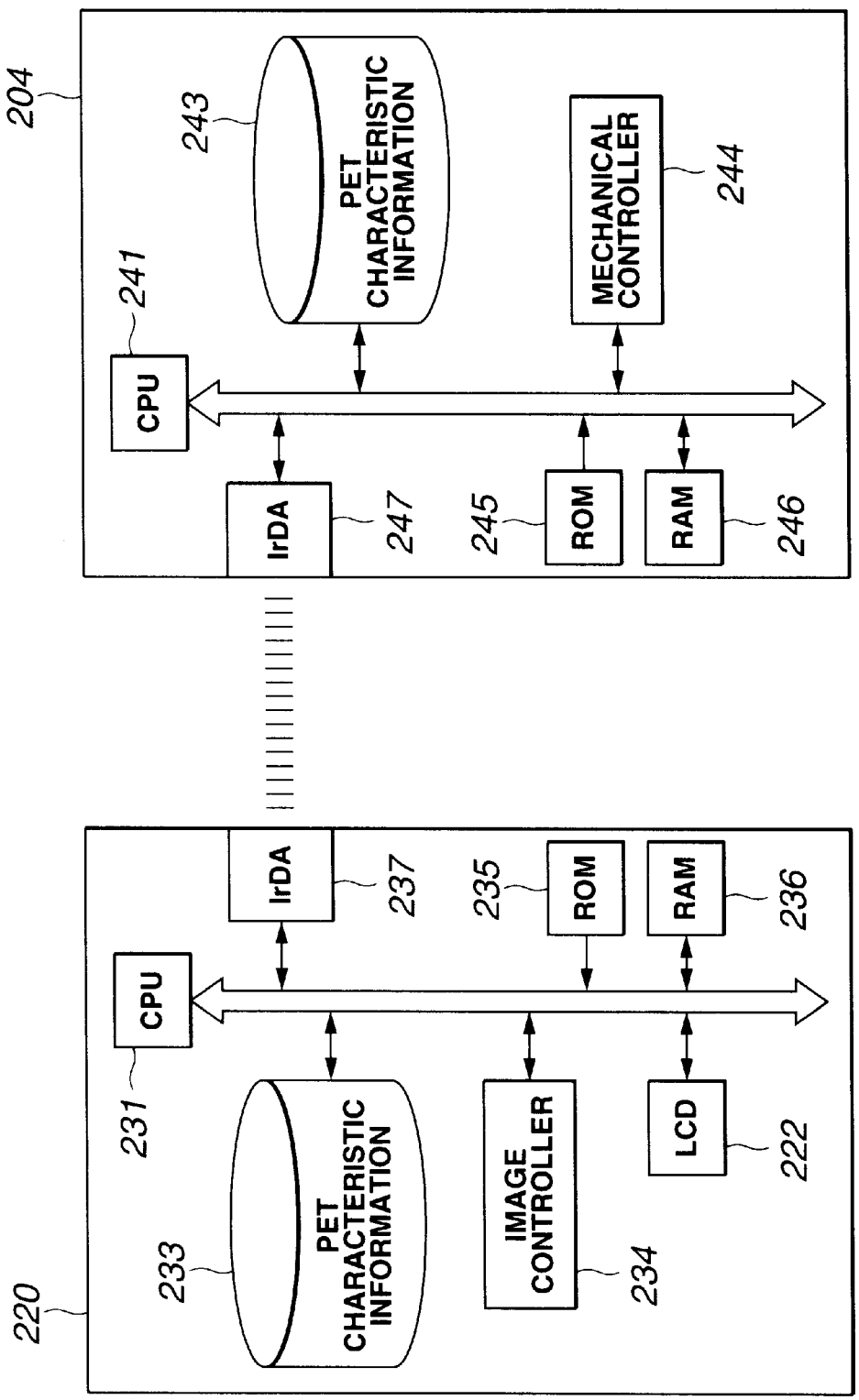
FIG. 33 is a block diagram showing an example of connection in which the virtual electronic pet device and the pet-type robot are connected with each other by infrared rays.

FIG. 33 shows the essential internal structures of the virtual electronic pet device 220 and the pet-type robot 204 in the case where the virtual electronic pet device 220 and the pet-type robot 204 are connected with each other by infrared rays via an infrared (IrDA) transmission/reception section so as to transfer the pet characteristic information. In FIG. 33, portions similar to those of FIG. 32 are denoted by the same numerals and will not be described further in detail.

In the example of FIG. 33, an infrared transmission/reception section 237 of the virtual electronic pet device 220 is provided in the communication interface 112 of FIG. 31. The pet characteristic information is transmitted and received between the infrared transmission/reception section 237 and an infrared transmission/reception section 247 of the pet-type robot 204.

The infrared transmission/reception section 247 of the pet-type robot 204 corresponds to the infrared transmission/reception section 217 shown in FIG. 29. The pet characteristic information is transmitted and received between the infrared transmission/reception section 247 and the virtual electronic pet device 220.

Figure 34:
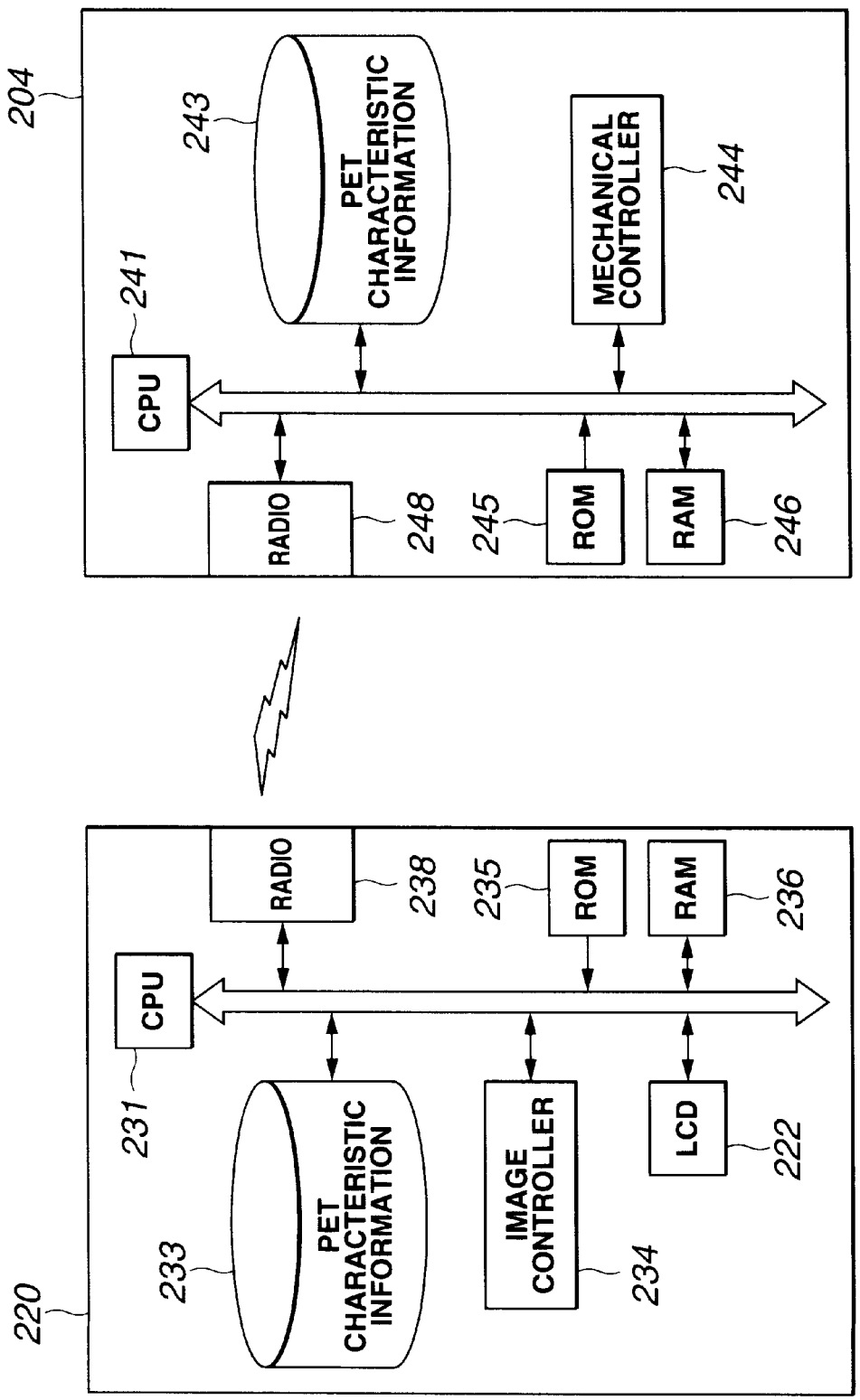
FIG. 34 is a block diagram showing an example of connection in which the virtual electronic pet device and the pet-type robot are connected with each other by radio waves.

FIG. 34 shows the essential internal structures of the virtual electronic pet device 220 and the pet-type robot 204 in the case where the virtual electronic pet device 220 and the pet-type robot 204 are connected with each other by radio waves via a radio transmission/reception section so as to transfer the pet characteristic information. In FIG. 34, portions similar to those of FIG. 32 are denoted by the same numerals and will not be described further in detail.

In the example of FIG. 34, a radio transmission/reception section 238 of the virtual electronic pet device 220 is provided in the communication interface 112 of FIG. 31. The pet characteristic information is transmitted and received between the radio transmission/reception section 238 and a radio transmission/reception section 248 of the pet-type robot 204.

The radio transmission/reception section 248 of the pet-type robot 204 corresponds to the radio transmission/reception section 219 shown in FIG. 29. The pet characteristic information is transmitted and received between the radio transmission/reception section 248 and the radio transmission/reception section 238 of the virtual electronic pet device 220.

Figure 35:
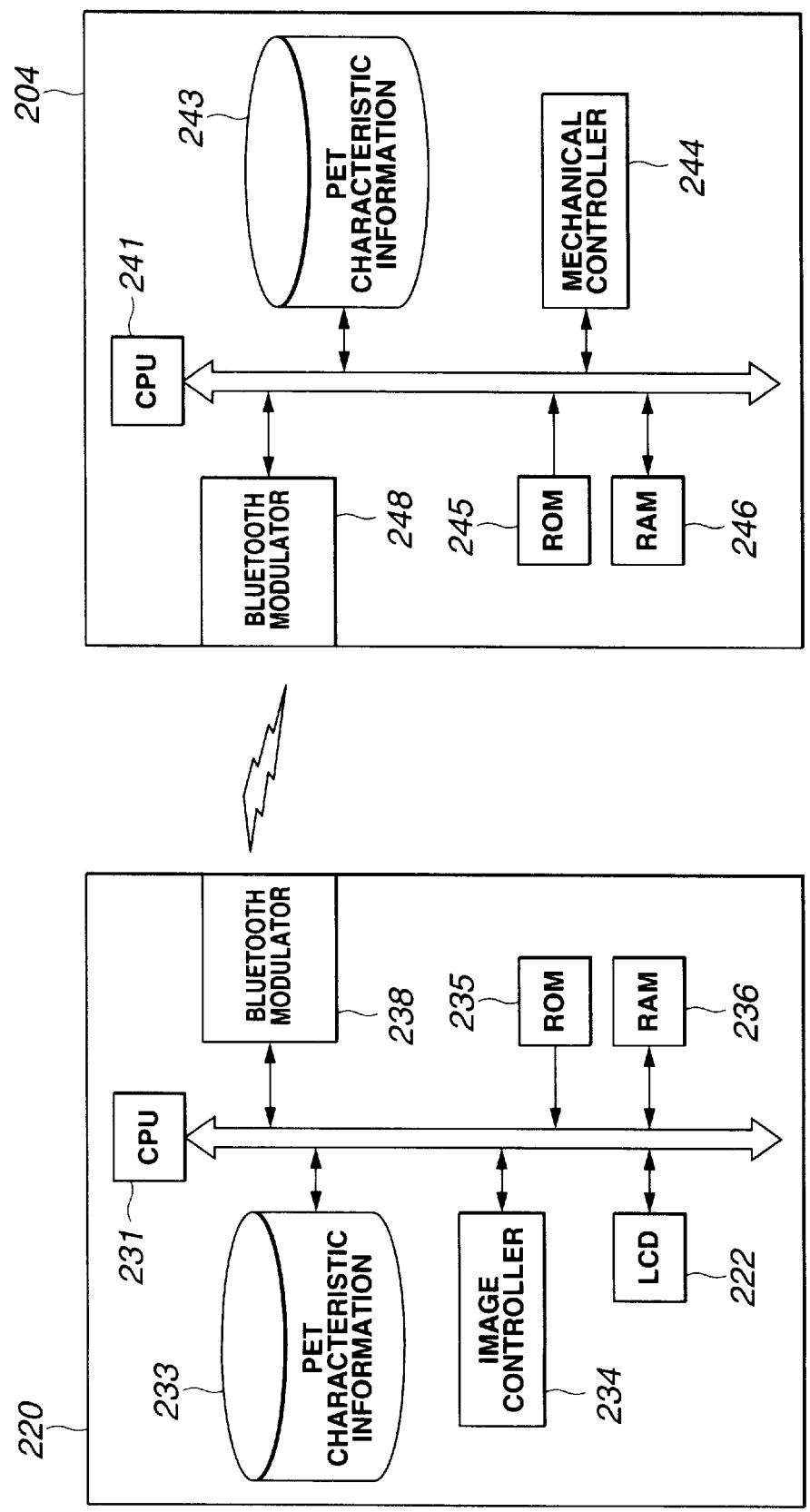
FIG. 35 is a block diagram showing an example of connection in which the virtual electronic pet device and the pet-type robot are connected with each other by a Bluetooth module.

Specifically, as the radio transmission/reception section 248 of the pet-type robot 204 and the radio transmission/reception section 238 of the virtual electronic pet device 220, Bluetooth modules 248 and 238 can be used, respectively, as shown in FIG. 35.

The Bluetooth is a radio interface using ISM (industrial Scientific Medical) band of 2.4 GHz which does not require permission as the carrier frequency. The Bluetooth modules 248 and 238 employ this Bluetooth radio interface. The schematic structure of the Bluetooth will be described as follows.

The Bluetooth uses a spread spectrum technique in accordance with a frequency hopping system. It uses 79 channels each having a width of 1 MHZ and capable of switching the channel 1600 times per second at the maximum. Thus, interference with other radio communications is prevented. Carrier sense is not carried out since hopping is switched to high-speed hopping.

The maximum data transmission speed is 1 Mbits/sec. The multiplexing method for packets can deal with both TDD (time division duplex) circuit switching and packet switching. While asynchronous transmission is carried out, a maximum of three audio channels each having 64 kbits/sec can be secured simultaneously.

The Bluetooth-compatible equipments are classified into a "master" for deciding the frequency hopping pattern and a maximum of seven "slaves" accompanying the master. A sub-net constituted by the master and several slaves is called "pico-net". Since the master can be a slave of the pico-net, it is possible to form a network by sequentially connecting pico-nets. For example, such a network structure is called stacker net. In the pico-net or the stacker net, communications and the state of equipments are managed using an 8-bit MAC address.

The Bluetooth equipment deals with several modes of different dissipation powers, depending on the state of participation in the communication. By fragmenting the mode in the specification, the dissipation power is reduced.

The link between the master and the slaves is set by the Bluetooth as follows. First, the master transmits "Inquiry", which is a message including a key for connection or the like, at an interval of 625 $\mu$s. On the slave side, since the channel is constantly switched in accordance with the hopping pattern, synchronization is made approximately in two seconds. Thus, the master recognizes the slave, and the slave obtains 3-bit "Active member address" and enters the pico-net. "Active member address" is address information of 3 bits allocated to the equipment which communicates with the master. As this "Active member address" is allocated, the pico-net is formed.

After that, the master sends a "Page" message to the slave. The slave the operates in the hopping pattern decided by the master.

After that, authentication is carried out. An encryption key used for authentication is produced by the exclusive OR of a random number generated by the master and the MAC address of the slave. On completion of the authentication, a dedicated key is provided to simplify the subsequent processing. Then, transmission and reception of data is started.

The foregoing is the schematic structure of the Bluetooth. The pet-type robot 204 and the virtual electronic pet device 220 can have the Bluetooth modules 248 and 238 employing such Bluetooth radio interfaces, respectively, as the radio transmission/reception sections.

Figure 36:
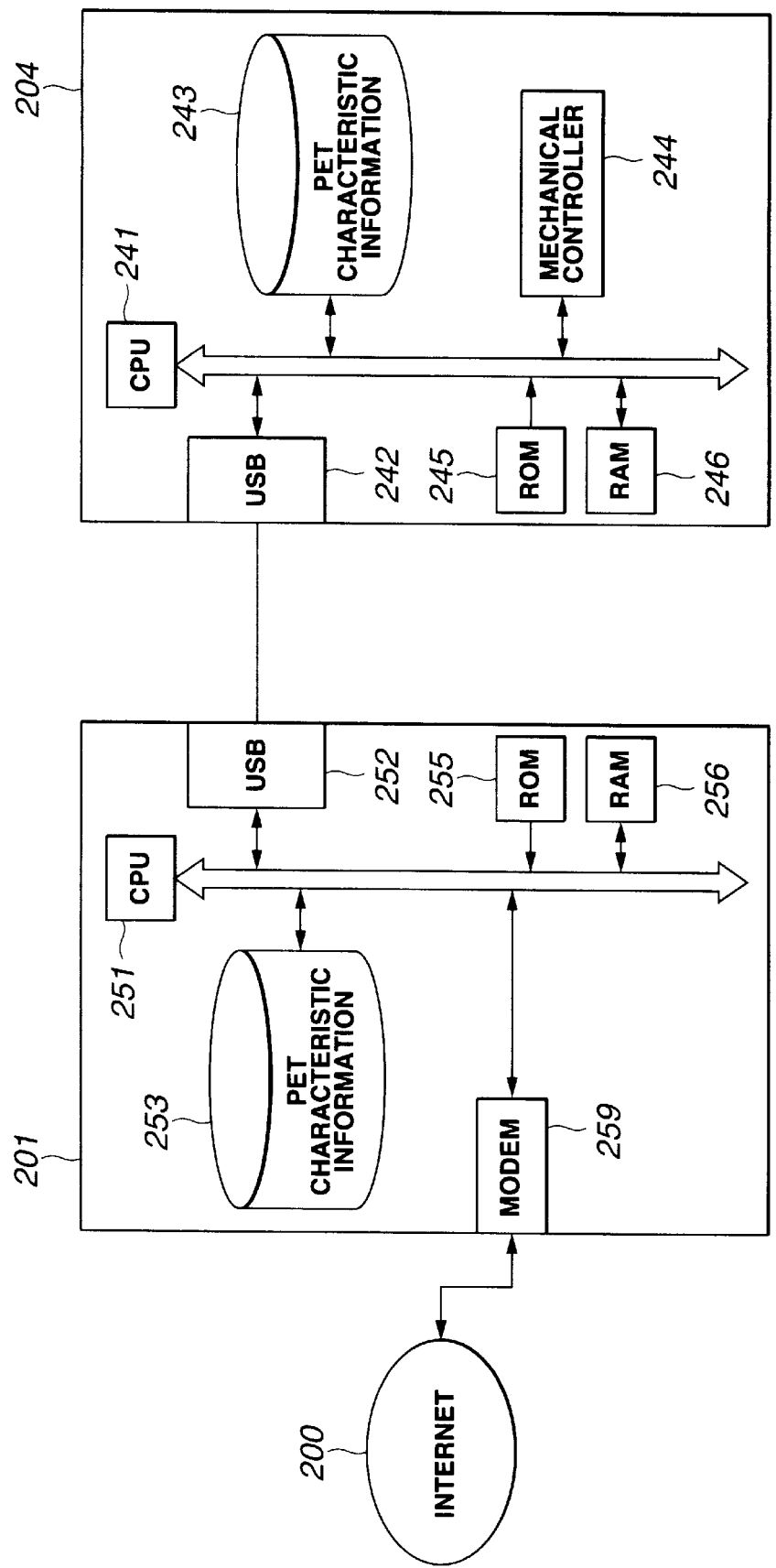
FIG. 36 is a block diagram showing an example of connection in which the pet-type robot and a personal computer are connected with each other by a USB cable and in which the personal computer is connected to the Internet.

FIG. 36 shows the essential internal structures of the personal computer 201 and the pet-type robot 204 in the case where the personal computer 201 and the pet-type robot 204 are connected with each other by a USB cable as an exemplary serial data cable so as to enable transmission and reception of the pet characteristic information via the personal computer 201 and the Internet 200. In FIG. 36, portions similar to those of FIG. 32 are denoted by the same numerals and will not be described further in detail.

In the example of FIG. 36, a CPU 251 of the personal computer 201 corresponds to a processor unit, and a ROM 255, a RAM 256, and a USB port 252 are generally provided in the personal computer. A data storage section 253 corresponds to a hard disk, for example. This personal computer 201 transfers to the Internet 200 the pet characteristic information transmitted from the pet-type robot 204 via the USB cable, and transfers the pet characteristic information received from the Internet 200 to the pet-type robot 204 via the USB cable.

Figure 37:
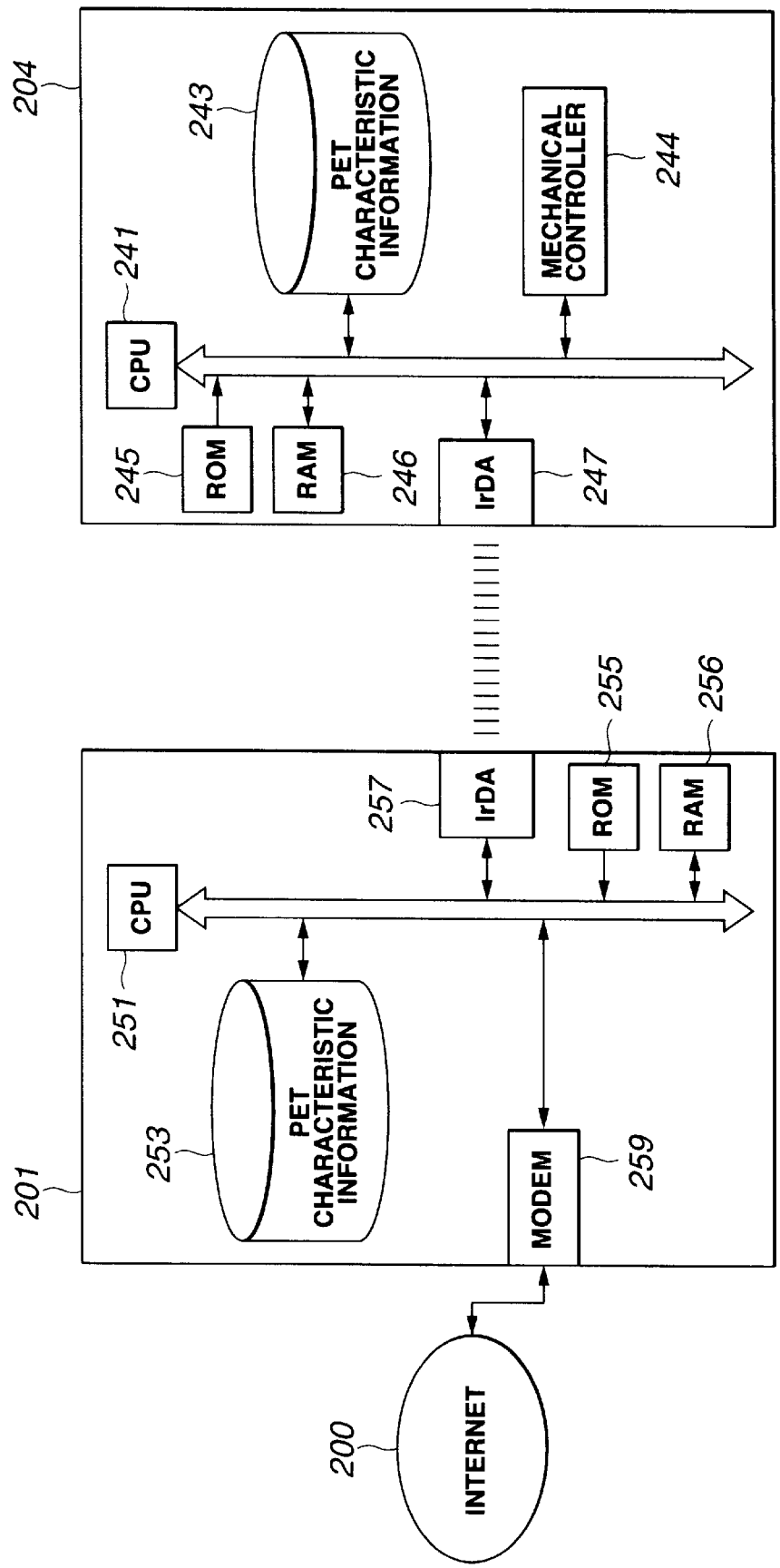
FIG. 37 is a block diagram showing an example of connection in which the pet-type robot and a personal computer are connected with each other by infrared rays and in which the personal computer is connected to the Internet.

FIG. 37 shows the essential internal structures of the personal computer 201 and the pet-type robot 204 in the case where the personal computer 201 and the pet-type robot 204 are connected with each other by infrared rays so as to enable transmission and reception of the pet characteristic information via the personal computer 201 and the Internet 200. In FIG. 37, portions similar to those of FIGS. 36 and 33 are denoted by the same numerals and will not be described further in detail.

In the example of FIG. 37, the personal computer 201 has an infrared transmission/reception port 257, thus transferring to the Internet 200 the pet characteristic information transmitted from the pet-type robot 204 by using infrared rays and also transferring the pet characteristic information received via the Internet 200 to the pet-type robot 204 by using infrared rays.

Figure 38:
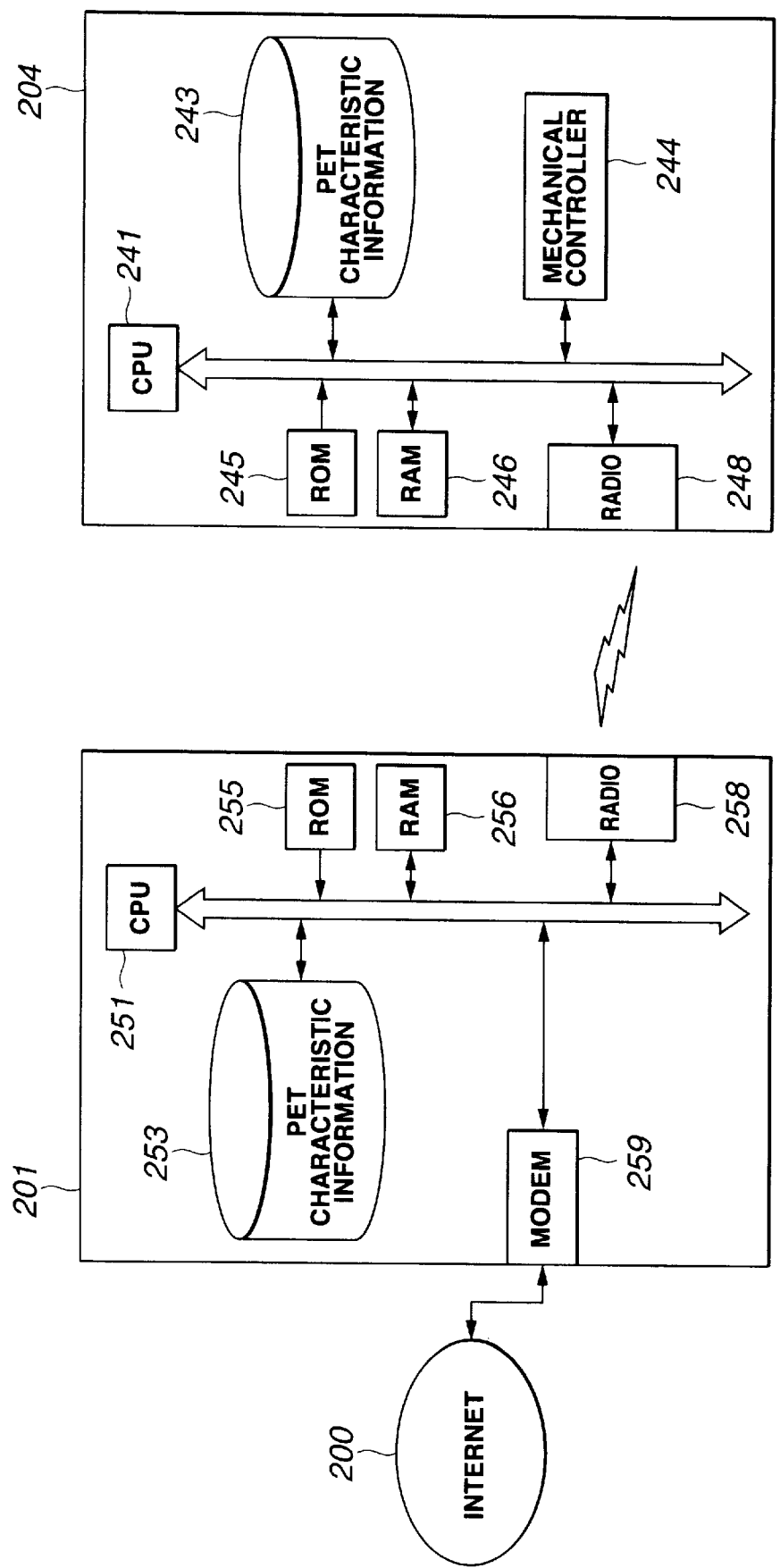
FIG. 38 is a block diagram showing an example of connection in which the pet-type robot and a personal computer are connected with each other by radio waves and in which the personal computer is connected to the Internet.

FIG. 38 shows the essential internal structures of the personal computer 201 and the pet-type robot 204 in the case where the personal computer 201 and the pet-type robot 204 are connected with each other by radio waves so as to enable transmission and reception of the pet characteristic information via the personal computer 201 and the Internet 200. In FIG. 38, portions similar to those of FIGS. 36 and 34 are denoted by the same numerals and will not be described further in detail.

Figure 39:
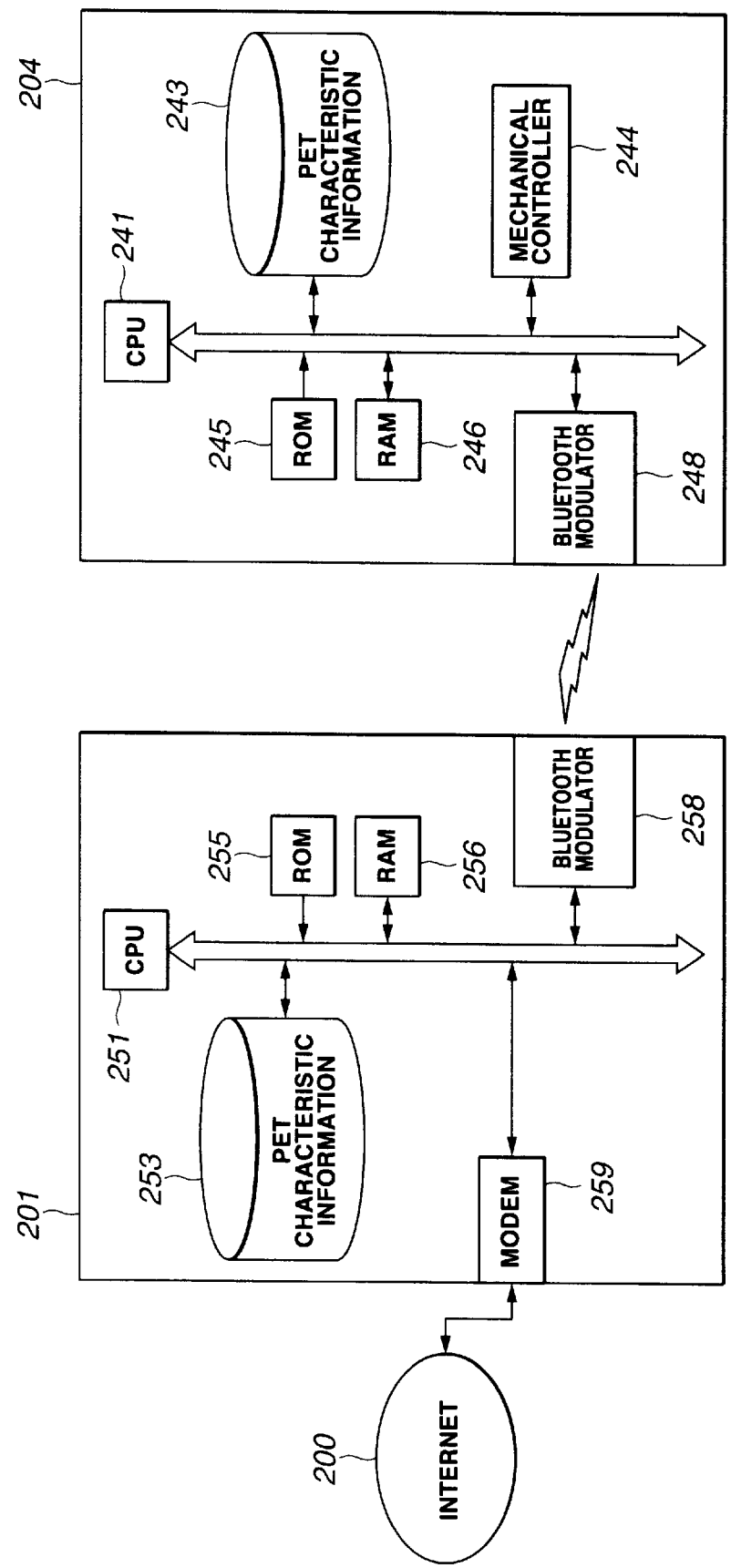
FIG. 39 is a block diagram showing an example of connection in which the pet-type robot and a personal computer are connected with each other by a Bluetooth module and in which the personal computer is connected to the Internet.

In the example of FIG. 38, the personal computer 201 has a radio transmission/reception section 258, thus transferring to the Internet 200 the pet characteristic information transmitted from the pet-type robot 204 by using radio waves and also transferring the pet characteristic information received via the Internet 200 to the pet-type robot 204 by using radio waves. Specifically, as the radio transmission/reception section 248 of the pet-type robot 204 and the radio transmission/reception section 238 of the virtual electronic pet device 220, Bluetooth modules 248 and 238 can be used, respectively, as shown in FIG. 39. The modules 248 and 238 employ Bluetooth radio interfaces, as described above.

Figure 40:
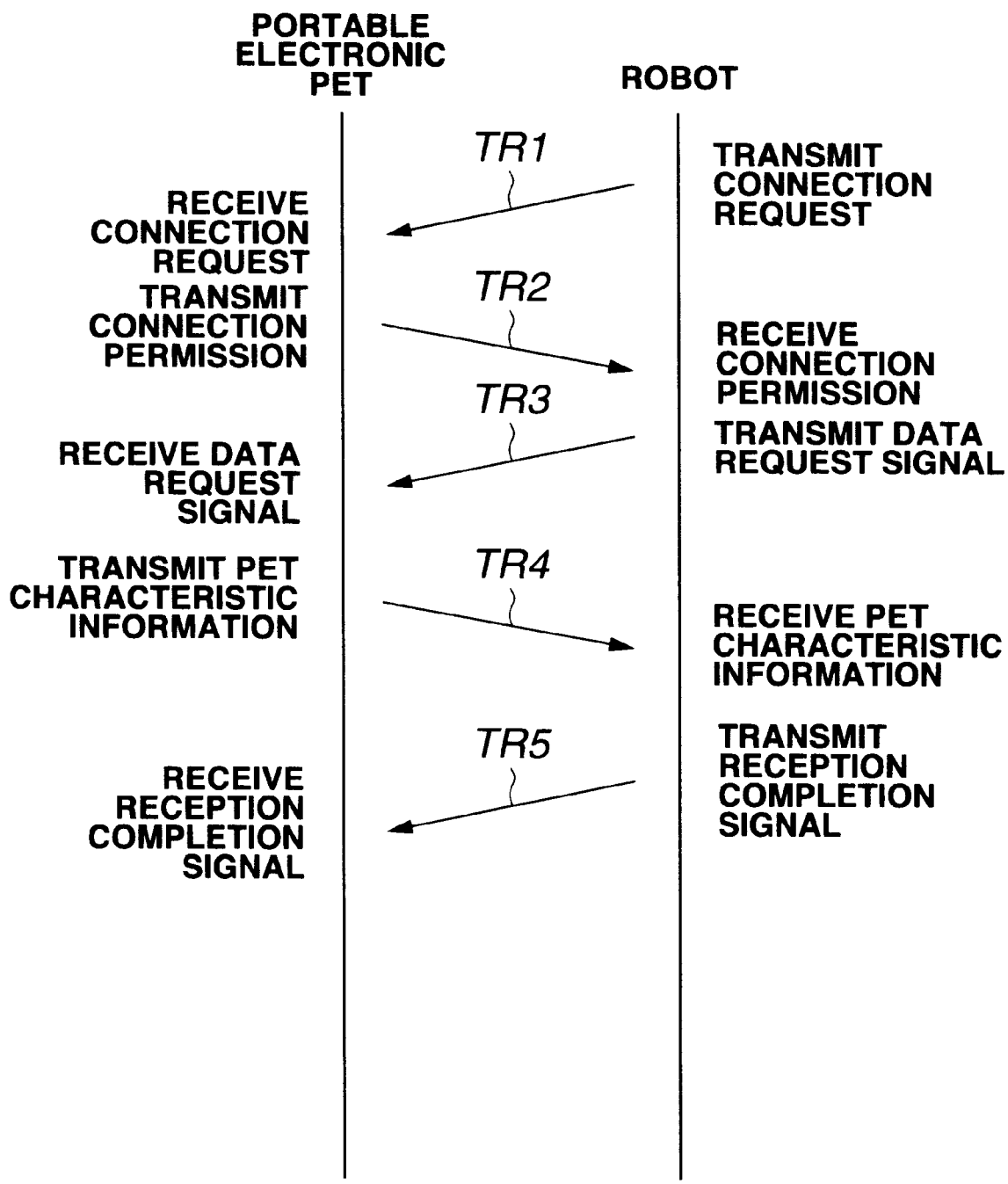
FIG. 40 shows the flow of transfer of pet characteristic information from the virtual electronic pet device to the pet-type robot.

FIG. 40 shows the flow of transmission/reception processing in the case where the virtual electronic pet device and the pet-type robot are connected with each other via a serial data cable, infrared rays, or radio waves, thus transferring the pet characteristic information. The example of FIG. 40 shows the flow in the case of transferring the pet characteristic information from the virtual electronic pet device to the pet-type robot.

In FIG. 40, a connection request is issued, for example, from the pet-type robot. Specifically, the pet-type robot first transmits a connection request signal to the virtual electronic pet device (expressed as a portable electronic pet in FIG. 40), as indicated by TR1 in FIG. 40. In this case, the connection request is issued from the pet-type robot for the following reason. That is, if the connection request can be issued both from the pet-type robot and the virtual electronic pet device, a switch for determining which side should issue the connection request must be provided both in the pet-type robot and in the virtual electronic pet device, and particularly, providing such a switch in the pet-type robot is not desired in view of the design (i.e., it is desired that various switches are provided in a robot as a pet). However, the present invention is not limited to this example. The connection request can also be issued from the side of the virtual electronic pet device, and can be issued either from the pet-type robot or from the virtual electronic pet device.

Therefore, in the present embodiment, since it is decided to issue the connection request from the pet-type robot, the switch is not required.

In this case, the connection request signal transmitted from the pet-type robot includes an ownership flag (Own_flg), which is a flag indicating which of the pet-type robot and the virtual electronic pet device has the right of ownership of the pet characteristic information (that is, a flag indicating which of the pet-type robot and the virtual electronic pet device the soul resides in). In the present embodiment, the right of ownership of the pet characteristic information is not provided when the value of the ownership flag is 0 (Own_flg=0), and the right of ownership of the pet characteristic information is provided when the value of the ownership flag is 1 (Own_flg=1). In the example of FIG. 40, as an initial state, the value of the ownership flag of the pet-type robot is 0 (Own_flg=0) and the value of the ownership flag of the virtual electronic pet device is 1 (Own_flg=1).

On receiving the connection request signal, the virtual electronic pet device compares its own ownership flag (Own_flg=1) with the ownership flag (Own_flg=0) included in the received connection request signal. When the value of the ownership flag of the received connection request signal and the value of its own ownership flag are different, the virtual electronic pet device transmits a connection permission signal to the pet-type robot, as indicated by TR2 in FIG. 40.

On receiving the connection permission signal, the pet-type robot compares its own ownership flag (Own_flg=0) with the ownership flag (Own_flg=1) included in the received connection permission signal. When the value of the ownership flag of the received connection permission signal and the value of its own ownership flag are different, the pet-type robot transmits a data request signal to the virtual electronic pet device, as indicated by TR3 in FIG. 40.

On receiving the data request signal, the virtual electronic pet device transmits the pet characteristic information stored therein to the pet-type robot, as indicated by TR4, in FIG. 40.

On receiving all the necessary pet characteristic information, the pet-type robot transmits a reception completion signal to the virtual electronic pet device, as indicated by TR5 in FIG. 40, and changes the value of its own ownership flag to 1 (Own_flg=1).

On receiving the reception completion signal from the pet-type robot, the virtual electronic pet device changes the value of its own ownership flag to 0 (Own_flg=0). In the above-described manner, the flow in the case of transferring the pet characteristic information from the virtual electronic pet device to the pet-type robot is completed. Thus, it is considered that the individual information storage section has been shifted to the pet-type robot.

Figure 41:
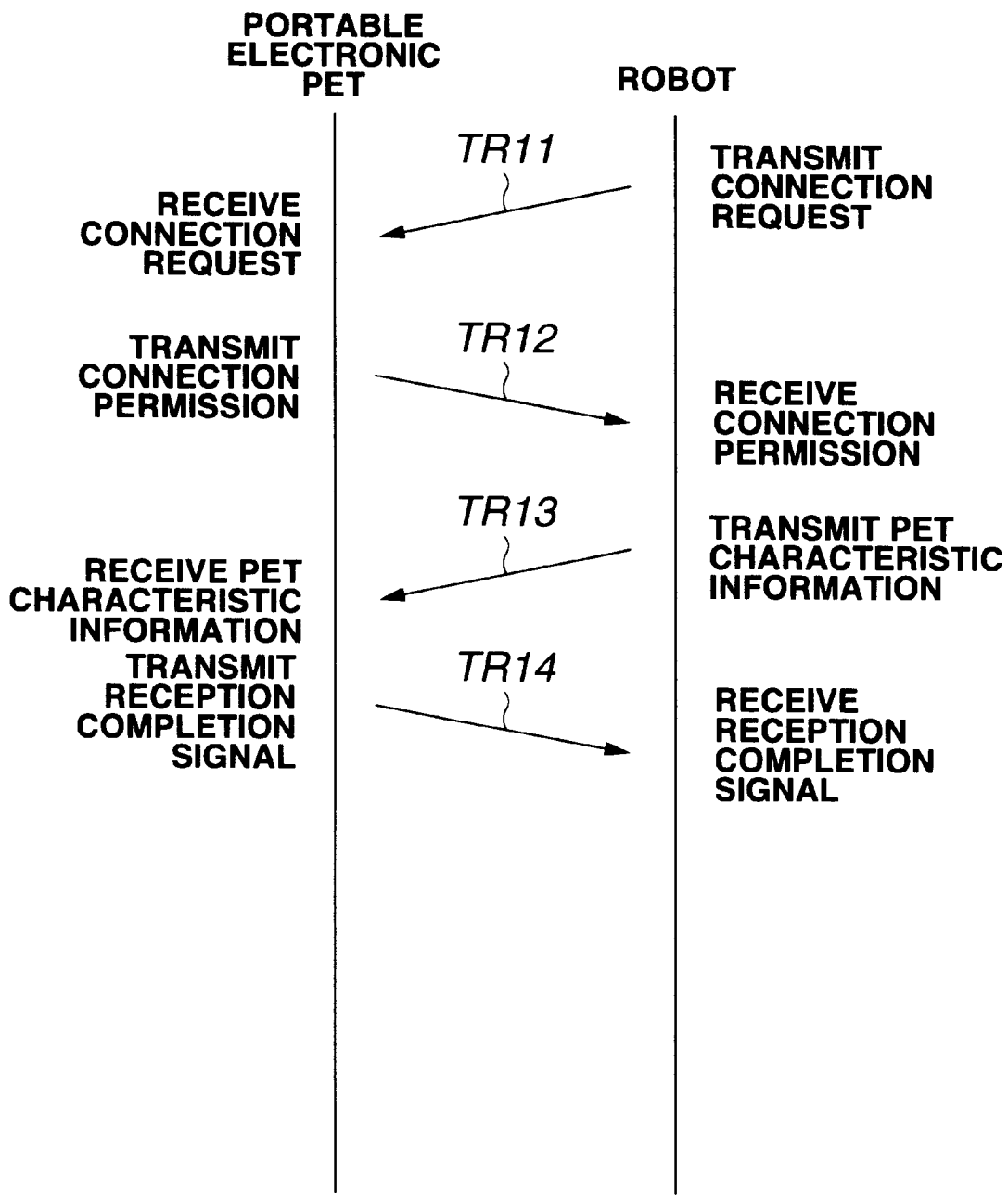
FIG. 41 shows the flow of transfer of pet characteristic information from the pet-type robot to the virtual electronic pet device.

FIG. 41 shows the flow in the case of transferring the pet characteristic information from the pet-type robot to the virtual electronic pet device. In the example of FIG. 41, as an initial state, the value of the ownership flag of the pet-type robot is 1 (Own_flg=1) and the value of the ownership flag of the virtual electronic pet device is 0 (Own_flg=0).

In FIG. 41, first, the pet-type robot transmits a connection request signal including the ownership flag to the virtual electronic pet device (expressed as a portable electronic pet in FIG. 41), as indicated by TR11 in FIG. 41. The value of the ownership flag in this case is 1 (Own_flg=1).

On receiving the connection request signal, the virtual electronic pet device compares its own ownership flag (Own_flg=0) with the ownership flag (Own_flg=1) included in the received connection request signal. When the value of the ownership flag of the received connection request signal and the value of its own ownership flag are different, the virtual electronic pet device transmits a connection permission signal to the pet-type robot, as indicated by TR12 in FIG. 41.

On receiving the connection permission signal, the pet-type robot compares its own ownership flag (Own_flg=1) with the ownership flag (Own_flg=0) included in the received connection permission signal. When the value of the ownership flag of the received connection permission signal and the value of its own ownership flag are different, the pet-type robot transmits the pet characteristic information stored therein to the virtual electronic pet device, as indicated by TR13 in FIG. 41.

On receiving all the necessary pet characteristic information, the virtual electronic pet device transmits a reception completion signal to the virtual electronic pet device, as indicated by TR14 in FIG. 41, and changes the value of its own ownership flag to 1 (Own_flg=1).

On receiving the reception completion signal from the virtual electronic pet device, the pet-type robot changes the value of its own ownership flag to 0 (Own_flg=0). In the above-described manner, the flow in the case of transferring the pet characteristic information from the pet-type robot to the virtual electronic pet device is completed. Thus, it is considered that the individual information storage section has been shifted to the virtual electronic pet device.

Figure 42:
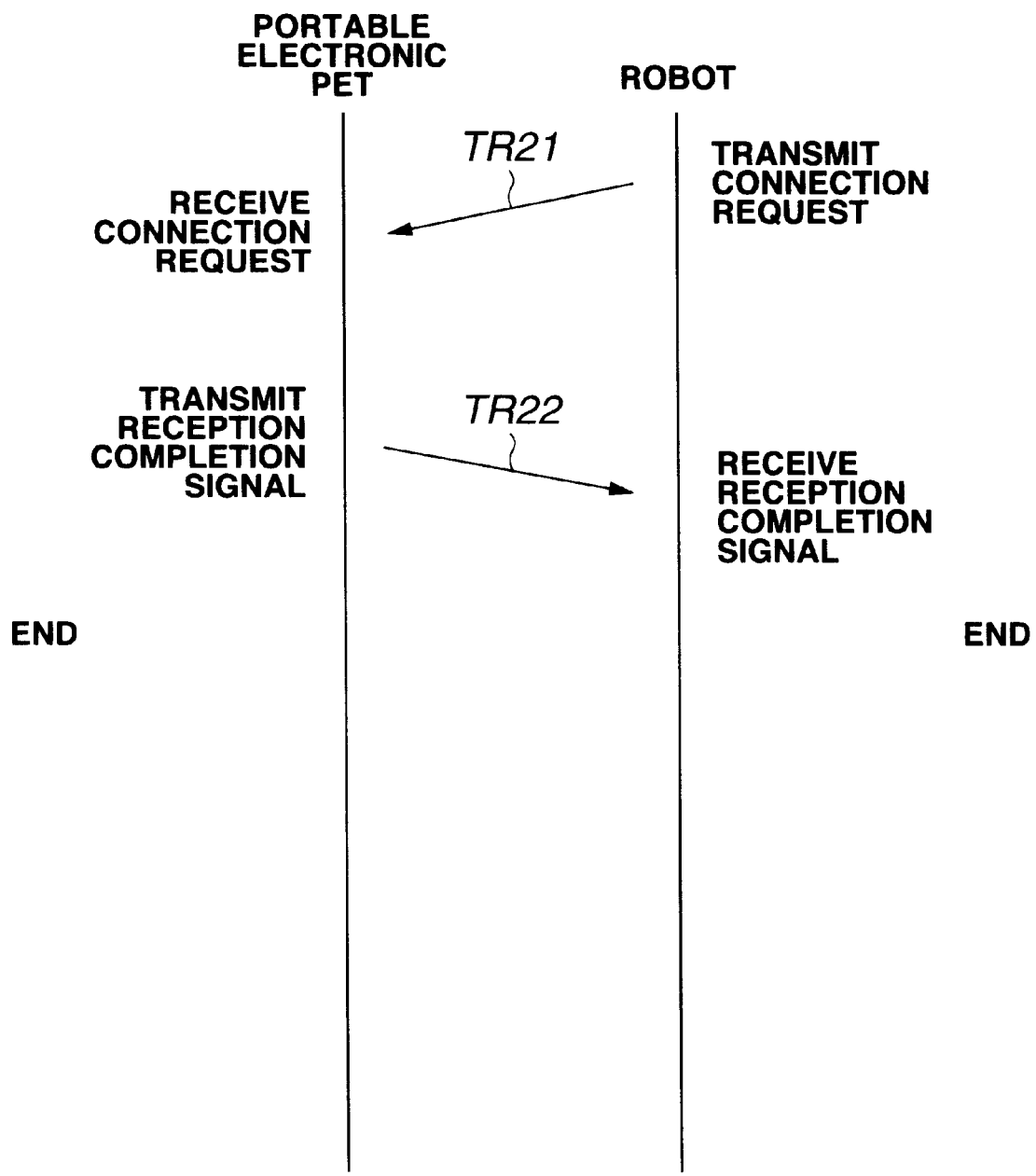
FIG. 42 shows the flow in the case where transfer of pet characteristic information is not carried out between the pet-type robot and the virtual electronic pet device.

FIG. 42 shows the flow of communication in the case where the value of the ownership flag of the pet-type robot and the value of the ownership flag of the virtual electronic pet device are the same. In the example of FIG. 42, as an initial state, the value of the ownership flag of the pet-type robot is 0 (Own_flg=0) and the value of the ownership flag of the virtual electronic pet device is also 0 (Own_flg=0). As the value of the ownership flag of the pet-type robot and the value of the ownership flag of the virtual electronic pet device are the same, it is indicated that the pet-type robot and the virtual electronic pet device originally deal with different electronic pets and that transmission/reception of the pet characteristic information cannot be carried out.

In FIG. 42, first, the pet-type robot transmits a connection request signal including the ownership flag to the virtual electronic pet device (expressed as a portable electronic pet in FIG. 42), as indicated by TR21 in FIG. 42. The value of the ownership flag in this case is 0 (Own_flg=0).

On receiving the connection request signal, the virtual electronic pet device compares its own ownership flag (Own_flg=0) with the ownership flag (Own_flg=0) included in the received connection request signal.

In this case, since the value of the ownership flag of the received connection request signal and the value of its own ownership flag are the same, the virtual electronic pet device transmits a reception completion signal to the pet-type robot, as indicated by TR22 in FIG. 42. On receiving the reception completion signal, the pet-type robot ends the processing.

FIG. 43 shows an exemplary data format of the above-described connection request signal, the connection permission signal, and the reception completion signal.

The connection request signal consists of the connection request ID, the number of communication bytes, which the number of bytes used at the time of connection, and the ownership flag (Own_flg) with its additional data, each of the connection request ID, the number of communication bytes and the ownership flag being represented by 4 bytes.

The connection permission signal consists of the connection permission ID, the number of communication bytes, and the ownership flag (Own_flg) with its additional data, each being represented by 4 bytes.

The reception completion signal consists of the reception completion ID, the number of communication bytes, and the ownership flag (Own_flg) with its additional data, each being represented by 4 bytes.

In the above-described embodiment, it is possible to transmit and receive the pet characteristic information of the electronic pet, directly or via the Internet. In the present invention, it is also possible to manage various types of information related to the electronic pet by a predetermined server 260 via the Internet 200. Hereinafter, this server is referred to as a pet shared server.

Figure 44:
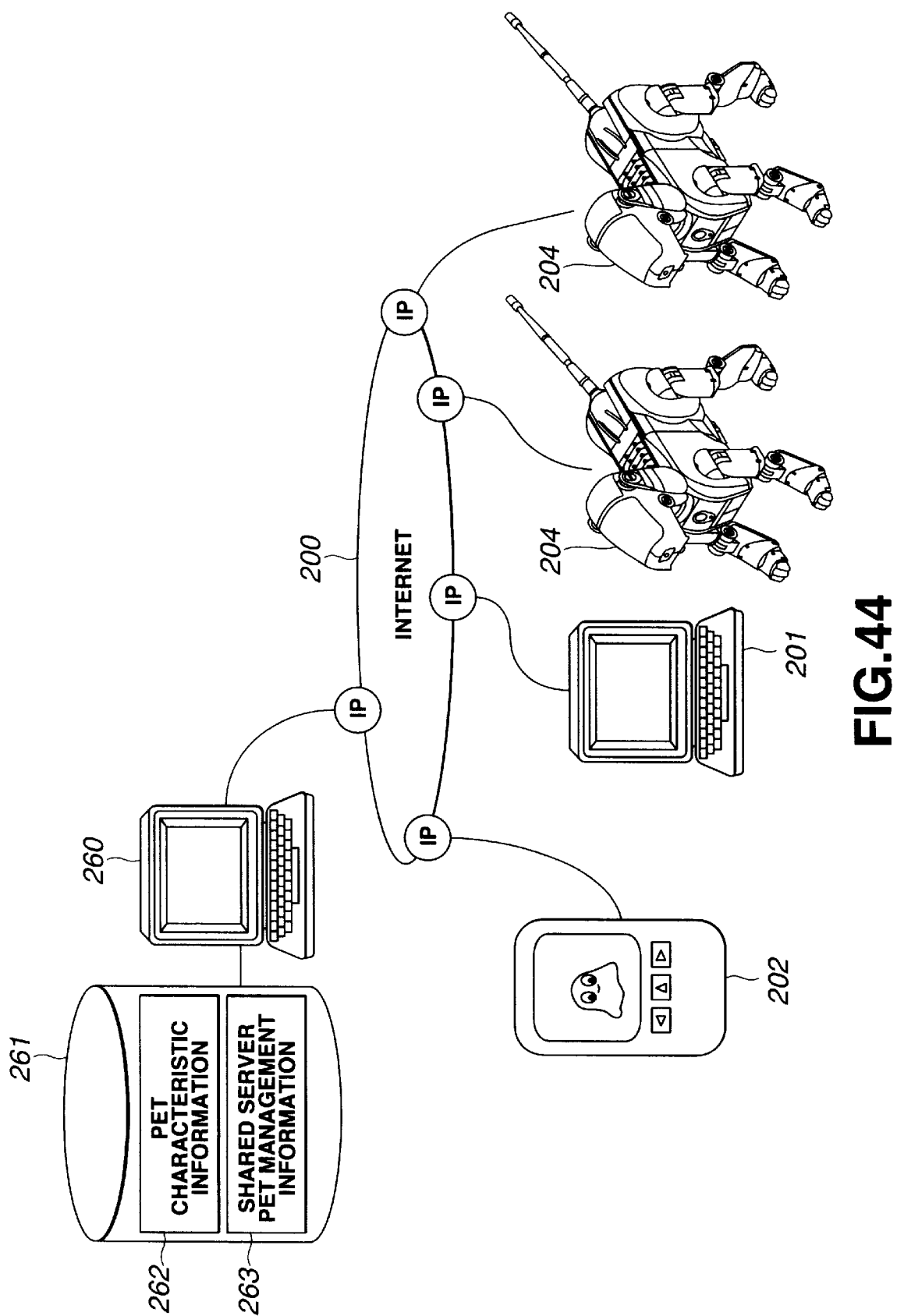
FIG. 44 shows an exemplary system structure of the case of managing the electronic pet by a pet shared server.

FIG. 44 shows the conceptual structure of a network system in which the pet characteristic information of the virtual electronic pet device 202, the personal computer 201, and the pet-type robots 204, 204 is managed by a pet shared server 260 via the Internet 200.

In the case of this network system, the pet shared server 260 is provided with a data storage section 261 which has a pet characteristic information storage section 262 for storing the pet characteristic information and a management information (shared server pet management information) storage section 263 for electronic pets managed by the pet shared server 260.

Figure 45:
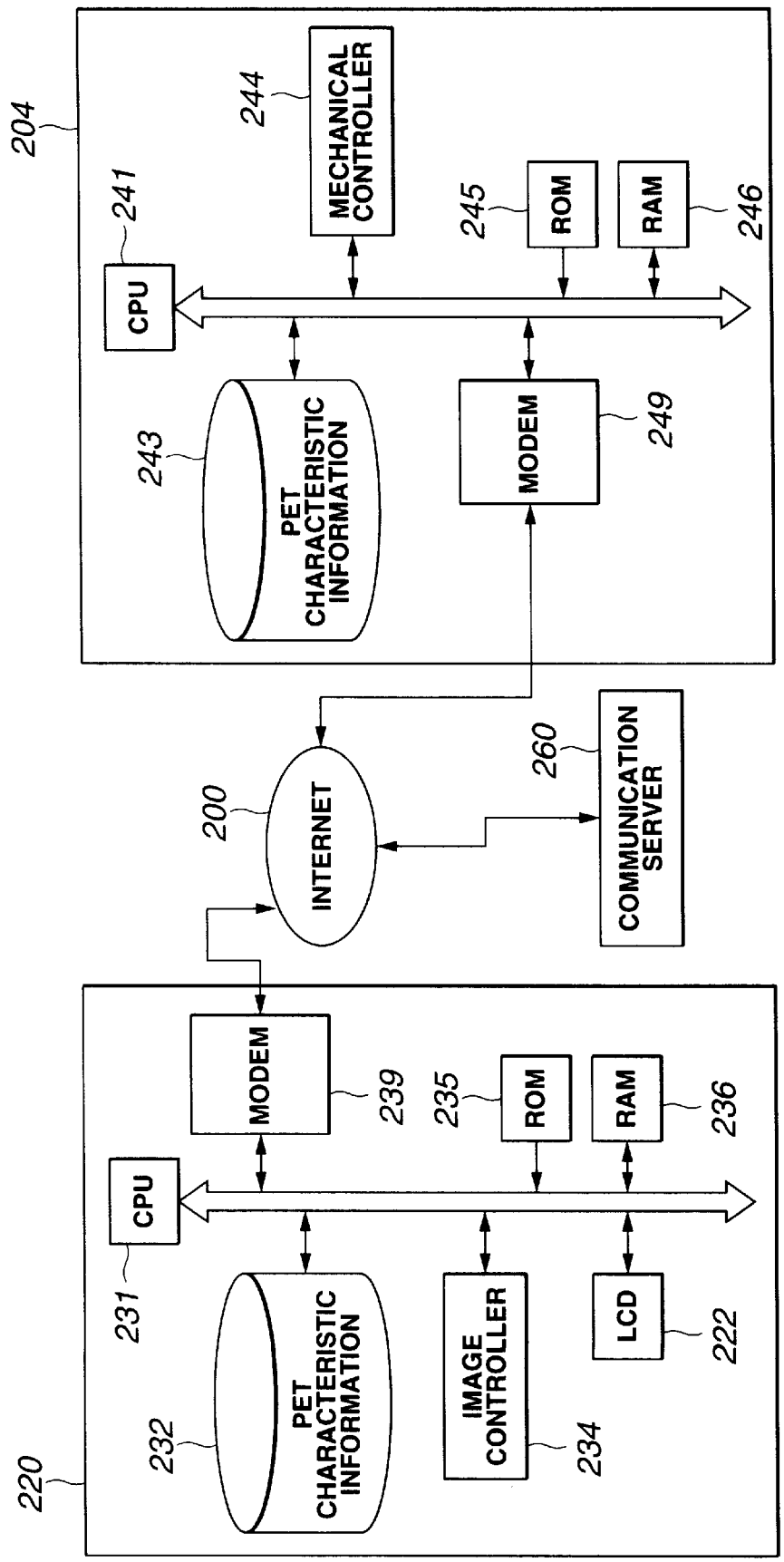
FIG. 45 is a block diagram showing an exemplary hardware structure of the pet-type robot and the virtual electronic pet device in the system structure for managing the electronic pet by the shared server.

FIG. 45 shows the essential internal structures of the virtual electronic pet device 220 and the pet-type robot 204 in the case where the pet shared server 260, the virtual electronic pet device 220 and the pet-type robot 204 are connected via the Internet 200. In FIG. 45, portions similar to those of the foregoing drawings are denoted by the same numerals and will not be described further in detail.

In the example of FIG. 45, since the virtual electronic pet device 220 and the pet-type robot 204 can be connected directly to the Internet 200, the virtual electronic pet device 220 and the pet-type robot 204 include modems 239 and 249, respectively. Through the modems 239 and 249, it is possible to connect to the pet shared server 260 via the Internet 200 and to manage various types of data including the pet characteristic information by the pet shared server 260.

Figure 46:
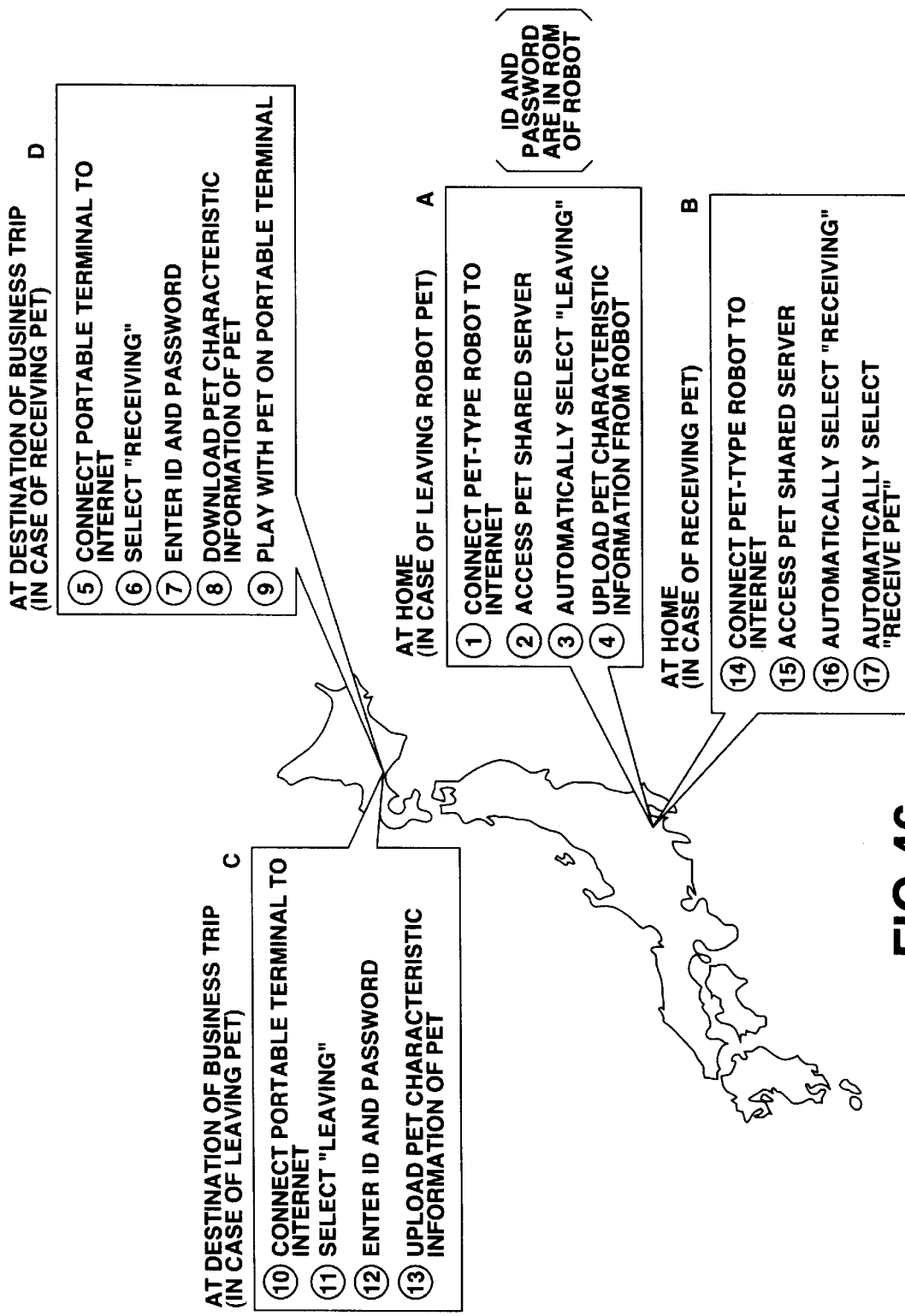
FIG. 46 is a view for explaining a specific example of the case of leaving the electronic pet to the shared server and the case of receiving the electronic pet from the shared server.

As it is made possible to manage the pet characteristic information of the electronic pet by the pet shared server 260 via the Internet 200 as shown in FIGS. 44 and 45, it is possible to cause the pet shared server 260 to manage the pet characteristic information of the electronic pet, for example, in the case where the owner is away from home for a business trip, that is, to leave the electronic pet to the pet shared server, and at the destination of the business trip, retrieve and play with the pet characteristic information from the server, as shown in FIG. 46.

Specifically, in the example of FIG. 46, at home before making a business trip, the pet-type robot is first connected to the Internet so as to access the pet shared server, as described in A of FIG. 46. At this point, the value of the ownership flag of the pet-type robot is 1 (Own_flg=1). When the value of the ownership flag is 1, the pet-type robot automatically selects "leaving" for leaving the pet characteristic information to the server. Thus, the pet characteristic information is uploaded from the pet-type robot to the server. Since the individual electronic pets left to the pet shared server must be distinguished, the specific ID and password stored in the ROM of the pet-type robot are simultaneously transferred to the server in the uploading.

Next, at the destination of the business trip, for example, a portable terminal (a portable virtual electronic pet device or personal computer) is connected to the Internet so as to access the pet shared server, as described in B of FIG. 46. At this point, a plurality of menu items are displayed in the image display section of the portable terminal (the image display section of the portable virtual electronic pet device or the monitor of the personal computer). The menu items include "leaving", "receiving" and so on. In this case, "receiving" is selected. For receiving the electronic pet which the user left, the user enters the ID and password to prevent reception of a wrong electronic pet. After that, the pet characteristic information of the electronic pet left to the pet shared server is downloaded to the portable terminal. Thus, the user can keep the electronic pet on the portable terminal or play with the electronic pet even at the destination of the business trip.

When returning from the destination of the business trip, for example, the portable terminal is connected to the Internet so as to access the pet shared server, as described in C of FIG. 46. Thus, a plurality of menu items are displayed in the image display section of the portable terminal. As the user selects "leaving" of the menu items and enters the ID and password, the pet characteristic information is uploaded from the portable terminal to the server.

After returning home from the business trip, the pet-type robot is connected to the Internet so as access the pet shared server, as described in D of FIG. 46. At this point, the value of the ownership flag of the pet-type robot is 0 (Own_flg= 0). When the value of the ownership flag is 0, the pet-type robot automatically selects "receiving" for receiving the pet characteristic information from the server. Thus, the pet characteristic information is downloaded from the server to the pet-type robot.

Figure 47:
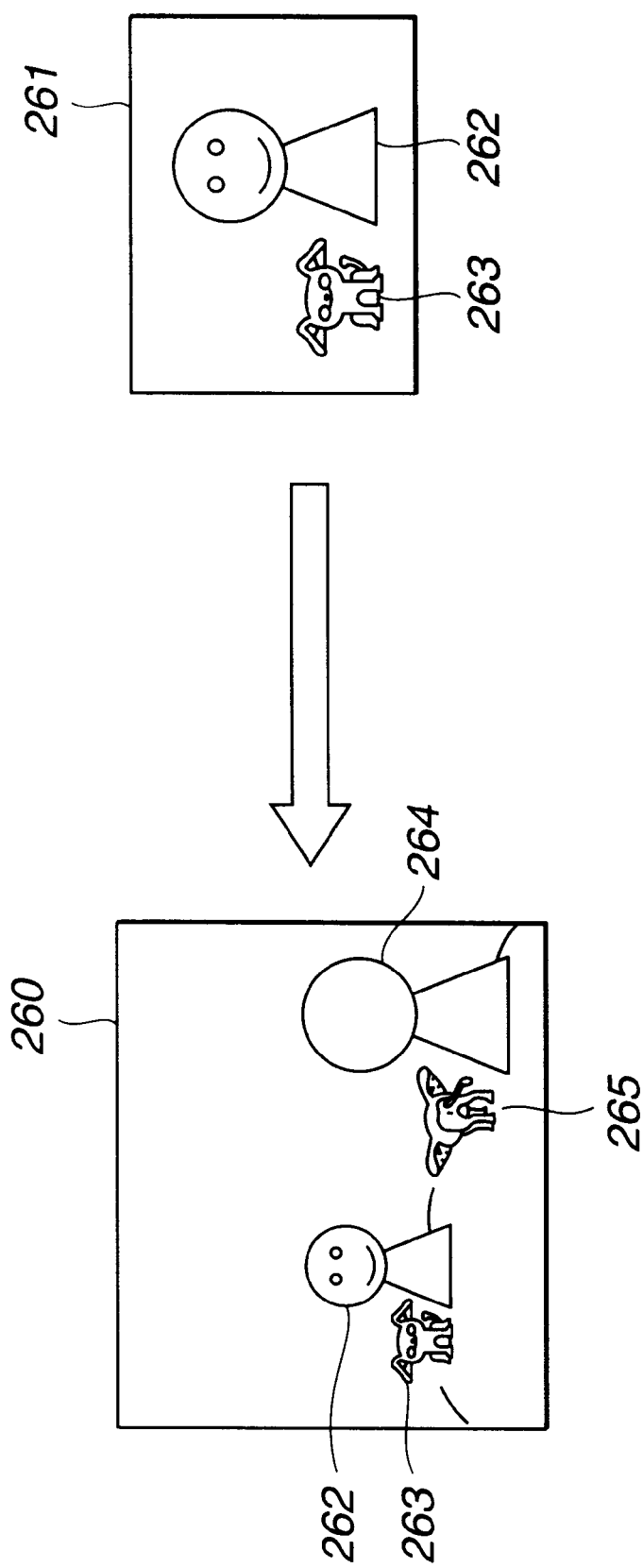
FIG. 47 conceptually shows an example in which the electronic pet and an avatar of the user exist in a virtual world.

In the above-described second embodiment, the electronic pet is kept as the electronic pet on the virtual electronic pet device, the pet-type robot, and the personal computer. However, as a third embodiment of the present invention, it is also possible that the pet-type robot plays as an electronic pet 263 in a virtual world 261 on the personal computer and that the user himself/herself enters the virtual world 261 as an avatar 262 and plays with his/her own electronic pet, as shown in FIG. 47. The avatar is the incarnation of the god appearing in the Indian mythology. In the virtual world drawn as two-dimensional or three-dimensional computer graphics, this avatar serves as a character representing the user.

In the present embodiment, it is also possible to let the avatar 262 of the user and his/her electronic pet 263 enter a virtual world 260 which is constructed on the network and in which another avatar 264 and his/her electronic pet 265 exist, and to let them communicate with each other.

Figure 48:
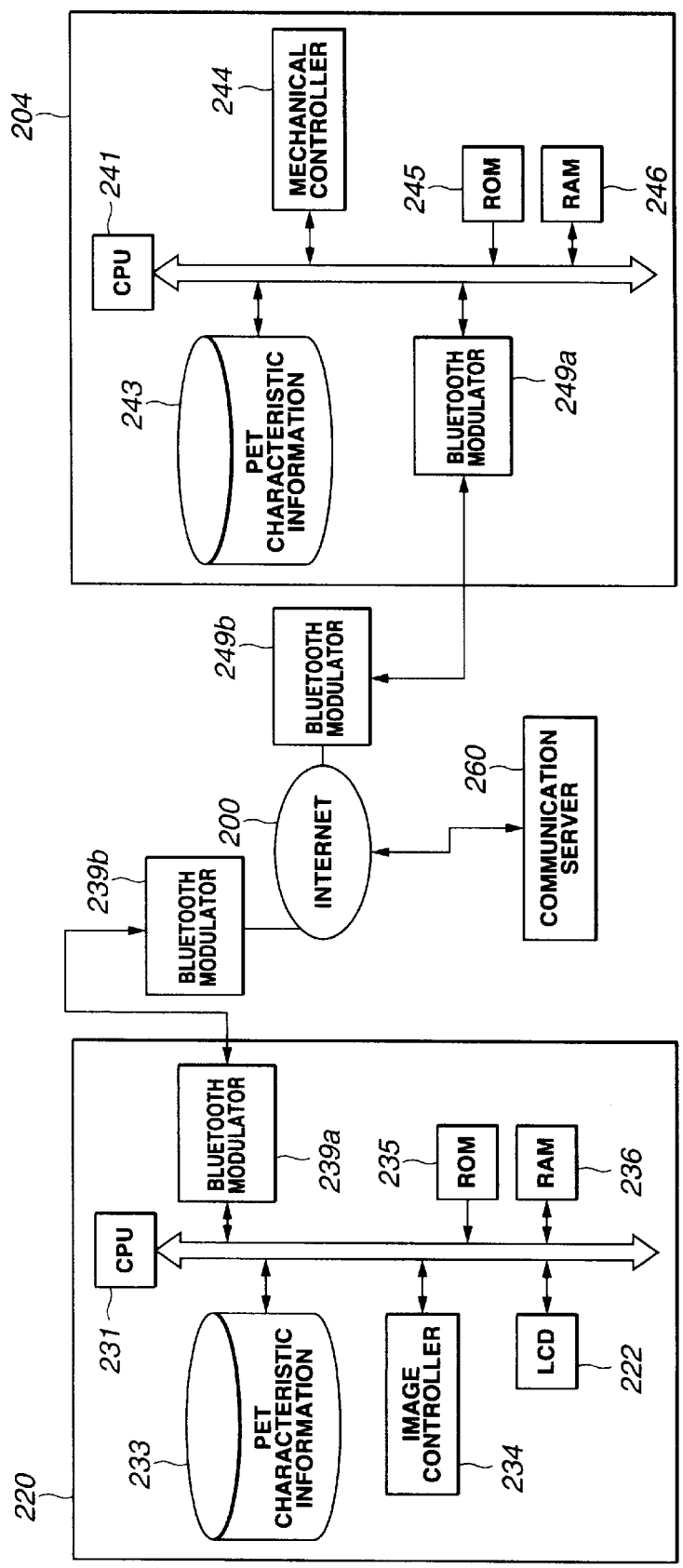
FIG. 48 is a block diagram showing an exemplary hardware structure of the pet-type robot and the virtual electronic pet device in the system structure for managing the electronic pet by the shared server, and showing the state where the pet-type robot and the virtual electronic pet device are connected to the Internet by a Bluetooth module.

In the example shown in FIG. 45, the virtual electronic pet device 220 and the pet-type robot 204 can be connected to the Internet 200 via the modems 239 and 249. However, the means for connection to the Internet is not limited to these modems. For example, connection can be made by Bluetooth modules, which are radio means. In such a case, the pet-type robot 204 and the virtual electronic pet device 220 have Bluetooth modules 249a and 239a, respectively, as radio transmission/reception sections, as shown in FIG. 48. Accordingly, Bluetooth modules 249b and 239b are connected to the Internet (e.g., public telephone network) and data transmission/reception is carried out with the Bluetooth module 249a of the pet-type robot 204 and the Bluetooth module 239a the virtual electronic pet device 220. In this case, the Bluetooth modules 239a, 249a, 239b and 249b employ Bluetooth radio interfaces, as described above.

Hereinafter, the structure and operation will be described which are adapted for realizing the keeping of the electronic pet in a three-dimensional virtual space as in the third embodiment by using the WWW (world wide web) framework for providing various types of information via the Internet, which is a computer network constructed on the global scale, and by using VRML (virtual reality modeling language), which is a description language enabling unified handling of three-dimensional information.

First, prior to the description of the third embodiment of the present invention, VRML will be briefly explained.

VRML is a three-dimensional graphics description language which enables setting of links of hyper texts with respect to an object drawn by description in the three-dimensional space or three-dimensional graphics and which enables sequential access to the WWW server while tracing these links. To display the three-dimensional space described in this VRML, VRML browser has been developed. The details of VRML are described, for example, in Mark Pesce, "VRML: Browsing & Building of Cyberspace", 1995, New Readers Publishing, ISBN 1-56205-498-8 (and its Japanese version, translated by Koichi Matsuda, Terutaka Kamachi, Shoichi Takeuchi, Yasuaki Honda, Junichi Rekimoto, Masayuki Ishikawa, Ken Miyashita and Kazuhiro Hara, first edition published on Mar. 25, 1996), and Koichi Matsuda and Yasuaki Honda, "The Latest Trend of VRML and Cyber-Passage", bit (Kyoritsu Shuppan), 1996, Vol.28, No.7, pp.29 to 36; No.8, pp.57 to 65; No.9, pp.29 to 36; and No.10, pp.49 to official complete specification of the Virtual Reality Modeling Language Version 2.0, ISO/IEC CD 14772, Aug. 4, 1996. Moreover, as the VRML 2.0 browser and the shared server software, for example, the present Applicant, Sony Corporation has developed and produced "Community Place Browser/Bureau (trademark)", and its beta version (sample version).

In the case of building a three-dimensional virtual space using such VRML 2.0, a VRML file representing desired contents is first prepared in accordance with the corresponding relation (routing) between the graphic data and the script, for example, preparation of the graphic data indicating the shape, motion, and position of an object (model) in the virtual space by using VRML (i.e., preparation of the model), addition, to the model, of a switch (sensor) which generates an event when the user clicks the mouse to point the model in the virtual space displayed on the screen (i.e., addition of the sensor), programming of the script for realizing the event generated in response to the pointing to the sensor (i.e., preparation of the script), and operation with respect to the sensor and starting of the script. (Hereinafter, common nodes such as the graphic data, the script, and the right prescribed in VRML are also referred to as nodes, as a general term.) For example, how to write and sample data of VRML 2.0.

The data of VRML 2.0 is constituted by a node and a field. The field provides a variable to the node and designates the parameter of the node. The field may be omitted. In the case where the field is omitted, a default value is used. As the field, a "single-value field (SF)" having only a single value or a "multiple-value field (MF)" may be employed. For the detailed function of the node and the field, "Appendix 1: VRML 2.0 Node List" should be referred to.

In VRML 2.0, a mechanism for realizing autonomic behavior in the VRML virtual space is prescribed. The details of the mechanism for autonomic behavior are disclosed in the paragraph of concepts in the specification 4 of the Virtual Reality Modeling Language Version 2.0, ISO/IEC CD 14772, Aug. 4, 1996. In the paragraph, the key concepts for using the VRML specification are described. General items related to various nodes are described such as the method for coupling a node to a scene graph, the method in which a node generates or receives an event, the method for preparing a node type using a prototype, the method for adding a node type to VRML and exporting it so as to enable use from outside, and the method for incorporating a script operating as a program into the VRML file.

Figure 49:
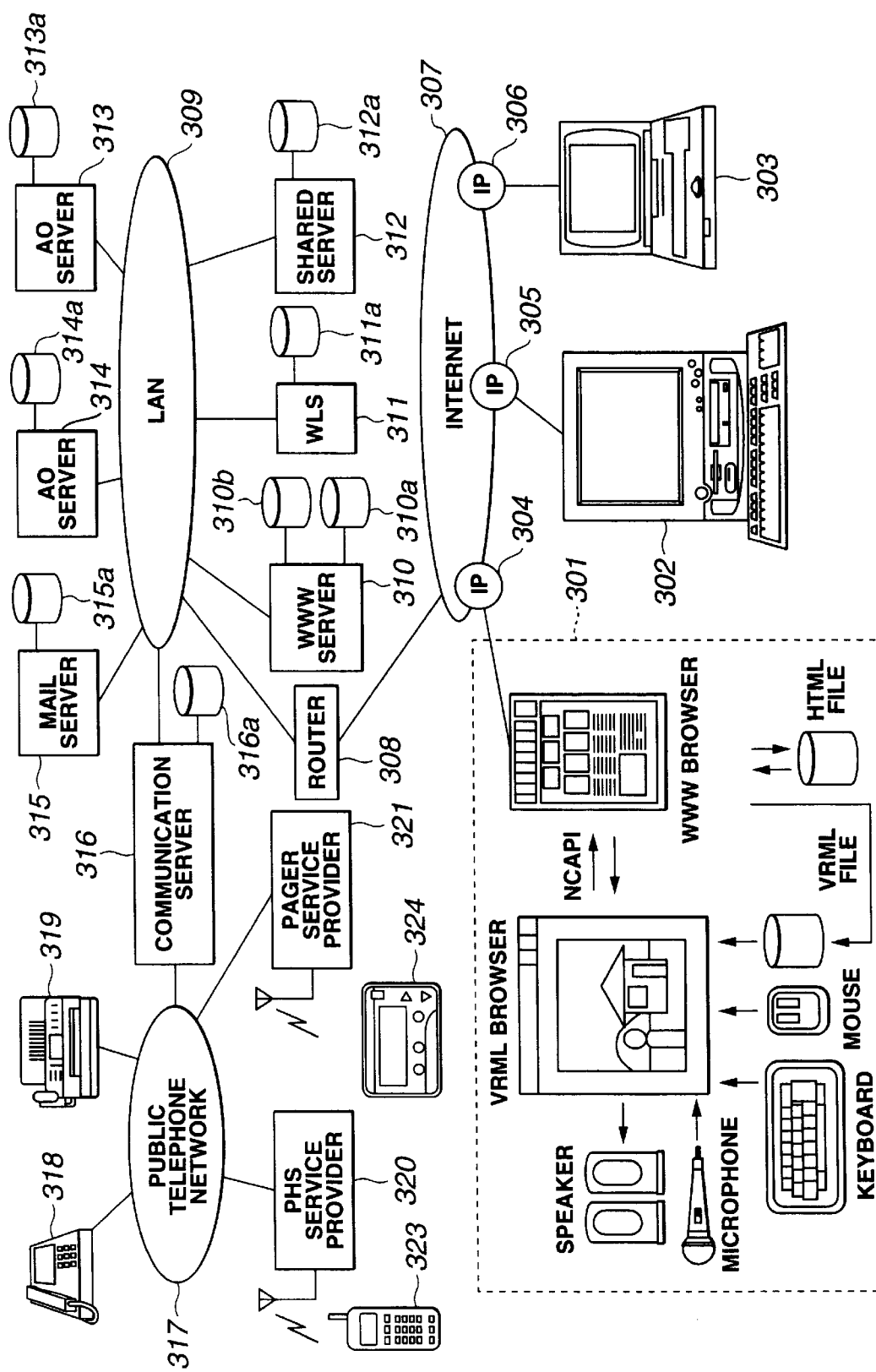
FIG. 49 is a block diagram showing the detailed structure of the system in the case where the electronic pet and the avatar of the user exist in the virtual world.

FIG. 49 shows the specific structure of the network system according to the third embodiment.

The constituent elements denoted by numerals 301, 302, and 303 in FIG. 49 are client PCs, that is, the above-described personal computers in which a VRML browser and a WWW browser are installed and operating. These client PCs are connected to the Internet 307 via Internet connection service providers 304, 305, and 306.

To a LAN,(local area network) 309 connected to the Internet 307 via a router 308, a WWW server 310, a WLS (world location server) 311, a pet shared server 312, AO servers 313, 314, a mail server 315, and a communication server 316 are connected. In these servers 310 to 316, hard disks (HDDs) 310a, 310b, 311a to 316a are provided, respectively.

The communication server 316 is connected to a telephone set 318 and a facsimile 319 via a public telephone network 317. The communication server 316 is also connected to a PHS (personal handyphone system) terminal 323 via a PHS service provider 320, and is connected through radio waves to a pager terminal 324 via a pager service provider 321.

Figure 50:
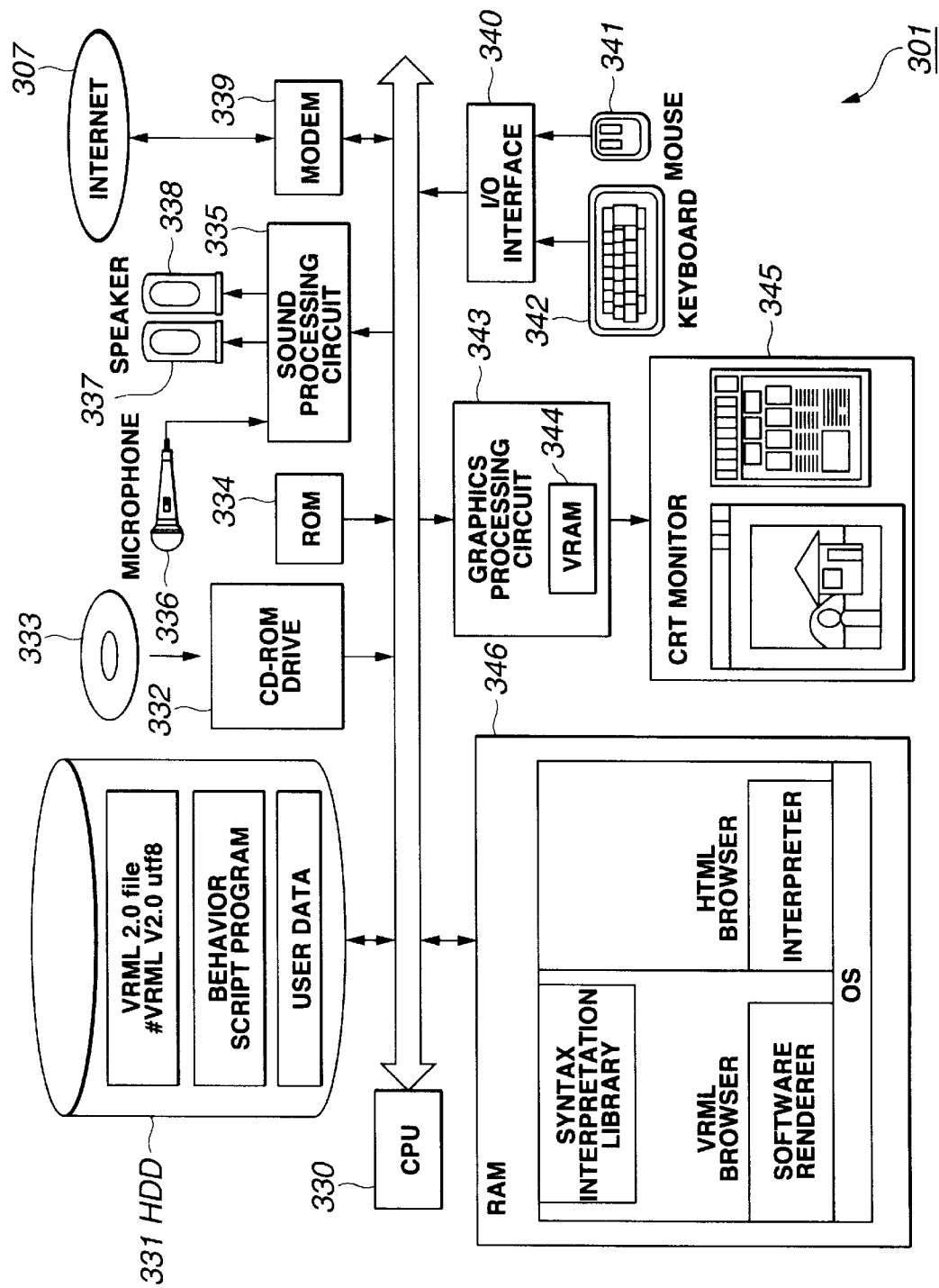
FIG. 50 is a block diagram showing an exemplary structure of a client PC used for the system of FIG. 49.

FIG. 50 is a block diagram showing the hardware structure of the client PC 301 of FIG. 49.

In FIG. 50, the client PC 301 is constituted by a CPU 330 for controlling each part, an HDD 331 in which the VRML contents made up of a script program of a virtual life object by VRML 2.0 or Java (trademark) and the user data are stored, a CD-ROM drive 332 for reading the VRML contents stored on a CD-ROM disc 333, a ROM 334 in which BIOS (basic input output systems) and the like are stored, a sound processing circuit 335 connected with a microphone 336 and left and right speakers 337, 338, a modem 339 for connecting to the Internet 307, an I/O (input/output) interface 340 connected with a mouse 341 and a keyboard 342, a graphics processing circuit 343 having a VRAM 344 provided therein, a CRT monitor 345, and a RAM 346. At the time of execution, a WWW browser (e.g., Netscape Navigator (trademark)) operating on an OS (e.g., Windows by Microsoft), an interpreter (e.g., Java interpreter), and a VRML 2.0 browser (e.g., Community place Browser developed by Sony Corporation) are read into the RAM 346 so as to be executed by the CPU 330.

In the VRML 2.0 browser, a syntax interpretation library (parser) of VRML (e.g., QvLib developed by Silicon Graphics of the U.S. and made open free of charge), and a software renderer (e.g., RenderWare produced by Criterion Software Ltd. of England) are provided.

The VRML 2.0 browser of this client PC carries out transmission/reception of various types of data to/from the WWW browser (e.g., Netscape Navigator) on the basis of NCAPI (Netscape Client Application Programming Interface (trademark)), as shown in FIG. 50.

On receiving the HTML file and the VRML contents (including the VRML file and the script program) from the WWW server 310 via the Internet 307, the WWW browser stores these data into the local HDD 331. The WWW browser processes the HTML file of the received data and displays texts and images on the CRT monitor. On the other hand, the VRML browser processes the VRML file and displays a three-dimensional virtual space on the CRT monitor, and also changes the behavior of the object in the three-dimensional virtual space in accordance with the result of processing of the script program by the interpreter.

Although not shown in the drawing, the other client PCs 302 and 303 are constituted similarly to the client PC 301.

An exemplary operation of the system shown in FIG. 49 will now be described.

First, the procedures from the actual downloading of the VRML contents via the Internet to the provision of a multi-user environment in which a plurality of users share one virtual space will be described with reference to FIGS. 51 to 53.

Figure 51:
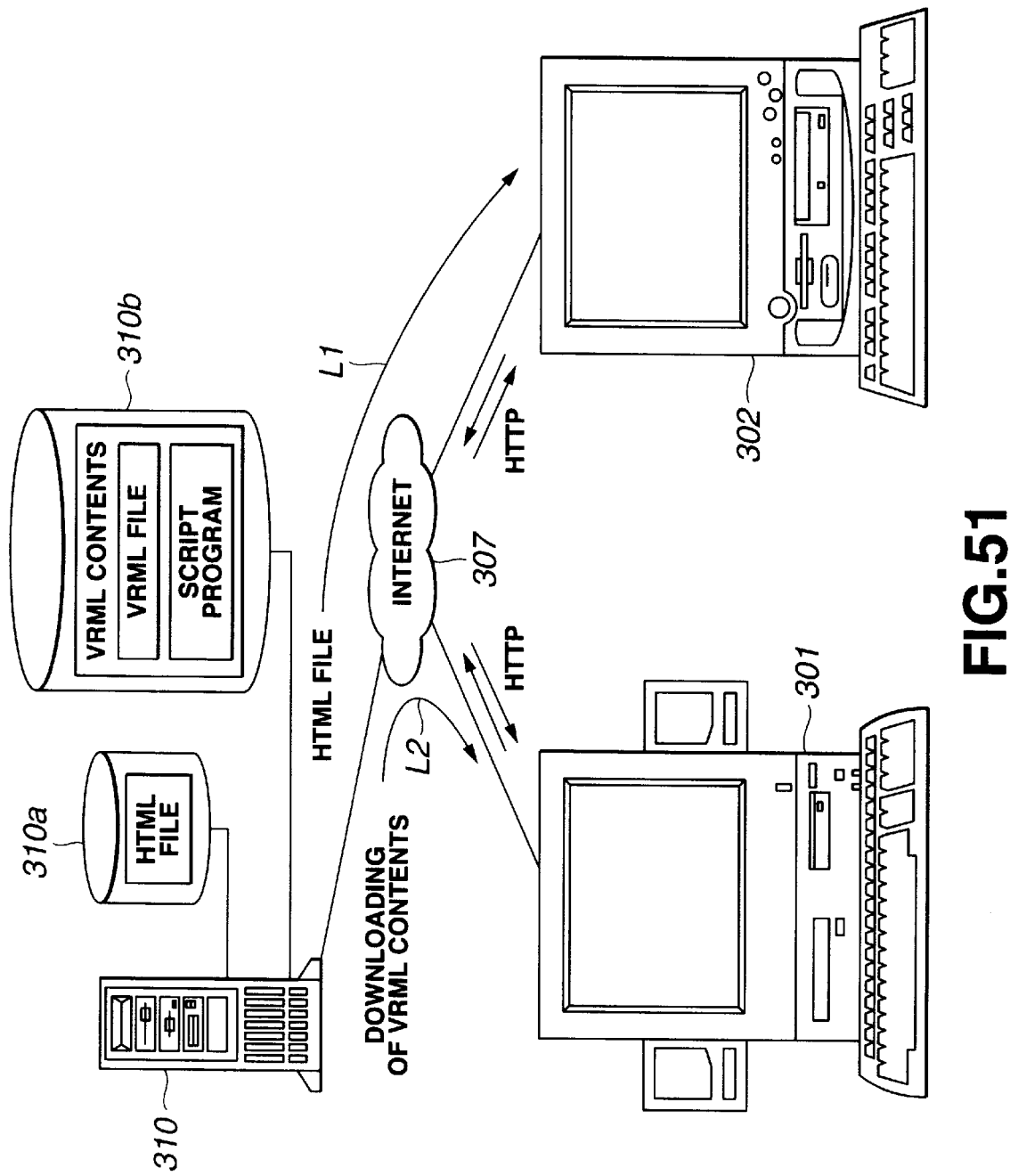
FIG. 51 is a view for explaining the flow of processing from the browsing of a home page of a web site which provides VRML contents, to the downloading of VRML to the client PC, in the system of FIG. 49.

As indicated by L1 in FIG. 51, the homepage of the website providing the VRML contents is first browsed by using the WWW browser. Then, the users of the client PC 301 and the client PC 302 download the VRML contents made up of the VRML 2.0 file and the script program (e.g., Java script program) for realizing autonomic behavior in the VRML space, as indicated by L2 in FIG. 51. Of course, the VRML contents provided on the CD-ROM 333 may be read by the CD-ROM drive 332.

Figure 52:
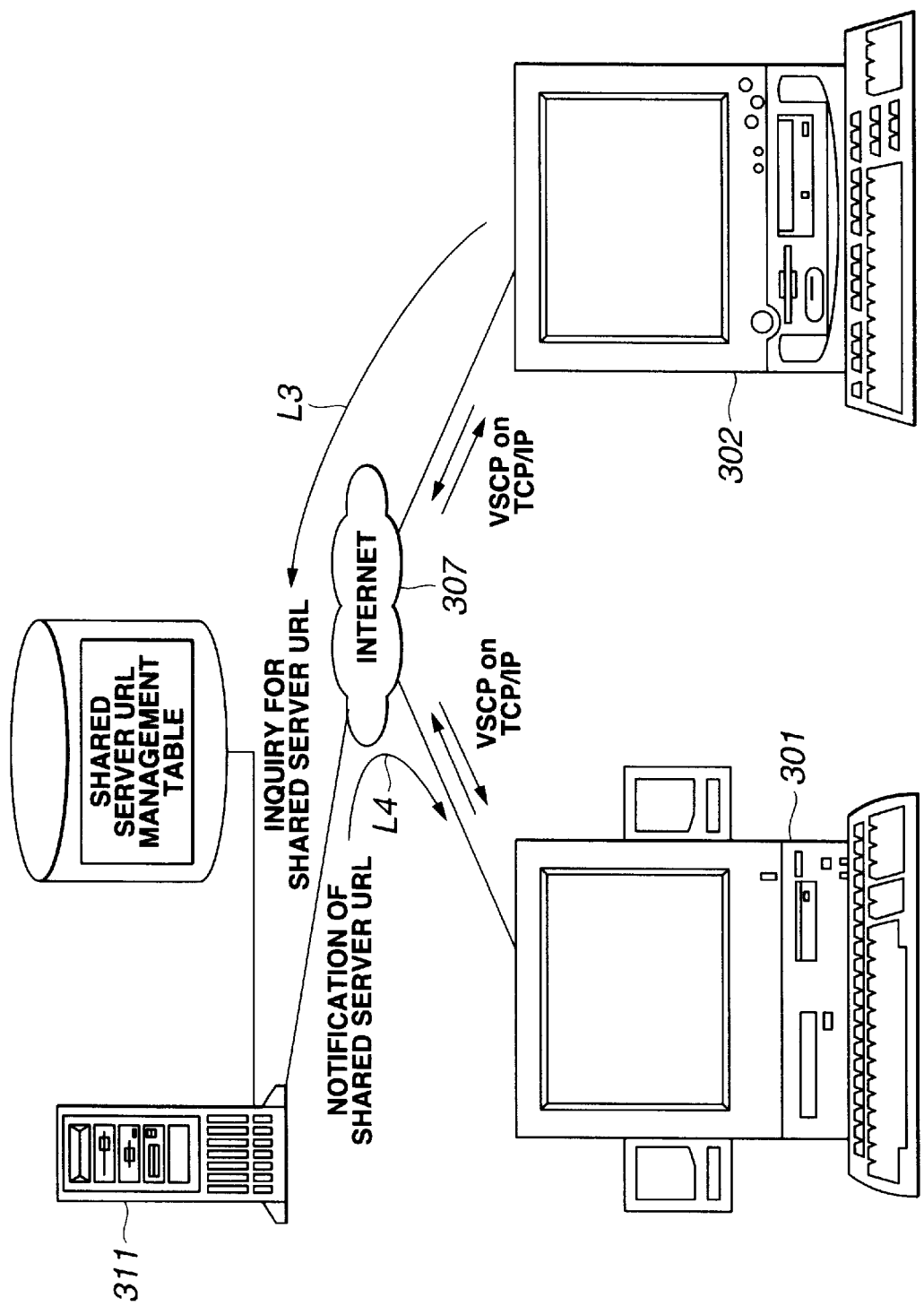
FIG. 52 is a view for explaining the flow of processing from interpretation and execution of a VRML2.0 file by the client PC to the inquiry of the URL of the shared server, in the system of FIG. 49.

Next, as shown in FIG. 52, in the client PC 301 and the client PC 302, the VRML browser interprets and executes the VRML 2.0 file, which is downloaded and temporarily stored on the local HDD 331 of the respectively client PCs. Moreover, the client PC 301 and the client PC 302 inquire the WLS 311 for the URL of the pet shared server 312 on the basis of the VSCP (virtual society server client protocol), as indicated by L3 in FIG. 52. In this case, the WLS 311 notifies the client PC 301 and the client PC 302 of the URL of the pet shared server 312 with reference to a shared server URL management table stored on an HDD 311a, as indicated by L4 in FIG. 52.

Figure 53:
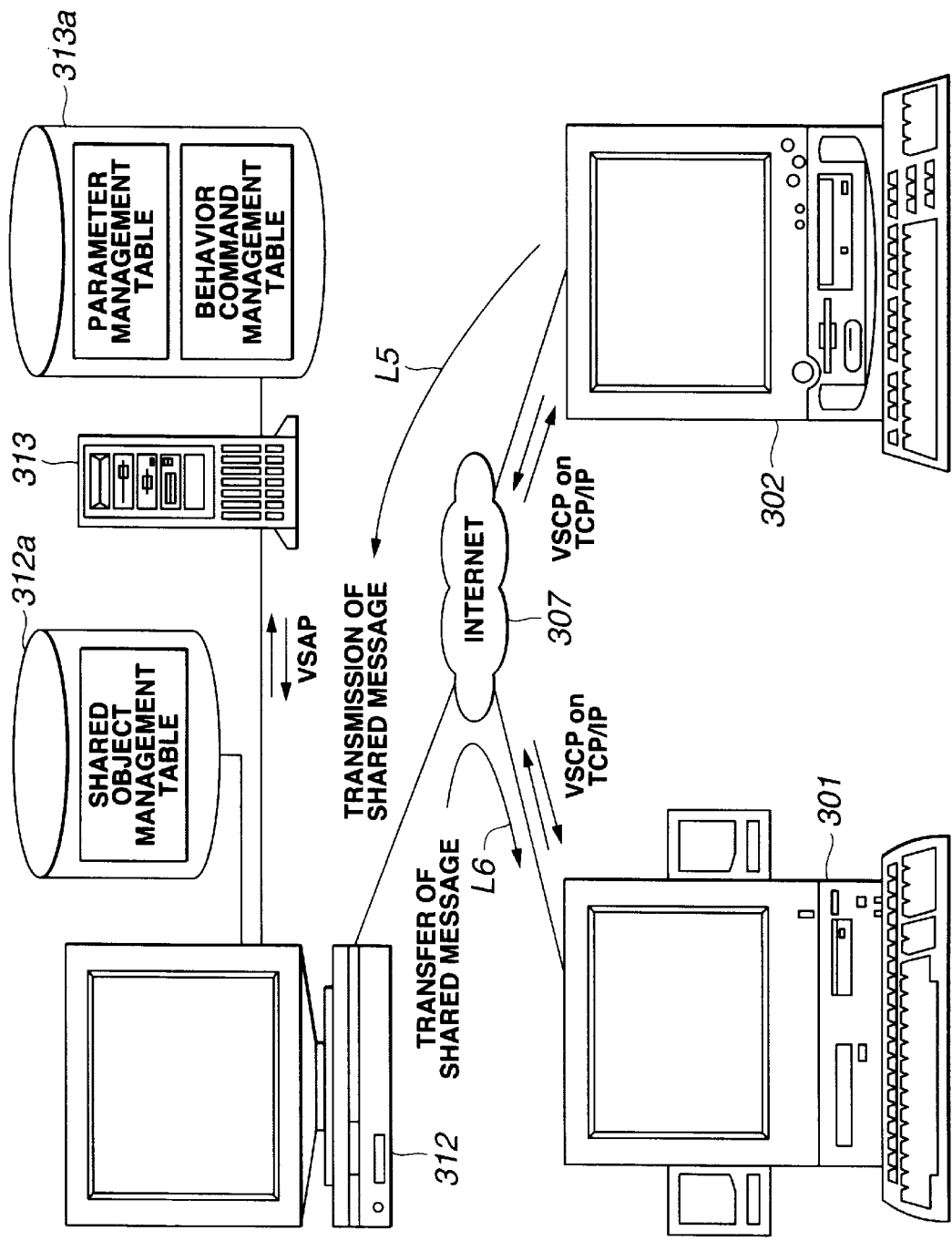
FIG. 53 is a view for explaining the flow of processing in which a plurality of client PCs receive data related to a three-dimensional object via the shared server and realize a multi-user environment.

Using the URL, the client PC 301 and the client PC 302 are connected to the pet shared server 312, as shown in FIG. 53. Consequently, transmission of a shared message related to the position and motion of a shared 3D (three-dimensional) object is carried out via the pet shared server 312, as indicated by L5 in FIG. 53, and transfer of the shared message is carried out, as indicated by L6 in FIG. 53, thus realizing a multi-user environment.

In the multi-user environment thus realized, when log-in from the client PC 301, that is, from the user, is made, the pet shared server 312 transmits the data of the virtual shared world to the client PC 301 and transfers the data of the virtual life object in the AO server 313.

On receiving the whole data of the virtual shared world and the data of the object in the virtual shared world, the client PC 301 records these data onto the internal hard disk or stores them into the internal memory, and then displays the virtual shared world on the monitor screen on the basis of the recorded data.

In the case where the user enters his/her own avatar 262 and the electronic pet 263 into the virtual shared world at the client PC 301, a call message is transmitted to the AO server 313 via the pet shared server 312. The AO server 313 executes parameter updating processing based on the access event.

As another access event is executed, the operation message is transmitted to the AO server 313, and the parameter is updated every time an operation event is generated.

For example, every time the parameter is updated, it is transferred to the client PC 301 and the other client PC 302 which shares the virtual space, by multi-cast processing of the pet shared server 312.

In the client PC 301, the script program in which the processing procedure for controlling the autonomic behavior of the electronic pet is described is executed on the basis of the parameter sent back thereto. The value of the field of each node constituting the three-dimensional object for expressing the electronic pet of the VRML file is changed. The electronic pet on which the changed value of the field is reflected is rendered and displayed on the main window of the VRML browser on the screen of the image display section of the client PC 301.

The same processing as that of the client PC 301 is executed in the other client PC 302 which shares the virtual world. Thus, the electronic pet on which the value of the field changed in accordance with the movement of the electronic pet is reflected is rendered and also displayed on the main window of the VRML browser on the image display section of the other client PC 302.

For the details of the above-described connection procedure, the Japanese Publication of Unexamined Patent Application No. Hei 9-81781 should be referred to.

In the present embodiment, the information providing medium for providing the computer program for executing the above-described processing includes a network transmission medium such as the Internet or a satellite as well as an information recording medium such as a magnetic disk or a CD-ROM.

What is claimed is:

1. A network system comprising:
one or more implementation devices having transmission/reception means for transmitting and receiving the internal state of a living body object, which is changed in accordance with input information and is information for causing the living body object to act, and the identification information of the living body object, thus implementing the living body object;
a server device having management means for managing the internal state of the living body object and the identification information of the living body object, and transmission/reception means for transmitting/receiving at least the internal state and the identification information;
wherein the implementation devices and the server device are connected with each other via a network.

2. The network system as claimed in claim 1, wherein the internal state of the implementation devices is stored in storage means, and
the internal state stored in the storage means is transmitted and received by the transmission/reception means.

3. The network system as claimed in claim 1, wherein the implementation device is an information processing device for carrying out processing for implementing the living body object by image display means, or a robot which controls a motion section to carry out processing for implementing the living body object as an existence in the real world.

4. The network system as claimed in claim 3, wherein the robot actually carries out an action based on the internal state via a posture or a motion to which the motion section can made transition from the current posture.

5. The network system as claimed in claim 1, wherein the internal state indicates at least one of the state of the emotion and the state of the instinct.

6. The network system as claimed in claim 1, wherein the input information is at least one of surrounding information and internal information.

7. The network system as claimed in claim 1, wherein the internal state is an internal state parameter expressed by a parameter, and
the internal state parameter is updated in accordance with the input information and the updated internal state parameter is stored into the storage means.

8. The network system as claimed in claim 7, wherein when the internal state parameter has reached a threshold value, a predetermined action is selected and the action is actually carried out.

9. The network system as claimed in claim 8, wherein when the internal state parameter has reached a threshold value, a plurality of actions are selected and one of the actions is actually carried out.

10. A network system comprising:
an implementation device having transmission/reception means for transmitting and receiving the internal state of a living body object, which is changed in accordance with input information and is information for causing the living body object to act, thus implementing the living body object; and
an information processing device having transmission/reception means for transmitting and receiving the internal state of the living body object, the information processing device controlling the action of the living body object acting in a virtual world on the basis of the internal state of the living body object, the information processing device carrying out processing for displaying at least the virtual world and the living body object;
wherein information is transmitted and received between the implementation device and the information processing device via a network.

11. The network system as claimed in claim 10, wherein the implementation device has storage means in which the living body object is stored, and
the internal state stored in the storage means is transmitted and received by the transmission/reception means.

12. The network system as claimed in claim 10, wherein the implementation device and the network have radio transmission/reception means employing a Bluetooth radio interface, respectively, and are connected to each other via radio waves so as to carry out transmission/reception of information.

13. The network system as claimed in claim 10, wherein the implementation device is an information processing device for carrying out processing for implementing the living body object by image display means, or a robot which controls a motion section to carry out processing for implementing the living body object as an existence in the real world.

14. The network system as claimed in claim 13, wherein the robot actually carries out an action based on the internal state via a posture or a motion to which the motion section can made transition from the current posture.

15. The network system as claimed in claim 10, wherein the internal state indicates at least one of the state of the emotion and the state of the instinct.

16. The network system as claimed in claim 10, wherein the input information is at least one of surrounding information and internal information.

17. The network system as claimed in claim 10, wherein the internal state is an internal state parameter expressed by a parameter, and the internal state parameter is updated in accordance with the input information.

18. The network system as claimed in claim 17, wherein when the internal state parameter has reached a threshold value, a predetermined action is selected and the action is actually carried out.

19. The network system as claimed in claim 18, wherein when the internal state parameter has reached a threshold value, a plurality of actions are selected and one of the actions is actually carried out.

* * * * *